(12) United States Patent
Facchinello et al.

(10) Patent No.: US 12,187,108 B2
(45) Date of Patent: *Jan. 7, 2025

(54) MULTI-HINGE TONNEAU COVER

(71) Applicant: EXTANG CORPORATION, Ann Arbor, MI (US)

(72) Inventors: Jerome Facchinello, Grand Blanc, MI (US); Chad Carter, Manchester, MI (US); David Germano, Ann Arbor, MI (US); Robbie Mosingo, Saline, MI (US)

(73) Assignee: EXTANG CORPORATION, Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/415,027

(22) Filed: Jan. 17, 2024

(65) Prior Publication Data

US 2024/0149652 A1    May 9, 2024

Related U.S. Application Data

(63) Continuation of application No. 18/122,399, filed on Mar. 16, 2023, now Pat. No. 11,919,379, which is a continuation of application No. 17/833,330, filed on Jun. 6, 2022, now Pat. No. 11,634,017, which is a
(Continued)

(51) Int. Cl.
| | | |
|---|---|---|
| *B60J 7/14* | (2006.01) | |
| *B60J 7/16* | (2006.01) | |
| *B60J 7/19* | (2006.01) | |
| *B60J 7/04* | (2006.01) | |
| *B62D 33/04* | (2006.01) | |
| *E05D 1/04* | (2006.01) | |

(52) U.S. Cl.
CPC ............. *B60J 7/141* (2013.01); *B60J 7/1607* (2013.01); *B60J 7/198* (2013.01); *B60J 7/04* (2013.01); *B60J 7/196* (2013.01); *B62D 33/046* (2013.01); *E05D 1/04* (2013.01)

(58) Field of Classification Search
CPC .. B60J 7/14; B60J 7/141; B60J 7/1607; B60P 7/02; E05D 1/04
USPC ............. 296/100.02, 100.06, 100.07, 100.09
See application file for complete search history.

(56) References Cited

U.S. PATENT DOCUMENTS

| | | |
|---|---|---|
| 4,824,162 A | 4/1989 | Geisler |
| 5,220,951 A | 6/1993 | Dagenais |
| 5,427,428 A | 6/1995 | Ericson et al. |

(Continued)

OTHER PUBLICATIONS

Co-pending U.S. Appl. No. 16/874,233, filed May 14, 2020.
(Continued)

*Primary Examiner* — Jason S Daniels

(57) ABSTRACT

A tonneau cover that includes a first panel and a second panel; a hinge located between the first panel and the second panel, the hinge includes a first link and a second link, the first link includes a pocket; the second link includes a projection that is configured to engage the pocket of the first link to connect the first link and the second link; and one or more covers extending over all or a portion of the first panel, the second panel, the first link, and the second link; the second link has a structure that is substantially similar to a structure of the first link and/or the one or more covers provide an indirect connection between the first panel and the first link.

18 Claims, 21 Drawing Sheets

Related U.S. Application Data continuation of application No. 16/874,881, filed on May 15, 2020, now Pat. No. 11,427,062.

(60) Provisional application No. 62/850,679, filed on May 21, 2019.

(56) References Cited

U.S. PATENT DOCUMENTS

| | | | |
|---|---|---|---|
| 6,006,815 | A | 12/1999 | Schanz |
| 6,113,176 | A | 9/2000 | Bernardo |
| 6,591,888 | B2 | 7/2003 | Benedetti |
| 7,484,788 | B2 | 2/2009 | Calder |
| 7,537,264 | B2 | 5/2009 | Maimin |
| 8,348,328 | B2 | 1/2013 | Walser |
| 9,004,571 | B1 | 4/2015 | Bernardo |
| 9,039,066 | B1 | 5/2015 | Yue |
| 9,211,834 | B2 | 12/2015 | Facchinello |
| 9,333,842 | B2 | 5/2016 | Yue |
| 9,421,850 | B2 | 8/2016 | Shi |
| 9,482,039 | B1 | 11/2016 | Xu |
| 9,555,735 | B2 | 1/2017 | Kerr, III |
| 9,840,135 | B2 | 12/2017 | Rusher et al. |
| D830,282 | S | 10/2018 | Schmeichel et al. |
| D830,283 | S | 10/2018 | Schmeichel et al. |
| 10,189,339 | B2 | 1/2019 | Williamson |
| 10,525,803 | B2 | 1/2020 | Hutchens, III |
| 11,021,047 | B2 | 6/2021 | Cai |
| 11,059,359 | B2 | 7/2021 | Dylewski, II |
| 11,919,379 | B2 * | 3/2024 | Facchinello ............. B60J 7/141 |
| 2004/0149401 | A1 | 8/2004 | Rinkewich |
| 2008/0100088 | A1 | 5/2008 | Calder |
| 2013/0106134 | A1 | 5/2013 | Spencer |
| 2014/0042754 | A1 | 2/2014 | Spencer |
| 2014/0152046 | A1 | 6/2014 | Facchinello |
| 2015/0054300 | A1 | 2/2015 | Shi |
| 2016/0031305 | A1 | 2/2016 | Barnardo |
| 2016/0075220 | A1 | 3/2016 | Williamson |
| 2016/0200375 | A1 | 7/2016 | Kerr, III |
| 2016/0200376 | A1 | 7/2016 | Kerr, III |
| 2018/0118004 | A1 | 5/2018 | Schmeichel et al. |
| 2018/0201107 | A1 | 7/2018 | Lawson |
| 2019/0009657 | A1 | 1/2019 | Carter |
| 2019/0275869 | A1 | 9/2019 | Facchinello et al. |
| 2019/0291550 | A1 | 9/2019 | Ma |
| 2020/0108702 | A1 | 4/2020 | Dylweski, II |
| 2020/0331329 | A1 | 10/2020 | Schmeichel |
| 2020/0353805 | A1 | 11/2020 | Miaoyi |
| 2020/0376941 | A1 | 12/2020 | Cai |
| 2021/0061078 | A1 | 3/2021 | Cai |
| 2021/0061079 | A1 | 3/2021 | Sun |
| 2021/0291633 | A1 | 9/2021 | Gu |

OTHER PUBLICATIONS

Co-pending U.S. Appl. No. 16/874,941, filed May 15, 2020.
Co-pending U.S. Appl. No. 16/875,410, filed May 15, 2020.
Co-pending U.S. Appl. No. 17/743,732, filed May 13, 2022.
Co-pending U.S. Appl. No. 16/875,442, filed May 15, 2020.
Co-pending U.S. Appl. No. 16/874,107, filed May 14, 2020.

* cited by examiner

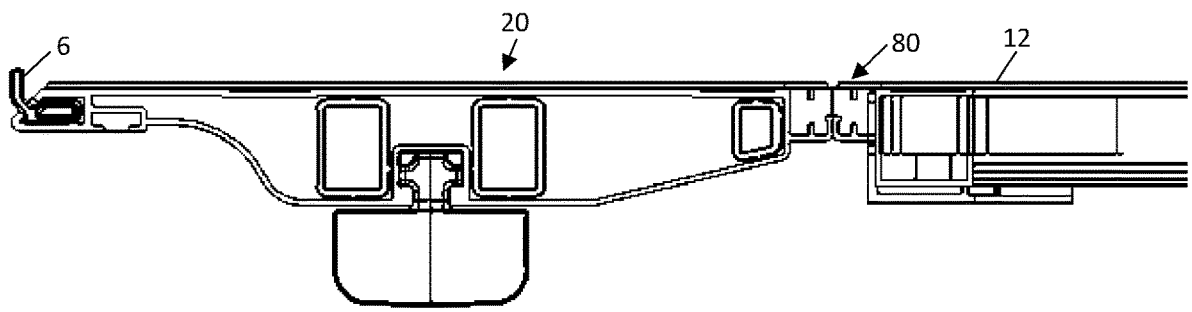
Figure 6A1
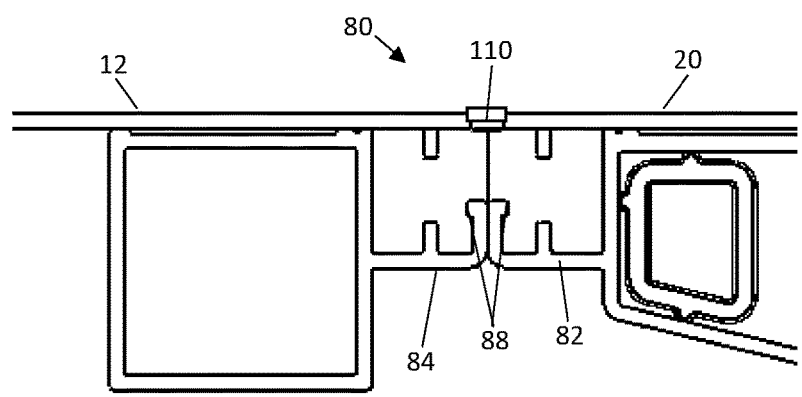
Figure 6A2
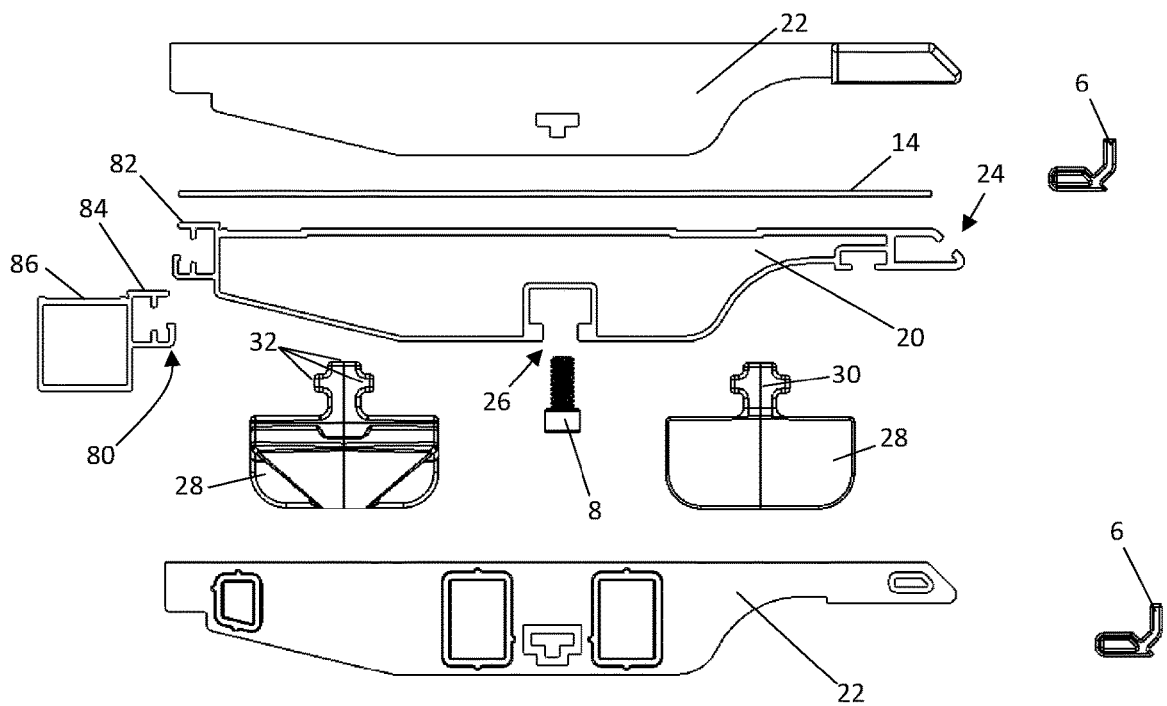
Figure 6A3

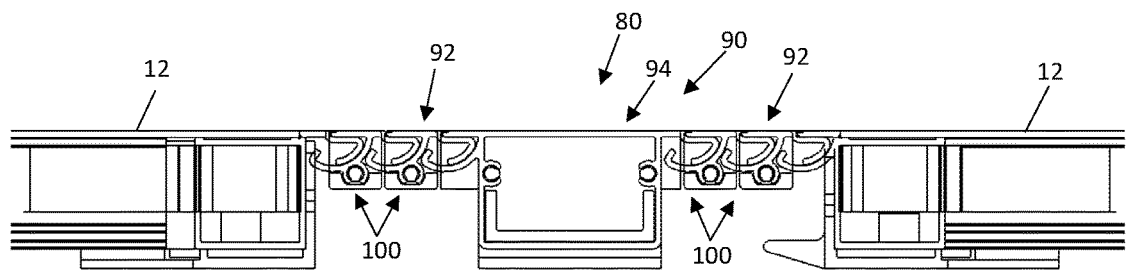
Figure 6B1
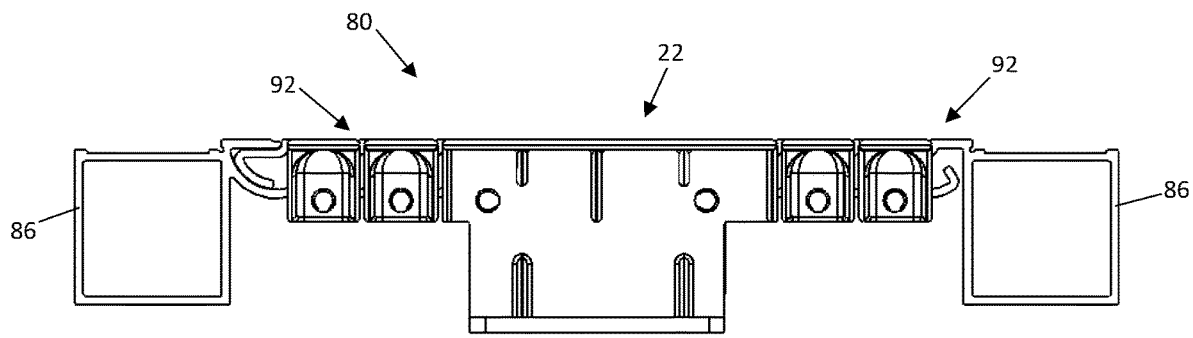
Figure 6B2
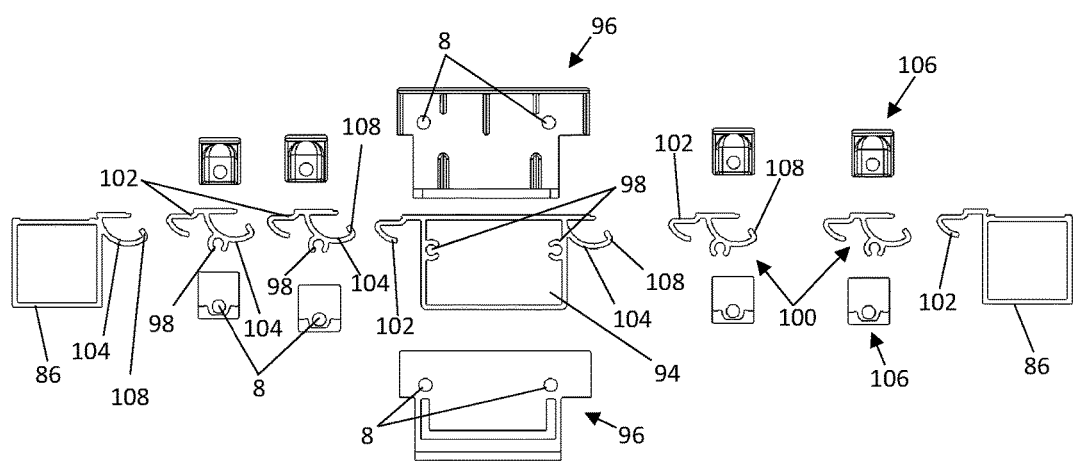
Figure 6B3

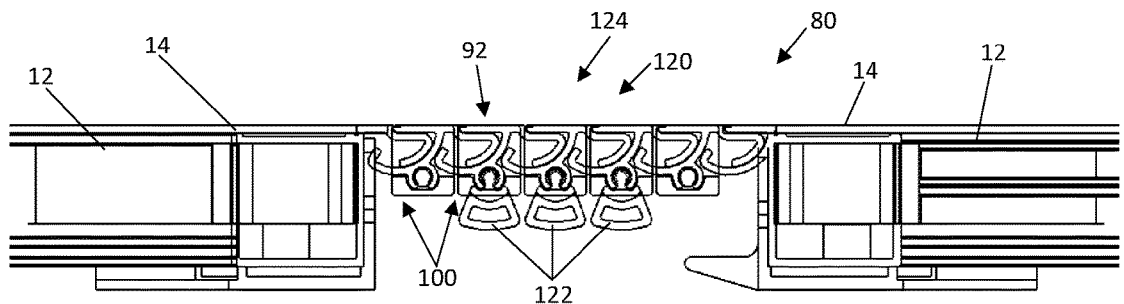
Figure 6C1
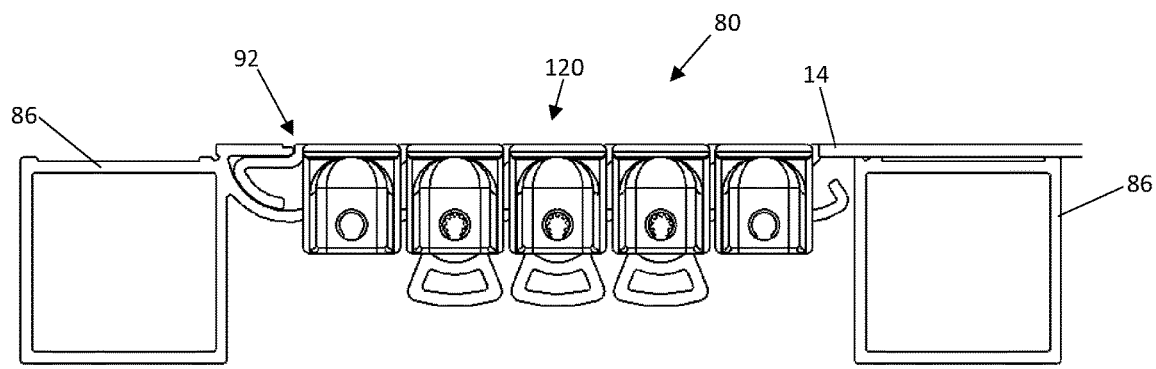
Figure 6C2
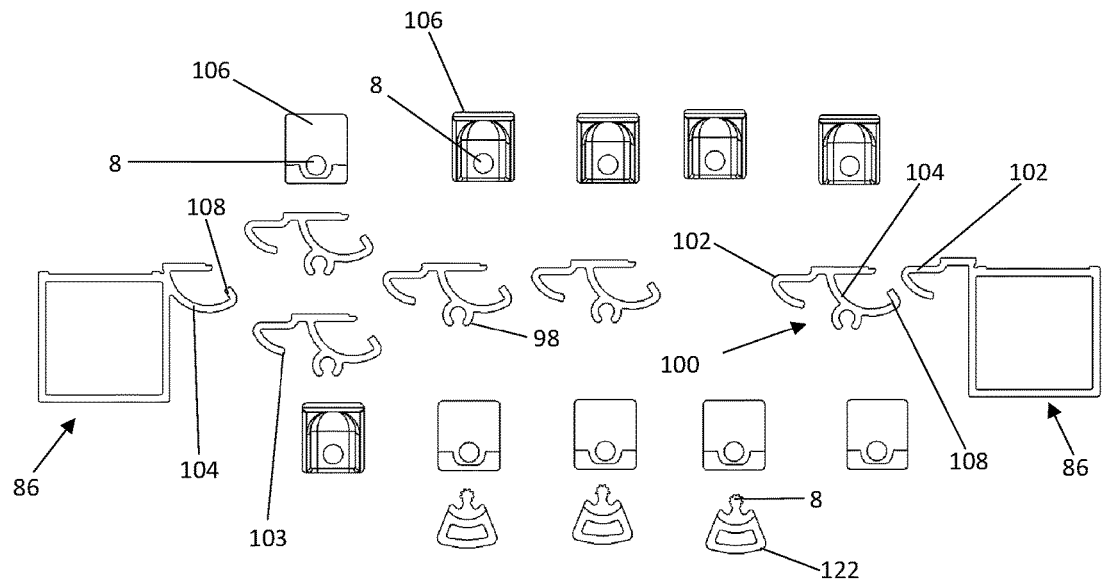
Figure 6C3

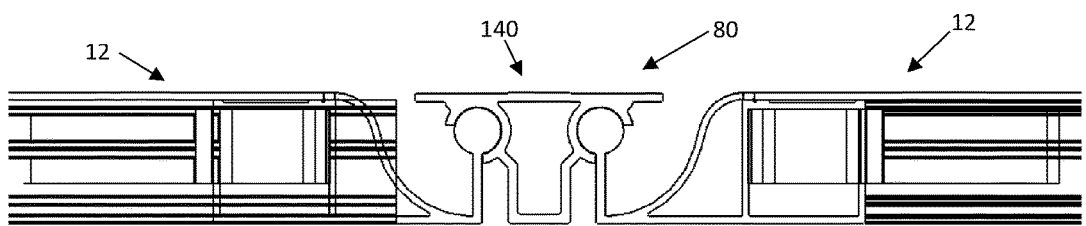
Figure 6D1
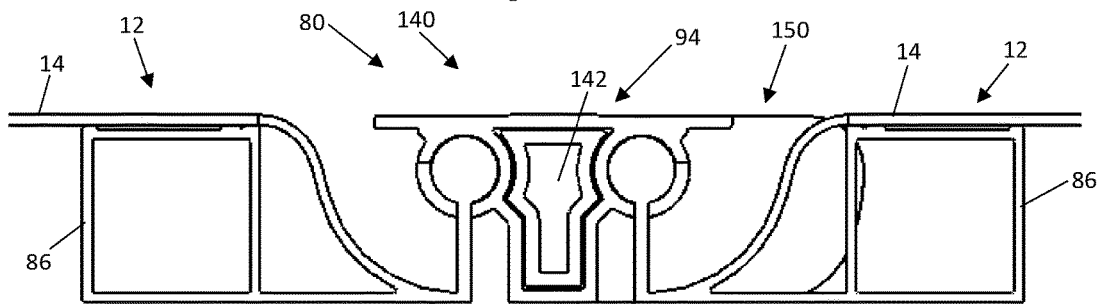
Figure 6D2
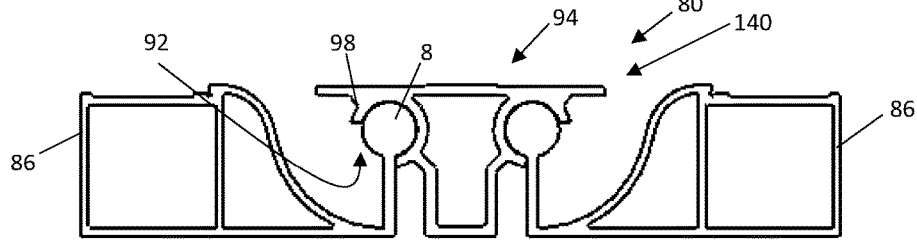
Figure 6D3
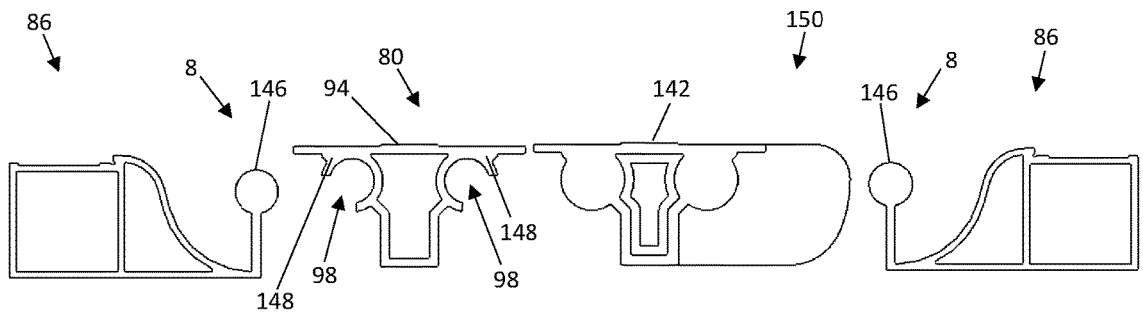
Figure 6D4

MULTI-HINGE TONNEAU COVER

FIELD

The present teachings relate to a tonneau system including one or more expansion links that assist one panel in rotating relative to another panel; one or more covers that extend over all or a portion of a cover and a hinge and/or assists in holding a hinge together, preventing fluid from penetrating through or around hinge joints, or both; one or more expansion caps that extend a hinge to a location proximate to or over a rail cap and/or a support rail; a standing hinge that lifts one or more panels as one panel is rotated relative to a second panel; one or more connectors that connect a tonneau to a vehicle and/or prevent longitudinal movement of a tonneau cover relative to a vehicle; one or more rotary locks that prevent a hinge from being vertically moved relative to a vehicle and/or vehicle bed when the tonneau cover is in the closed position; or a combination thereof.

BACKGROUND

Tonneau covers are typically added to beds of vehicles to close the bed of the vehicle. Some tonneau covers may be locked to prevent theft. Some tonneau covers may prevent the ingress of fluids and debris into the bed of the vehicle so that the contents of the bed may be maintained in a clean and dry state. Tonneau covers may be used with virtually any vehicle with a bed such as a truck, El Camino, UTV, SUV, any vehicle with a bed, or a combination thereof. Some tonneau covers may be found in U.S. Pat. Nos. D830,282; D830,283; 5,427,428; 9,333,842; 9,555,735; and 9,840,135 and U.S. Patent Application Publication No. 2018/0118004 all of which are expressly incorporated by reference herein for all purposes.

It would be attractive to have one or more expansion links that connect two or more panels together and each expansion link provides a specific amount of rotation of a first panel relative to a second panel. What is needed is a single cover that extends over all or a portion of a panel and a hinge so that the single cover prevents fluid from penetrating though the hinge; the cover holds the hinge together; the cover disconnects from the hinge, the panel, or both to facilitate movement of the hinge without restriction by the cover; or a combination thereof. It would be attractive to have a tonneau cover with hinges that include one or more expansion caps that extend a hinge to a location proximate to or over a rail cap, a support rail, or both. What is needed is a tonneau cover that includes one or more standing hinges that lift one or more panels from a rail cap, a header panel, or both so that the one or more panels are spaced a distance away from the rail cap, the header panel, or both when one of the tonneau covers is rotated relative to a second tonneau cover. It would be attractive to have one or more connectors that connects the tonneau cover to a vehicle and the one or more connectors are movably locked within a track so that the one or more transverse connectors are movable in a transverse direction while the one or more connectors prevent longitudinally movement of the tonneau cover. What is needed is a tonneau cover including one or more hinges that include one or more rotary locks that prevent the hinges from being lifted vertically when the tonneau cover is a closed position.

SUMMARY

The disclosure meets one or more of the needs by providing: a tonneau cover comprising: (a) a plurality of panels; (b) one or more hinges between each panel of the plurality of panels so that the plurality of panels are rotatably connected together, wherein some or all of the one or more hinges include: (i) a plurality of expansion links that are movably interconnected together, some of the plurality of expansion links including: (1) one or more expansion projections; (2) one or more pockets that receive all or a portion of the one or more expansion projections from an adjacent one of the plurality of expansion links; and (3) one or more expansion stops that restricts movement of the one or more expansion projections from the adjacent one of plurality of the expansion links that extend within the one or more pockets; wherein the one or more hinges rotate so that the one or more hinges form of angle of about 90 degrees or more and about 225 degrees or less.

The present teachings provide: a tonneau cover comprising: (a) a plurality of panels; (b) one or more hinges located between and connecting each panel of the plurality of panels; and (c) one or more covers extending over all or a portion of one or more of the plurality of panels and some or all the one or more hinges connecting the plurality of panels so that when the one or more of the plurality of panels rotate about the one or more hinges the one or more covers form a portion of the some or all of the one or more hinges and maintain the integrity of the some or all of the one or more hinges that include the one or more covers.

The present teachings provide: a tonneau cover comprising: (a) a plurality of panels; (b) one or more hinges located between and connecting each panel of the plurality of panels, (c) one or more expansion caps extending from some or all of the one or more hinges from a location inward of one or more vertical walls or rail caps of a bed of a vehicle to a location over or proximate to the one or more vertical walls or rail caps of the bed of the vehicle; wherein a top of the one or more expansion caps, a top of the plurality of panels, and a top of the one or more hinges are all planar and maintain the tonneau cover substantially flush when the tonneau cover is in a closed position.

The present teachings provide: a tonneau cover comprising: (a) a plurality of panels including at least a first panel and a second panel; and (b) one or more hinges located between and connecting each panel of the plurality of panels, at least one of the one or more hinges being a standing hinge located between the first panel and the second panel; wherein the standing hinge includes one or more rotary stands; wherein the tonneau cover has a closed position where all of the plurality of panels are coplanar and extend within a plane, and when the first panel is rotated about the standing hinge, the one or more rotary stands lift the first panel and the second panel a distance above the plane.

The present teachings provide: a tonneau cover comprising: (a) one or more panels including at least a header panel; (b) one or more tracks located within the header panel; and (c) one or more sliders connected to and movable along the one or more tracks, the one or more sliders being adapted to receive a tether that connects the tonneau cover to a vehicle so that the tonneau cover is prevented from moving relative to the vehicle.

The present teachings provide: a tonneau cover comprising: (a) a plurality of panels; (b) one or more hinges located between and connecting each panel of the plurality of panels; (c) one or more rotary locks located on a first side, a second side, or both sides of one or more of the one or more hinges, one of the plurality of panels, or both, the one or more rotary locks including: (i) one or more panel caps and (ii) one or more rail locks that create a lock with the one or more panel caps when the tonneau cover is in a closed position so that the tonneau cover is prevented from being opened proximate to the one or more hinges where the one or more rotary locks are located.

The present teachings provide one or more expansion links that connect two or more panels together and each expansion link provides a specific amount of rotation of a first panel relative to a second panel. The present teachings provide a single cover that extends over all or a portion of a panel and a hinge so that the single cover prevents fluid from penetrating though the hinge; the cover holds the hinge together; the cover disconnects from the hinge, the panel, or both to facilitate movement of the hinge without restriction by the cover; or a combination thereof. The present teachings provide a tonneau cover with hinges that include one or more expansion caps that extend a hinge to a location proximate to or over a rail cap, a support rail, or both. The present teachings provide a tonneau cover that includes one or more standing hinges that lift one or more panels from a rail cap, a header panel, or both so that the one or more panels are spaced a distance away from the rail cap, the header panel, or both when one of the tonneau covers is rotated relative to a second tonneau cover. The present teachings provide one or more connectors that connects the tonneau cover to a vehicle and the one or more connectors are movably locked within a track so that the one or more transverse connectors are movable in a transverse direction while the one or more connectors prevent longitudinally movement of the tonneau cover. The present teachings provide one or more hinges that include one or more rotary locks that prevent the hinges from being lifted vertically when the tonneau cover is a closed position.

BRIEF DESCRIPTION OF THE DRAWINGS

FIG. 6A1 is a close-up view of FIG. 5 in box VIA.
FIG. 6A2 is a close-up side view of a hinge.
FIG. 6A3 is an exploded view a hinge.
FIG. 6B1 is a close-up view of FIG. 5 in box VIB.
FIG. 6B2 is a close-up view of a hinge.
FIG. 6B3 is an exploded view of a hinge.
FIG. 6C1 is a close-up view of FIG. 5 in box VIC.
FIG. 6C2 is a close-up view of a hinge.
FIG. 6C3 is an exploded view of a hinge.
FIG. 6D1 is a close-up view of FIG. 5 in box VID.
FIG. 6D2 is a close-up view of a hinge with a rotary stand.
FIG. 6D3 is a close-up view of a hinge without a rotary stand (not shown).
FIG. 6D4 is an exploded view of a hinge.

DETAILED DESCRIPTION

Figure 1:
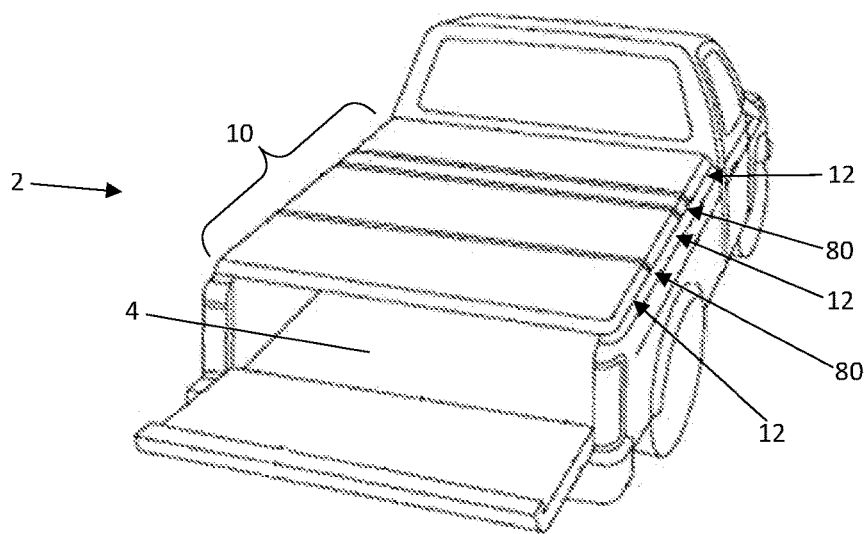
FIG. 1 is a perspective view of a truck and a tonneau cover.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The vehicle as discussed herein may be any vehicle that has an open area, which may be covered. The open area, preferably, is a bed. The vehicle may be a truck, a trailer, El Camino, a UTV, ranchero, Gladiator, or a combination thereof. Preferably, the vehicle is a truck or a pickup truck. The vehicle may have one bed. The bed may function to store and carry articles. The bed may carry virtually any article that may fit within the bed. The bed of the vehicle may be an open area for storing items. The bed may be 1 m or longer, 1.5 m or longer, or 2 m or longer. The bed may be 3 m or less or 2.5 m or less. The bed may be connected to one or more tonneau covers via one or more connectors.

The one or more connectors may prevent longitudinal movement of the tonneau cover relative to the vehicle. The connector may tether the tonneau cover to a bed of a vehicle, a fastener, or both. The connector may connect to one or more fasteners. The connector may be adjustable. The connector may connect to a fastener or a fastener may connect one or more parts of the tonneau cover together. The connector may be part of a tonneau connector or include a tonneau connector. The connector and the fastener may be directly connected together. Preferably, the connector and the fastener may be indirectly connected together.

The one or more fasteners may function to connect two or more parts of a tonneau cover together. The fastener may be part of the vehicle. A tether, connector, tonneau connector, the tonneau cover, or a combination thereof may connect to a connector of the vehicle to restrict movement of the tonneau cover. The one or more fasteners may connect a header panel, a header guide, a header cap, a spacer cap, an expansion cap, or a combination thereof to a panel, a hinge, or both. The one or more fasteners may fit within a track. The one or more fasteners may act as a stop. The one or more fasteners may restrict movement within a track. The one or more fasteners may be threaded. The one or more fasteners may be a screw, nut, bolt, pin, locking member, "T" shaped, "L" shaped, have a head that fits within the track, have a head that is located outside of a track, or a combination thereof. Preferably, the one or more fasteners, tonneau connectors, or both may assist in connecting a header panel to a side rail, a rail cap, a support rail, or a combination thereof. The one or more fasteners may prevent or restrict movement of the rail cap, the support rail, or both relative to a header panel (e.g., restrict movement to 1 cm or less or 0.5 cm or less).

The rail cap may function to connect to a top of the vehicle, a top of a bed, or both and create a support structure the tonneau cover, one or more panels, or both. The rail cap may extend above an original rail cap. The rail cap may replace an original rail cap. For example, an original rail cap may be removed and an aftermarket rail cap attached in its place. The rail cap may create a recess so that the tonneau cover when in a closed position a top of the tonneau cover is flush or sub flush with a top of the rail cap, a top of a side of a bed, or both. The rail cap may attach to a wall of a bed and assist in connecting the panels to the bed, assist in removing fluid, or both. The one or more rail caps may be connected to the vehicle via clamps, holes in stake pockets, holes in the sidewalls, or a combination thereof. The rail caps may be flush mounted. Each side of the vehicle may include a rail cap. The tailgate of the vehicle may include a rail cap. The rail caps may taper from a front end towards a rear end. The rail caps may direct fluid through the stake pockets, an end of the vehicle, out of recesses, through the tailgate, or a combination thereof. The teachings of the rail cap as found herein including the teachings found in application Ser. Nos. 62/640,799 and 16/296,578 are expressly incorporated by reference herein for all purposes including those of connection, fluid management, flushness, sub- flushness, or a combination thereof. The one or more rail caps may be part of a support rail or used with a support rail. A support rail may connect the tonneau cover to a vehicle bed, a vehicle, a side wall of a bed, or a combination thereof instead of a rail cap.

The one or more support rails may function to support one or more sides and/or edges of a tonneau cover. The one or more support rails may extend over an original rail cap. The one or more support rails may be connected to the vehicle, the bed, or both via one or more fasteners, clamps, or both. The one or more support rails may connect to and extend along a side of a bed. All or a portion of the one or more support rails may extend into a vehicle bed. The one or more support rails may have a portion that extends over a top of a side wall of a bed. The one or more support rails may be located below a top plane of the bed so that the tonneau cover may be flush or sub-flush when the tonneau over is in a closed position. The one or more support rails may include one or more channels that remove fluid, prevent fluid from entering a vehicle bed, or both. The one or more support rails may include one or more seals that form a seal with the tonneau cover to prevent fluid and debris from entering the bed. The one or more support rails may extend an entire length of a bed of a vehicle. The one or more support rails may contact a first side, a second side, or both sides of one or more panels of a tonneau cover and preferably both sides of a tonneau cover.

The one or more tonneau covers may function to enclose all or a portion of a bed. The one or more tonneau covers may lock items within a bed. The one or more tonneau covers may prevent fluid, debris, or both from entering into the bed. The one or more tonneau covers may include one or more panels. The tonneau cover when in a closed position may prevent fluid, debris, or both from entering a bed and may protect the contents of the bed. The tonneau cover when in a stored position may allow for ingress and egress into and out of the bed, the contents to be accessed, or both. The tonneau cover fold and be stored substantially vertically behind a rear window of a cab. The tonneau cover may be a plurality of panels that are connected together via one or more hinges. The plurality of panels may each be movable between a stored position and a closed position.

The tonneau cover in a closed position may function to cover all or a portion of a bed and preferably a bed of a vehicle so that the contents of the bed may be protected, covered, or both. The closed position may be where one or more panels of the tonneau cover extend in a plane, in a plane parallel to a bottom of a bed, cover a portion of a bed, or a combination thereof. When all of the panels are in the closed position the bed may be entirely covered, locked, substantially fluid resistant, or a combination thereof. When the panels are in the closed position the panels may be coplanar. Some panels may be in a closed position and some panels may be in a stored position. For example, a tail panel may extend over a central panel so that a very end of a bed may be exposed while the rest of the bed remains covered.

The stored position may function to expose all or a portion of a bed so that contents of the bed may be accessible. The stored position may be where one or more panels are moved relative to one or more other panels into a nested configuration, a stacked configuration, or both. The stored position may be where one panel is rotated over another panel. The stored position (e.g., fully stored position) may be where two or more, three or more, or four or more panels are stacked one over another and then turned on end so that substantially all of the bed is exposed. The stored position may be where a stack of panels extends generally parallel to the rear of a vehicle (e.g., ±15 degrees or less, ±10 degrees or less, about ±5 degrees or less, or about ±1 degree or more). For example, the panels in a fully stored position may be angled towards a rear of a vehicle or a rear of a vehicle cab. The fully stored panels may rotate beyond 90 degrees and may rest upon the one or more bumpers and the one or more bumpers may prevent further rotation of the panels. The fully stored panels may be where a tail panel and three central panels are in a generally parallel position and then turned on end to extend generally vertically above a header panel.

The panels may function to movably connect together to enclose a bed and to move so that the bed is accessible to a user. The tonneau cover may include two or more panels, three or more panels, four or more panels, or even five or more panels. The tonneau cover may include a header panel, a tail panel, and one or more panels therebetween. The tonneau cover may include one or more panels, two or more panels, three or more panels, or four or more panels between the header panel and the tail panel. The panels between the header panel and the tail panel may be central panels. The central panels may include a first central panel, a second central panel, a third central panel, or a combination thereof. The header panel may be a panel that connects the tonneau cover to the vehicle. The header panel may not be located at an end of the tonneau cover. The panels in a closed position may all be located within a single plane. The panels may be connected together and rotatable relative to each other. The panels may be rotated so that one panel is located above another panel in a stacked configuration. The panels may each include a core, an upper cover, a lower cover, or a combination thereof. The panels may be connected to the hinges by a fame, a cover, one or more links, or a combination thereof. The panels may have an upper cover that extends along an all or a portion of the panel and then over all or a portion of a hinge. The panels may have a lower cover that extends along all or a portion of rear surface of a panel and stops before covering the hinge. The lower cover may cover a portion of a hinge.

The one or more covers may function to hold a hinge together, seal a hinge, prevent fluid from entering a hinge, support a first panel above a second panel, or a combination thereof. The one or more covers may extend from a first panel across all of the panels and hinges and terminate at an end of a last panel. The one or more covers may extend across one panel and one hinge. The cover may extend across one or more of the hinge joints or all of the hinge joints. The cover may have a connection location on each of the hinges. Preferably, the cover may have a connection location on each of the hinge joints of a hinge. The cover may connect to each of a plurality of hinge joints of a hinge and the cover may permit movement between each of the hinge joints, but the cover may maintain all of the hinge joints connected together so that the hinge joints create a movable hinge. The cover may connect the panels to a hinge so that the hinge is movable relative to the panels. A rotary stand may be connected to the panels or held in place relative to the panels by a cover. The cover may have a connection location on each of the spacer bars. Preferably, an upper surface of a hinge joint, a spacer bar, a rotary stand or a combination thereof have a connection location with a cover. The one or more covers may be made of a flexible material. The one or more covers may be made of an abrasion resistant material. The one or more covers may be folded or bent without failing. The one or more covers may be folded or bent 1,000 times or more, 10,000 times or more, 50,000 times or more, 100,000 times or more, 250,000 times or more, 500,000 times or more, or even 1,000,000 times or more without failing. For example, the cover may be folded to angle of about 180 degrees so that a first part extends over a second part without the folded region (e.g., a region connecting the first part to the second part) breaking, failing, tearing, separating a first portion from a second portion, or a combination thereof. The cover may be folded without the connection locations disconnecting from a hinge, a panel, a hinge joint, spacer bar, rotary stand, or a combination thereof.

The one or more covers may be made of or include a synthetic material, natural material, rubber, an elastomer, thermoplastic, a polyolefin, a vulcanized material, vinyl, or a combination thereof. Preferably, the cover is made of or includes a thermoplastic vulcanizate (TPV) or a thermoplastic polyolefin (TPO). The cover may include or be connected by a thermoplastic adhesive, a thermoplastic adhesive polymer resin, or both. The cover adhesive may be made of or include a CoPolyamide, CoPolyester, Polyolefin, Ternary, Polypropylene, Polyruethane, or a combination thereof. The adhesive may be activated by heat, radio frequency (e.g., RF or HF), ultrasound, moisture, pressure, or a combination thereof. One example of an adhesive that may be used is created by Spunfab®, the teachings of which are expressly incorporated by reference herein for all purposes. The one or more covers may have a thickness of about 5 mm or less, about 3 mm or less, about 1 mm or less, about 0.5 mm or less, or about 0.1 or less. The one or more covers may have a thickness of about 0.025 mm or more (e.g., 1 thousandth), about 0.05 or more, or about 0.07 or more. The cover may be a continuously applied to the panels and self-adhere to the panels during the application process. The cover may be connected by a separate adhesive that is applied to the cover and the panels, the hinges, or both. The cover may be a film that overlays all or a portion of the tonneau cover and is connected to all or a portion of the tonneau cover. Preferably, the cover forms one continuation surface that covers an entire area of a tonneau cover (e.g., all of the hinges and all of the panels). More preferably, the cover extends over all of the joints, slats, folding regions, moving regions, hinge joints, or a combination thereof so that one continuous surface is created. The cover may be connected to all or portions of the tonneau cover (e.g., panel or hinges) and disconnected from portions of the tonneau cover (e.g., panels or hinges).

The connection locations may function to connect the cover to all or a portion of a panel, all or a portion of a hinge, or both. The connection locations may be at any location along a panel, a hinge, or both. The connection locations may connect the cover to about 50 percent or more, about 60 percent or more, about 70 percent or more, about 80 percent or more, about 90 percent or more, about 95 percent or more, or about 97 percent or more of a panel, a hinge, or both. The connection locations may connect the cover to about 99 percent or less, about 98 percent or less, about 95 percent or less, or about 93 percent or less of a panel, a hinge, or both. The panel and cover may entirely be connected by connection locations and may be free of any disconnection locations. The cover may include connection locations at every location along a panel and may be free of connection locations at a transition from the panels to hinges. The connection locations may be mechanical attachment or chemical attachment of a cover to a hinge, a panel, or both. The connection locations may be formed by a screw, a bolt, staple, a flange, or a combination thereof that extend over or through a cover to connect the cover to a panel, a hinge, or both. Preferably, the connection locations are formed by a liquid or solid adhesive. The connection locations may be formed by applying an adhesive between the panel, the hinge, or both and the cover. The adhesive may be a liquid adhesive that dries, cures, or both. The adhesive may be cured with heat, radio frequency (e.g., RF or HF), ultrasound, moisture, pressure, or a combination thereof that connects the cover to the panel, the hinges, or both. The adhesive may create a connection location that is rigid. The adhesive may create a connection location that has some elastomeric characteristics. For example, the cover may move relative to the panel, the hinge, or both by stretching the adhesive if a force is applied to the cover. The connection locations may hold the cover to the panel, the hinge or both so that the cover is immovable relative to the panel, the hinges, or both. The connection locations may maintain the cover generally parallel to the panels, the hinges, or both when the tonneau cover is in a closed position. The connection locations may maintain contact with the panels, the hinges, or both when the tonneau cover is moved and the disconnection locations of the cover may move relative to the panel, the hinges, or both when the tonneau cover is moved between a stored position and a closed position.

The one or more disconnection locations may function to be free of a connection or a permanent connection with the panel, the hinge, or both at a location proximate to or under the cover. The disconnection locations may temporarily connect to the hinge, the panel, or both but may disconnect when the panels are moved from a closed position to a stored position. For example, the disconnection locations may be temporarily connected via surface tension, tackiness, magnets, or a combination thereof, but the temporary connection may be overcome so that the cover is disconnected from the panels, hinges, or both. The disconnection locations may be regions (e.g., disconnection regions) on the panels, the hinges, or both and may function to assist in guiding fluid from a hinge joint. The disconnection locations may both assist in movement of the hinge joints and removal of fluids. The one or more disconnection locations be free of a mechanical connection, a chemical connection, or both. Preferably, the one or more disconnection locations may be free of adhesive. The disconnection locations may permit the cover to move relative to hinges, panels, or both in the stored position, the closed position, or both. The disconnection locations may permit movement of the cover relative to the hinges, the panels, or both when the tonneau cover is being moved toward a stored position or from a stored position. The one or more disconnection locations may extend over a hinge, over a panel, or both but the cover may move relative to the hinge, the panel, or both at a location proximate to the respective hinge, panel, or both. The disconnection locations may be where the cover may move, fold, or both relative to a hinge, a panel, or both. For example, when a first panel is folded relative to a second panel, a length of the hinge may be reduced due to some of the hinge (e.g., hinge joint) extending behind another part of the hinge and the cover may bend, fold, arc, bunch or a combination thereof to permit a portion of a hinge to extend behind another portion of a hinge. The disconnection locations may release from a portion of the hinge to accommodate for an increase or decrease in length of a hinge when the hinge moves between a stored position and a closed position. For example, when an extended hinge moves from a closed position to a stored position a length of hinge exposed may decrease so that the cover disconnects from the decrease in length to prevent a force from being applied on the cover. The disconnection location may be located between the spacer bars, above a hinge step, above a top surface of an expansion projection, or a combination thereof. The disconnection location may be at a hinge connector. The disconnection locations may be at a joint that is movable (e.g., between a panel and a hinge, between hinge joints, or both). The disconnection location may be a region between a top surface of a spacer bar and a location of a panel located above a frame of a hinge. The cover may extend over a space where there is a gap located between the hinge and cover. A disconnection location may extend an entire width of a tonneau cover (e.g., a width of a vehicle). The disconnection location may extend in a straight line (e.g., a first edge of a tonneau cover to a second edge of a tonneau cover). The disconnection location may be pulled flat when the tonneau cover is moved from a stored position to a closed position so that the cover appears seamless. The disconnection location may bunch when the tonneau cover is moved from a closed position to a stored position. The disconnection locations may be located at or between any of the panels. The disconnection locations may be located between the header panel and a central panel, two central panels, a central panel and a tail panel, or a combination thereof.

The header panel may function to connect the tonneau cover to a vehicle. The header panel may function to support the other panels when the panels are moved into a stored position. The header panel may connect to a rail cap, a support rail, or both and be free of rotation, longitudinal movement, lateral movement, or both. The header panel may form a base that the other panels are rotated unto so that the panels are stored along a forward region of a vehicle bed, behind a cab of a vehicle, or both. The header panel may span a width of a bed. The header panel may connect to the vehicle with header guides, connectors, tonneau connectors, or a combination thereof. The header panel may extend to a forward most end of a vehicle bed proximate to a cab of the vehicle. The header panel may include one or more header caps.

The one or more header panels may extend a header panel over a rail cap, a support rail, or both. The one or more header panels may cap an extruded portion of a header panel. The one or more header panels may be extruded, made of plastic, metal, or a combination thereof. The header panels may be sufficiently strong to support the weight of the other panels when the panels are moved into a stored position. The header cap may be made of metal, plastic, or both. The header panel may have one or more header caps at each end of the header panel.

The header cap may cover the ends of the header panel. One or more header caps may be located at each end of the header panel. The header caps may extend over or connect to a rail cap, a header panel, or both. The header caps may enclose all or a portion of a recess or a header recess within the header panel. The header cap may lock a connector within the header recess, a track, or both.

The header recess may function to create a void in the header panel, create a connection location for a header recess to connect to a hinge or an adjacent panel. The header recess may receive a portion of a hinge. The header recess may allow a panel, a central panel, a hinge, or a combination thereof to move relative to the header panel. The header recess may extend a width of the header panel. The header recess may be enclosed within the header panel when the header caps are connected to the header panel. The header recess may form a track in the header panel that a connector is located within. The header recess may allow for lateral movement of a connector. The header recess and the header guide recess may assist in connecting the header panel to the vehicle bed so that the tonneau cover is maintained in a fixed position once connected to the vehicle.

The header guide recess may function to receive a fastener, a header guide, a header guide connector to create a connection between the rail cap, the support rail, a vehicle bed, a side wall of a vehicle bed, or a combination thereof. The header guide recess allows the header guide to laterally move into an engagement with a rail cap, a support rail, or both. The header guide recess may extend an entire width of the header panel. The header guide recess may be one or more segments, two or more segments, three or more segments, or four or more segments. The header guide recess may be located within side regions of the header panel and not extend in a middle or central portion of the header panel. The header guide recess may have a "T" shape so that a fastener (e.g., a header guide connector) may not be removed once the fastener is extended into the header guide recess, but the fastener may be movable along the header guide recess. The header guide recess may directly receive a portion of the header guide. The header guide recess may be a track that the header guide, the header guide connector, or both may move along to connect the header panel to the bed. The header guide recess may receive a fastener or a connection device that connects the header guide to the header guide recess.

The header guide may function to prevent the header panel from being vertically lifted. The header guide may extend under a portion of a rail cap, a support rail, or both to prevent the header panel from being lifted, opened, moved, or a combination thereof. The header guide may slide under the rail cap, the support rail, or both to create a connection. The header guide may be made or metal, plastic, a polymer, or a combination thereof. The header guide may be sufficiently rigid to prevent movement of the header panel relative to the truck bed. The header guide may include one or more header guide connectors.

The one or more header guide connectors may connect a header guide to a tonneau cover, a header panel, a header guide recess, or a combination thereof. The one or more header guides may be a monolithic part of the header guide, may be a unitary part, may be added to the header guide, or a combination thereof. The one or more header guides may have a complementary fit to the header guide recess. The one or more header guide connectors may extend within the header guide recess so that the header guide is suspended from the header panel. The header guide connectors may be a fastener. Preferably, the header guide connectors and the header guide are a same device (e.g., one monolithic piece). The header guide connector may extend from the header guide and the header guide may hang below the header guide connector. The header guide connectors may be restricted from movement by a fastener that is located within the header guide recess. The header guide connectors may extend along the header guide recess until the header guide connectors contact a fastener that restricts movement of the header guide connector. The header guide connector may be moved into a locked position and then locked in place by a fastener restricting movement of the header guide connector within the header guide recess. The one or more header guide connectors may include one or more ears.

The one or more ears function to retain the header guide connector within the header recess. The one or more ears may be one circular ear that prevents removal of the header guide connector. The one or more ears may extend from opposing sides of the header guide connector. The one or more ears may extend from four quarters of the header guide connector. The one or more ears may be spaced apart by about 30 degrees or more, about 45 degrees or more, or about 60 degrees or more. The one or more ears may be spaced apart by about 180 degrees or less, about 150 degrees or less, about 125 degrees or less, or about 90 degrees or less. The one or more ears may have a length that is about 5 degrees or more, about 10 degrees or more, about 20 degrees or more relative to a circumference or perimeter of the header guide connector. The one or more ears may have a length that is about 90 degrees or less, about 60 degrees or less, about 45 degrees or less, or about 30 degrees or less relative to a circumference of perimeter of the header guide connector. The ears may slide upon walls (e.g., the walls may form a track) of the header guide connector but may restrict or prevent the header guide connector from being removed from the header recess. The header guide connector may include one or more ears upon a top so that the header guide connector is spaced within the guide recess, the ear contacts a rear side of a top surface of a guide recess, or both. The ears may retain the header guide connector within the header guide recess even when the header guide connector is rotated within the header recess. The ears may assist in creating tension between the header guide and the rail cap or support rail so that the seal is compressed by the panels, the hinges, the expansion caps, or a combination thereof. For example, the ears may connect the header guide to the header panel and when the header guide is in contact with a rail cap or a header panel the connection may pull the header panel down towards the rail cap or the header panel compressing a seal.

The one or more seals may function to prevent fluid, debris, or both from passing into an internal location under the tonneau cover. The one or more seals may be elastomeric. The one or more seals may be compressible. The one or more seals may be connected to or extend into a rail cap, a support rail, or both. The seal may be pressed into the rail cap, the support rail, or both to connect the seal thereto. The one or more seals may have one or more lines of contact. The one or more seals may have a cross-sectional shape that is "0"-shaped, "D"-shaped, oval, square, rectangular, diamond, shaped, or a combination thereof. The seal may be made of or include an elastomer. The seal may be made of an elastically deformable material that bounces back when the tonneau cover is in a stored position. The one or more seals may have more than one contact locations or lines of contact. The one or more seals may have a body portion that creates a seal and one or more seal fingers that assist in creating a seal.

The one or more seal fingers function to create a first barrier against fluid penetration. The one or more seal fingers may extend outward into contact with a bottom of a panel to create a seal. The seal fingers may extend outward from the seal. The seal fingers may extend above a plane of a top of a seal. The seal finger may be compressed with the seal when the panel contacts the seal. A channel may be formed between the seal, the seal finger, or both and a rail cap, a support rail, or both.

The channel may function to divert water from the tonneau cover, the rail cap, the support rail, or a combination to an external location so that the water is prevented from entering the tonneau cover. The channel may extend along an entire length of the tonneau cover. The channel may extend along a portion of a length of the tonneau cover. The channel may direct fluids into the stake pockets, out a tail gate, out a fluid channel through a rail cap, through a support rail, or a combination thereof. The channels may be located between a vertical wall of a rail cap, a vertical wall of a support rail, or both and a seal. The channel may be located entirely or partially under a panel, a hinge, an expansion cap, or a combination thereof. At least a portion of the channels may extend under a central panel.

The one or more central panels may cover a central portion of a bed. The one or more central panels may be located between a header panel and a tail panel. The one or more central panels may be a panel that is folded. The one or more central panels may be a first panel, second panel, third panel, fourth panel, or a fifth panel. The one or more central panels preferably, are middle panels that are not a first or a last panel of a tonneau cover. The tonneau cover may include only one central panel. The tonneau cover may include two central panels. The tonneau cover may include three central panels. The central panels may include a first central panel, a second central panel, and a third central panel. One or more of the central panels may support the other panels when the tonneau cover is converted into a stored position. The one or more central panels may be prevented from being vertically lifted when the one or more central panels are in a closed position. The one or more central panels may be connected by one or more hinges. The one or more central panels may be in communication with one or more tail panels.

The one or more tail panels function to end the tonneau cover, create a seal with a tailgate, or both. The one or more tail panels may extend over a tailgate, into communication with a tailgate, a rail cap of a tailgate, a support rail of a tailgate, or a combination thereof. The one or more tail panels may contact with the side walls and the tailgate. The one or more tail panels may lock a tonneau cover to a tailgate. The one or more tail panels may be a first panel rotated when the tonneau cover is moved from a closed position to a stored position. The tail panels may be the last panels moved when a tonneau cover is moved from a stored position to a closed position. The tail panels may include one or more tail extensions to extend the tail panel to a tailgate or over a tailgate.

The one or more tail extensions function to extend the tail panel over a tailgate. The one or more tail extensions may assist in locking a tonneau cover to a bed of a vehicle. The one or more tail extensions may mirror a shape of a tailgate. The one or more tail extensions may be straight, rounded, mirror the shape of the tailgate, be arcuate, or a combination thereof. The one or more tail extensions may form a terminal edge or may include one or more terminal edges.

The terminal edges of the tonneau cover may function to define the perimeter or area of the tonneau cover. The terminal edges of the tonneau cover may extend over a sidewall of a vehicle bed, a support rail, a rail cap, inside of the sidewalls of the vehicle bed, inside of the rail cap, inside of the support rail, or a combination thereof. The terminal edge may be located inside of the bed so that the tonneau cover may be flush or sub-flush. The panels, the hinges, the expansion caps or a combination thereof may all include one or more terminal edges.

The one or more hinges function to move or permit movement so that an interior of a bed of a vehicle is exposed or enclosed. The one or more hinges may function to permit one panel to move relative to another panel. The one or more hinges may rotate a panel about 90 degrees or more, about 135 degrees or more, about 180 degrees or more, about 181 degrees or more, or about 182 degrees or more relative to a second panel. The one or more hinges may rotate a panel about 270 degrees or less, about 225 degrees or less, about 190 degrees or less, or about 185 degrees or less relative to a second panel (e.g., about 181 to about 184 degrees). The hinges may support one end of a panel relative to a second panel. For example, when a first panel rotates over the second panel the hinge may support the first panel and maintain a gap between the first panel and the second panel. The hinges may form a cantilevered support. The hinges may connect a first panel to a second panel. The hinges may be a plurality of hinges. One hinge may connect each panel together. All of the hinges of the tonneau cover may be of a same style or type. Every hinge may be of a different style or type. The tonneau cover may include more than one style or type of hinge. The hinges may be an extended hinge, a hemispherical hinge, standing hinge, or a combination thereof. For example, if a tonneau cover has five panels the tonneau cover may have four different hinge types or styles. In another example, some of the hinges may include one or more header links, one or more panel links, or both.

The one or more header links, panel links, or both may function to connect to an end of a hinge to a panel and preferably a header panel, first panel, or both. The one or more header links, panel links, or both may connect a header panel to a first panel. The one or more header links, panel links, or both may extend from a first panel towards a second panel or vice versa. The one or more header links, panel links, or both may be directly connected to a panel. The one or more header links, panel links, or both may be connected to a frame that is connected to a panel. The one or more header links, panel links, or both may be part of a panel. The one or more header links, panel links, or both may be a monolithic part of a panel. For example, the header link, panel links, or both and panel may be formed at the same time of the same material. The one or more header links, panel links, or both may extend parallel to a top of the tonneau cover. A header link of a first panel may extend outward and contact a panel link of a second panel so that rotation of a first panel is prevented relative to a second panel, the first and second panel are stopped in a coplanar position, or both. The header links, panel links, or both may be sufficiently long so that when a header link of a first panel contacts a panel link of a second panel the first panel and the second panel are generally planar. Both panels may include panel links. A header link may be a panel link that is connected to a header panel. A header link may be connected to a header panel and a panel link may be connected to a panel and the header link and the panel link may be identical, mirror images of each other, or both. The header link, panel link, or both may include one or more frames.

The one or more frames may function to connect a header link, a panel link, or both to a respective panel. The one or more frames may function to connect a hinge and a panel together. The one or more frames may be located on an interior of a panel. The one or more frames may be located between two covers (e.g., a top cover and a bottom cover). The one or more frames may be connected to a core of a panel (e.g., a rigid piece that is located between the top cover and the bottom cover). The one or more frame may be a box, a rectangle, hollow, solid, have an open end, have a closed end, receive a portion of the core, have a smooth surface that faces the covers, have a recessed surface, have recesses that receive excess adhesive, or a combination thereof. The frame when connected to the covers, the core, or both may become rigid relative to the cover, the core, or both. The frame may rigidify the panel, a terminal edge or a panel, a location of a panel in contact with a hinge or that is part of a hinge, or a combination thereof. The frame may be rotationally static, longitudinally static, or both. One or more panels may be free of a frame. The panels may include a monolithic frame. The frame may be added into a panel, part of a construction of a panel, or both. The frame may be connected to or include, a header link, a panel link, a hinge joint, a pocket, an expansion stop, a rotation stop, an expansion projection, a ball, a socket, a recess in a top surface, a recess in a bottom surface, or a combination thereof. One style of hinges may include a frame with a panel link or a header link extending from the frame and one or more rotation stops located at an end of the header link, the panel link, or both.

The one or more rotation stops function to maintain two panels in a generally planar relationship relative to each other. A first rotation stop functions to contact a second rotation stop to limit movement of a first panel relative to a second panel. The rotation stops may be located at ends of the header link, the panel link, or both. The rotation stops and panel links, header links, or both may form a generally "L" shape. The rotation stops may have a terminal end with a bulbous portion. The bulbous portion may assist in mating two rotation stops together. The rotation stops may be sufficiently rigid so that two panels are maintained in a planar relationship when the tonneau cover is in a closed position. A first rotation stop and a second rotation stop when in contact may restrict movement of two panels relative to each other in a first direction but may allow movement in a second direction. The rotation stops may be located between any panels listed herein (e.g., a header panel, tail panel, central panels, or a combination thereof). Preferably, the rotation stops are located between a header panel and first panel and extended hinges are located between other panels.

The one or more extended hinges function to connect two panels together. The one or more extended hinges function to support one or more panels above a plurality of intervening panels. The extended hinge may support a third panel above a first panel, second panel, fourth panel, or a combination thereof. The extended hinge may support one panel above three other panels. An extended hinge may connect a panel (e.g., third) to another panel (e.g., fourth) and create a space between the panels that is sufficiently large so that one or more and preferably two or more panels may fit between the panel and the another panel. The extended hinges may separate two panels by a distance. The distance may be equal to a thickness of one panel, a thickness of two panels, a thickness of three panels, a thickness that is slightly larger than one panel, slightly larger than two panels, slightly larger than three panels, slightly larger than four panels (e.g., 1 mm or more, 3 mm or more, 1 cm or less, 7 cm or less); or a combination thereof. The extended hinges may support one panel generally parallel to one or more other panels (e.g., within about ±5 degrees, about ±3 degrees or about ±1 degree). The extended hinges may support a first end of a panel generally parallel to one or more panels. The extended hinges may support a panel so that a gap is created between two generally parallel panels (e.g., 1 mm or more, 2 mm or more, 5 cm or less, 3 cm or less). The extended hinge may span a distance of 10 cm or more, about 15 cm or more, or even about 20 cm or more. The extended hinge may span a distance of about 50 cm or less, about 40 cm or less, about 30 cm or less, or about 25 cm or less. The extended hinge may include one or more spacer bars. The extended hinge may be free of spacer bars. The extended hinge may be a combination of spacer bars and hinge joints connected together. The extended hinge may be only hinge joints. Preferably, the extended hinge has between about 3 and 7 hinge joints (e.g., the hinge joints may be expansion links connected together) and one spacer bar.

The one or more hinge joints may function to permit one portion of a hinge to move relative to another portion of a hinge (e.g., an expansion link to rotate relative to another expansion link). The one or more hinge joints may be part of a hinge, an extended hinge, an expansion link, a hemispherical hinge, a standing hinge, or a combination thereof. The one or more hinge joints may be a location where two or more hinge components connect together or are movable relative to each other. The hinge joints may be a ball and socket. The hinge joints may have a portion of one hinge portion (e.g., an expansion link) located inside of and movable relative to another hinge portion. The one or more hinge joints may a location where two expansion links are connected together and the expansion links move relative to each other. The one or more expansion links may move relative to each other so that a length of the hinge joint changes (e.g., expands or contracts). The one or more hinge joints may be between two expansion links, a spacer bar and an expansion link, an expansion link and a panel and/or frame, or a combination thereof. The one or more hinge joints may be part of a frame, a panel, a spacer bar, an expansion link, or a combination thereof when a connection between two parts of a hinge is created.

The one or more spacer bars may function to elongate or increase a distance that the extended joint covers or extends. The one or more spacer bars may be added in place of expansion links. The one or more spacer bars may support expansion links located on a first side, on a second side, or both sides of the one or more spacer bars. The one or more spacer bars may have a dimension (e.g., width (e.g., a dimension of the spacer bar that extends along a length of a bed)) that is substantially equal to a thickness of a number of panels, a thickness of panels stacked one over another (e.g., about one or more panels, about two or more panels, or about three or more panels). The one or more spacer bars may have a top surface that in the stored position is perpendicular to the panels. The one or more spacer bars may have a top surface that in the closed position is parallel to the surface of the panels or is coplanar with the panels. The spacer bars may form part of the tonneau cover surface when the tonneau cover is in the closed position. The one or more spacer bars may include balls, sockets, expansion links, expansion projections, or a combination thereof. The one or more spacer bars may pivot relative to a panel, another part of a hinge, or both. The one or more spacer bars may be located between and connect two panels together without any intervening hinge parts. The one or more spacer bars may support one panel relative to another panel. The one or more spacer bars may support one panel over another panel. The one or more spacer bars may include one or more spacer recess (e.g., a socket), one or more fasteners (e.g., ball) or a combination thereof so that a panel is pivotable about a spacer bar, or vice versa. The one or more spacer bars may include one or more spacer bars may include one or more expansion projections, one or more pockets, or both. The one or more spacer bars may have a fixed length and may be movable as one panel is moved relative to another panel. The one or more spacer bars may have a first amount that is exposed in a first position and a second amount that is exposed in a second position. For example, a portion of a spacer bar may be covered by an expansion projection and as a hinge moves from a closed position to a stored position, more of the spacer bar may be exposed. The spacer bar may be a plurality of pieces connected together or one single piece. The spacer bar may be hollow, include a recess, or both. The spacer bar may include one or spacer caps that cover the hollow area, the recess, or both.

The one or more spacer caps function to extend a spacer bar over a seal, over a rail cap, over a support rail, beyond a panel, over a side wall of a vehicle, or a combination thereof. The one or more spacer caps may function to prevent fluid from passing through a hinge, proximate to a spacer bar, between a spacer bar and a seal, or a combination thereof. The one or more spacer caps may close one or both sides of a spacer bar. The one or more spacer caps may close one or more sides of a spacer bar. The one or more spacer caps may be angled so that the tonneau cover may be located flush or sub-flush within the bed, relative to the rail caps, relative to the support rail, relative to the side walls of the vehicle, relative to a tailgate of a vehicle, or a combination thereof. The one or more spacer caps may contact a seal, create a seal, or both to prevent fluid from penetrating the tonneau cover, entering into the bed, or both. The one or more spacer caps may guide fluid into a channel, trough, stake pocket, or a combination thereof. The spacer cap may have a terminal end that extends to be co-planar with a terminal end of a panel. The spacer caps may be substantially identical to an expansion cap except the spacer cap may be larger than the expansion caps. The teachings of the expansion caps are expressly incorporated herein with regard to the elements of the expansion cap such as the tab, connection feature, cap, extension taper, vertical wall, or a combination thereof, all of which the spacer cap may include such that the teachings herein as to those features may apply to the spacer cap. The spacer caps may extend cantilever from a spacer bar. The spacer caps, the spacer bars, or both may include one or more fasteners, one or more spacer recesses, or both.

The one or more spacer recesses may function to receive one or more fasteners to form a connection. The one or more spacer recesses may include an open space that one or more fasteners extend into to create a connection. The one or more spacer recesses may be a closed shape (e.g., circle, oval, square). The one or more spacer recesses may be an open shape (e.g., a "u", a "c"). The one or more spacer recesses may receive a threaded member, a connection feature, an elastomeric member, an expandable member, a pin, a set screw, a nut and bolt, or a combination thereof. The one or more spacer recesses may form a snap fit. The one or more spacer recesses may create a friction fit with a fastener. The one or more spacer recesses may connect to and receive a fastener, a bumper, or both. The one or more spacer recesses may allow for some movement of a bumper, an expansion cap, a spacer cap, or a combination thereof relative to the spacer bar, the spacer recess, the expansion links, or a combination thereof. The spacer recesses may be located within expansion links, spacer bars, or both.

The one or more expansion links may function to connect to another expansion links or expansion links of a frame. The one or more expansion links may function to connect together and supportively move relative to one another. One expansion link may have a portion (e.g., an expansion projection) that extends into (e.g., a pocket) another expansion link and the expansion links may move relative to each other. The expansion links may move a pre-determined distance relative to each other. The expansion links may rotate relative to each other, longitudinally move, or both so that a panel is moved out of a plane into a second plane above another panel. The one or more expansion links may each rotate about 20 degrees or more, about 25 degrees or more, about 30 degrees or more (e.g., each expansion link may move a panel a rotational distance of about 32 degrees). The expansion links may each rotate about 60 degrees or less, about 50 degrees or less, about 45 degrees or less, about 40 degrees or less, or about 35 degrees or less. The expansion links as a hinge may rotate to an angle of about 175 degrees or more, about 179 degrees or more, about 180 degrees or more, about 181 degrees or more, or about 182 degrees or more. The expansion links as a hinge may rotate to an angle of about 190 degrees or less or about 185 degrees or less. The number of expansion links may be determined by dividing a desired angle of rotation by the rotation distance of each expansion link. For example, if an angle of 186 degrees is desired and 6 expansion links are used then each expansion link may rotate an angle of about 31 degrees. The expansion links as a hinge may rotate to an angle above 180 degrees so that an opposing end of a panel is angled towards another panel and contacts a support on a surface of the panel so that the opposing end is supported. An angle each expansion link rotates may be changed by adjusting a length of the expansion stop, the expansion projection or both. For example, if an expansion stop and expansion projection are both 2 mm in length then the expansion link may rotate 32 degrees and if the expansion projection length is shortened to 1.8 mm the expansion link may rotate 28 degrees. The expansion links may be connected together by an expansion projection of one expansion link extending into a pocket of another expansion link. The expansion projection of one expansion link may be prevented from being removed or falling out of a pocket of another expansion link by a cover connecting the two expansion links together and preventing movement of one expansion link relative to the other expansion link so that they become disconnected.

The one or more expansion projections may function to connect a frame or an expansion link to another frame or expansion link. The one or more expansion projections may function to extend into a pocket. The one or more expansion projections may move within a pocket. The expansion projections may function to extend outward from a frame or an expansion link. The one or more expansion projections may extend from an opposite side of an expansion link as the pocket. The one or more expansion projections may have a "V" shape, a "U" shape, or both. The one or more expansion projections may fit entirely within a pocket of an adjacent frame or expansion link. The one or more expansion projections may move within a pocket as one panel is moved relative to another panel. The expansion projections may fit entirely within the pocket when the tonneau cover is in the closed position. The expansion projections may partially extend out of the pocket when the tonneau cover is moved into or in the stored position. The expansion projection may extend outward in a first direction and then curve backward in a second direction. The expansion projection may have a flat portion, a linear portion, or both. The expansion projection may have a curved portion, and arcuate portion, or both. The curved portion may curve under the linear portion. A length of the expansion projection may be varied to change a distance each hinge joint travels. A length of the expansion projection, a length of an expansion stop, or both may be lengthened or shortened to vary an amount of rotation of each hinge joint or each expansion link. The curved portion may mirror a shape of the pocket. The curved portion may have a complementary fit to the pocket. The curved portion may have a length of about 1 mm or more, about 2 mm or more, about 3 mm or more, about 5 mm or more, about 1 cm or more, about 2 cm or more, or about 4 cm or more. The curved portion may have a length of about 10 cm or less, about 7 cm or less, or about 5 cm or less. The expansion projection may have a terminal end (e.g., projection stop) that restricts movement of the expansion projection within the pocket.

The one or more projection stops may move within a pocket. The one or more projection stops may restrict movement in a first direction or a second direction. The one or more projection stops may contact one or more expansion stops to restrict movement in the closed position, the stored position, or both. The one or more projection stops may assist in maintaining a hinge in a stored position. A length of an expansion projection, a length of a pocket (e.g., a distance the projection stop can move relative to an expansion stop) may determine an angle that a hinge may move or an angle that an expansion link may move. The expansion stop may be located at an end of an arcuate portion of the expansion projection. The expansion stop may be located under a planar portion of the expansion projection. The expansion stop may be located under a hinge step or in a same plane as a hinge step. The hinge step may separate an expansion projection and a pocket.

The hinge step may function to receive a portion of an adjacent expansion link when the expansion links are moved to a stored position. The hinge step may function to be free of contact with a cover (e.g., a disconnection location). The hinge step may assist one expansion link in rotating relative to another expansion link. The hinge step may create a pivot point. The hinge step may be a reduction in wall thickness of the upper surface (e.g., first wall) of an expansion link. The hinge step may be located on a terminal end of the first wall, the upper surface, or both. The hinge step may be a reduction in thickness of the upper surface so that the cover may disconnect and the expansion links may rotate relative to each other into a stored position.

The one or more upper surfaces may function to support objects on the tonneau cover, to close a bed, prevent fluid and debris from entering a bed, or a combination thereof. The one or more upper surfaces may be a top surface of an expansion cap. The upper surface may be an upper most layer of the expansion cap, spacer bar, panels, or a combination thereof. The panels, hinges, spacer bars, spacer caps, expansion caps, or a combination thereof may each include an upper surface. The upper surface of each component may be coplanar when the tonneau cover is in the closed position. The upper surface of each component may be located within one or more planes, the upper surfaces may face one another, the upper surfaces may be parallel, or a combination thereof when the one or more components of the tonneau cover are moved into the stored position. The one or more upper surfaces may have a cover that extends thereover. The one or more upper surfaces may extend over one or more pockets.

The pocket may function to receive all or a portion of an expansion projection. The pocket may guide an expansion projection when the expansion projection moves within the pocket. The pocket may support the expansion projection so that as the panels move between a stored position and a closed position, the panels may maintain a spaced apart relationship. The pocket may allow for a limited range of rotational movement. The pocket may allow an expansion projection to move from a first end of a pocket to a second end of the pocket. The pocket may have stops at one or both ends that stop the expansion link at predetermined locations so that each link moves a predetermined distance. In one direction, a projection stop may contact an expansion stop to determine a length of movement of a length of rotation. In a second direction, a top surface or a planar portion of a pocket may contact a hinge step to prevent further rotation of the expansion links relative to each other. A shape of the pocket and a shape of the expansion projection may be mirror images, complementary, or both. The expansion projection may have a shape similar to that of the pocket and may fit within the pocket. The pocket may have an opening that allows the expansion projection to move between a stored position and a closed position. The opening may be sufficiently small that the expansion projection may not be pulled through the opening. The expansion projection may move laterally along the pocket for installation but may not longitudinally or rotationally move out of the pocket. The pocket may be or include a generally "V" shaped portion, a generally "U" shaped portion, or both. The pocket may be formed of one or more walls, two or more walls, or both. The pocket may have a one or more linear walls, one or more arcuate walls, one or more stop walls, or a combination thereof. The pocket may include two or more walls that form an interior space. Preferably, the pocket includes three or more walls that form an interior space within the pocket. The first wall may extend in a first direction, the second wall may extend in a second direction, and the third wall may extend in a third direction. The first wall and third wall may extend generally towards each other, in a diverging direction, or both. The first wall and second wall may be connected via the second wall. The second wall may extend in an arcuate direction away from the first wall.

The first wall may form a top of the expansion link. The first wall may be in a same plane as a top of the panels. The first wall may be generally straight. The first wall may extend away from the expansion projection. The first wall may extend at least partially over the pocket, at least partially over the expansion projection, or both. The first wall, may terminate at a hinge step, extend beyond a hinge step, or both. The first wall may be generally planar along the entire length of the first wall. The first wall may have an upper surface. The upper surface may be entirely located within a single plane. The upper surface may step down at a hinge step. The upper surface may step down at a hinge step on a first end, a second end, or both ends. The first wall may connect the expansion projection to the pocket. The second wall may extend from the first wall. The second wall may form a cantilevered connection with the first wall.

The second wall functions to facilitate movement of the expansion projection within the pocket, the panels between a stored position and a closed position, or both. The second wall may be generally arcuate. The second wall may extend beyond the first wall. The second wall may extend in two directions from the first wall. For example, when viewed in a cross-sectional view the second wall may move down and to the right. The second wall may extend at a first slope and then towards an end of the second wall the slope may lessen. The slope of the second wall may reduce to zero at some point along the second wall. A length of a second wall may determine an amount of rotation of each expansion link of a hinge. The slope of the second wall may be negative at a location along the second wall. The second wall may have an arc that terminates at a third wall.

The third wall may function to fully or partially close the pocket. The third wall may function as a stop. The third wall may be an expansion stop. The expansion stop may close a portion of the pocket. The expansion stop may restrict movement of the expansion projection. The expansion projection may move along the second wall until the projection stop contacts the expansion stop. The expansion stop may contact the projection stop to support an expansion link, a panel, or both in a stored position. A distance of the expansion stop from the first wall or a length of a second wall may determine an angle that an expansion projection may move within the pocket. The expansion stop and the projection stop may contact each other to support a hinge in a stored position, limit movement of an expansion link, or both. The expansion stop may be angled backwards towards the second wall, the first wall, or both. The expansion stop may extend at an acute angle relative to the second wall. The expansion stop may extend at an angle of about 15 degrees or more, about 25 degrees or more, or about 35 degrees or more relative to the second wall. The expansion stop may extend at an angle of about 90 degrees or less, about 75 degrees or less, about 60 degrees or less, or about 45 degrees or less relative to the second wall. The expansion stop may extend at an obtuse angle relative to the first wall. The expansion stop may extend at an angle of about 160 degrees or less or about 145 degrees or less relative to the first wall. The expansion stop may extend at an angle of about 90 degrees or more, about 115 degrees or more, or about 125 degrees or more relative to the first wall. The pocket may be an area or region formed by or inside of the first wall, the second wall, the third wall, or a combination thereof. One or more expansion caps may connect to each pocket.

The one or more expansion caps may function to extend a hinge, create a sealed edge, or both. The one or more expansion caps may extend cantilevered from an edge of a hinge, from a pocket, from an expansion link, or a combination thereof. The one or more expansion caps may contact a seal to prevent fluid from passing into the bed. The one or more expansion caps prevent fluid from entering into the bed. The one or more expansion caps may have a cap (e.g., top surface) that is coplanar with a top surface of a panel, a hinge, or both. The one or more expansion caps may be fully or partially covered by a cover. The cover may prevent fluid from passing through or around the expansion caps. The expansion caps may extend over a sidewall of a bed, over a rail cap, over a header panel, or both. The expansion caps may extend at an angle away from the hinges, towards the sidewall, or both. Each expansion cap may be connected to one hinge joint. The expansion caps may be made of or include metal, plastic, a polymer, carbon fiber, a reinforcing fiber, or a combination thereof. The tonneau cover may include a plurality of expansion caps. The expansion caps may extend from a first side (e.g., drivers side), a second side (e.g., passenger's side), or both. Each section of a hinge may include two expansion caps (e.g., one on each end). The one or more expansion caps may include one or more of a tab, a connection feature, a cap, an extension taper, a vertical wall, or a combination thereof.

The one or more tabs may function to prevent the expansion caps from rotating relative to an expansion link. Each expansion cap may include a plurality of tabs. Preferably, each expansion cap includes only one tab. The one or more tabs may contact a bottom surface of an expansion link to assist in forming a fixed connection with the expansion link. The one or more tabs may extend from a bottom surface of the expansion cap, an extension taper, or both. The one or more tabs may extend cantilevered form the expansion cap. The one or more tabs may have a scallop, a contour, or both that mirrors a shape of an expansion link, is complementary in shape to an expansion link, or both. The one or more tabs may be located proximate to, below, or both one or more connection features.

The one or more connection features may function to form a connection with the expansion links. The one or more connection features may be an aperture, a projection, or both. The connection features may receive a fastener that extends between and connects the expansion links and the expansion caps. The connection feature may be a hole that receives a pin, aligns with a spacer recess, aligns with a fastener, or a combination thereof. The one or more connection features may fixedly connect the expansion cap and the hinge joints, expansion links, or both together. Each expansion cap may include one or more connection features. Each expansion cap may include a plurality of connection features. Preferably, each expansion cap may include a single connection feature. The connection features may connect the expansion cap to the expansion links so that the expansion cap moves with the expansion links. The connection features may include a projection, a fastener, or both that extends from the expansion cap into a spacer recess to form a connection. The connection feature may be free of any projecting parts and a third part may extend through both the connection feature and a spacer recess to form a connection. The connection feature may be located on a vertical wall of the hinge expansion cap.

The vertical wall may function to abut an expansion link. The vertical wall may include one or more connection features, one or more tabs, or both. The one or more vertical walls may have a height that is substantially equal to a height of an expansion link. The vertical wall may support a tab that extends below the expansion links and a connection feature that aligns with a spacer recess. The vertical wall may form one end of an extension taper.

The one or more extension tapers may function to reduce a height of an expansion cap, a spacer cap, or both so that a terminal edge is flush, sub-flush, or both with a top of a side wall of a bed. The one or more extension tapers may function to reduce a height of the expansion caps as the extension tapers extends away from the hinge. The one or more expansion tapers may extend from the vertical wall to a location about 10 percent or more, about 20 percent or more, about 30 percent or more, or about 60 percent or more a length of the cap. The one or more expansion tapers may extend from the vertical wall to a location proximate an end of the cap, about 90 percent or less, about 80 percent or less, about 70 percent or less, or about 60 percent or less a length of the cap. For example, if the cap extends 10 cm from a vertical wall and the expansion tapers to about 50 percent of a length of the cap, the extension tapers will terminate at about 5 cm from the vertical wall. The one or more expansion tapers may be solid. The one or more expansion tapers may have a hollow center. For example, the connection feature may be exposed in-between walls of the expansion taper. The expansion tapers may be two spaced apart walls that extend along edge regions of the vertical wall and the cap. The expansion taper may support the cap so that as a load is placed on the cap, the cap does not twist, deflect, or both. The expansion taper may act as a sway brace for the cap.

The one or more caps more caps may function to form an upper surface of an expansion cap. The one or more caps may be coplanar with a hinge, a panel, or both. The one or more caps may terminate so that an end of the one or more caps end at an edge of a panel, a spacer bar, a spacer cap, or both. The one or more caps may have an upper surface that is located under a cover, protected by a cover, or both. The upper surface of the one or more caps may form a support surface with adjacent upper surfaces (e.g., other expansion caps, panels, spacer caps, hinges, or a combination thereof). The one or more caps may be coplanar when in the closed position and in different planes when the tonneau cover is in a stored position. A top surface of the caps may form an arcuate shape. The cap may determine a major dimension of an expansion cap. The cap may extend a full length of an expansion cap. A cap may extend from a first side, a first edge, second edge, or a combination thereof of a vertical wall. A tab may extend from a second side, a first edge, a second edge, or a combination thereof of a vertical wall. Preferably, the cap extends from a first side and a first edge (e.g., top) and a tab extends from a second side and a second edge (e.g., bottom) of a vertical wall. The caps may extend over a rail cap, a header panel, or both so that fluid may be guided away and prevented from entering the bed or passing through the tonneau cover. The one or more caps may include or be located proximate to one or more hinge connectors.

The one or more hinge connectors may function to connect two or more parts of a hinge together. The one or more hinge connectors may be added to two parts of a hinge so that the two parts of the hinge may move relative to each other. The one or more hinge connectors may be deformable, elastic, or both so that two or more parts of a hinge may move relative to each other while remaining connected, water resistant, or both. The one or more hinge connectors may be the cover. The one or more hinge connectors may connect two expansion links, two frames, a header link to a panel link, or a combination thereof. The one or more hinge connectors may be part of any hinge taught herein. The one o more hinge connectors may be part of a hinge with header links and panel links, a hemispherical hinge, a standing hinge, an expansion hinge, or a combination thereof.

The one or more hemispherical hinges may function to create an arc or a hemispherical shape when a first panel is moved into a stored position relative to a second panel. The hemispherical hinges may function to support one panel above another panel. The hemispherical hinges may include one or more hinge joints, one or more expansion links, or both. The hemispherical hinges may be a plurality of expansion links connected together that support one panel relative to another panel when the panels are moved into a stored position. The hemispherical hinges may be free of any spacer bars, any spacers, or both. The hemispherical hinges may rotate a first panel an angle of about 160 degrees or more, about 175 degrees or more, about 180 degrees or more, about 181 degrees or more, or about 182 degrees or more relative to a second panel when the first panel and the second panel are in the stored position. The hemispherical hinges may rotate a first panel an angle of about 190 degrees or less or about 185 degrees or less relative to a second panel when the first panel and the second panel are in the stored position. As discussed herein an amount of rotation or a number of hinges included in each hemispherical hinge may depend upon the size and type of expansion links used to form the hemispherical hinge. The hemispherical hinge may include two or more, three or more, four or more, five or more, six or more hinge joints. The hemispherical hinge may include twenty or less, about fifteen or less, or about ten or less hinge joints. The hemispherical hinge may include two or more, three or more, four or more, or five or more expansion links. The hemispherical hinge may include about twenty or less, about fifteen or less, or about ten or less expansion links. The hemispherical hinge may be located between a tail panel and a central panel, between two central panels, between a central panel and a header panel, or a combination thereof. Every hinge within a tonneau cover may include hemispherical hinges. Three hinges may be hemispherical hinges. Two hinges may be hemispherical hinges. Only one hinge may be a hemispherical hinge. Each hinge joint, each expansion link, or both may be connected to one or more bumpers.

The one or more bumpers may function to support the hemispherical hinge, the panels, or both when all or a portion of the tonneau cover is in a stored position. The one or more bumpers may support one or more panels above a header panel. The one or more bumpers may contact a header panel so that all or a portion of a load of a stack of panels (e.g., two or more panels or three or more panels) is at least partially supported by the header panel. The one or more bumpers may extend from a rear surface of a hemispherical hinge. The one or more bumpers may extend from a rear surface of a hinge or expansion link and contact the upper surface of a panel so that the hinge and/or stack of panels are supported above the panel, do not scratch or damage the panel, or both. Each hemispherical hinge may include one or more bumpers, two or more bumpers, or three or more bumpers. Each hemispherical hinge may include 6 or less, 5 or less, or 4 or less bumpers. Each of the expansion links may include a bumper. Some of the expansion links may include a bumper. The one or more bumpers may be made of a solid material. The one or more bumpers may be made of a flexible material. The one or more bumpers may be plastically deformable. Preferably, the one or more bumpers may be elastically deformable. The one or more bumpers may be made of a partially rigid material. The material of each bumper or all of the bumpers together may partially deform when a load of about 5 Kg or more, about 10 Kg or more, about 15 Kg or more, or about 20 Kg or more is applied to the bumpers. The material of each bumper or all of the bumpers together may partially deform when a load of about 100 Kg or less, about 75 Kg or less, about 50 Kg or less, or about 35 Kg or less. The bumpers may have a hollow area within the bumper. The hollow area may deform or change shape when a load is applied to the bumper. The hollow area may fully collapse when a full load is applied to the bumper (e.g., an entire stack of panels (i.e., two or more panels or three or more panels)). The hollow area may be a shock absorber so that as a vehicle including a tonneau cover in a stored position moves the panels can move when the vehicle hits bumps without the panels contacting another panel. The one or more bumpers may be made of plastic, a thermoplastic, an elastomer, an elastomeric material, rubber, a foam, an open celled foam, a closed cell foam, or a combination thereof. The one or more bumpers may only be located on a hemispherical hinge. The one or more bumpers may be part of a standing hinge, an extended hinge, or both.

The one or more standing hinges may function to connect two panels together, elevate a panel out of a plane with the other panels when a first panel is rotated over a second panel. The one or more standing hinges may move a central panel out of plane when a tail panel is rotated over the central panel. The one or more standing hinges may allow a first panel to rotate over a second panel and to lift the first panel and the second panel above a rail cap, a header panel, or both. The one or more standing hinges may connect a tail panel to a first central panel. The one or more standing hinges may include one or more disconnection locations between a cover and one or more parts of a hinge. The one or more standing hinges may prevent the cover from being under tension when the first panel is stored over a second panel. The one or more standing hinges may elevate the hinge, the cover, or both above a surface of the rail cap, the support rail, or both when a first panel is rotated over a second panel. The one or more standing hinges may elevate an end of a panel about 1 mm or more, about 3 mm or more, about 5 mm or more, about 7 mm or more, about 1 cm or more, about 2 cm or more, or about 3 cm or more above a rail cap, a support rail, or both. The one or more standing hinges may elevate an end of a panel about 10 cm or less, about 7 cm or less, or about 5 cm or less above a rail cap, a support rail, or both. The one or more standing hinges may include one or more standing caps, one or more balls, one or more sockets, one or more rotary stands, one or more stand supports, one or more extension arms, one or more standing legs, one or more frames. or a combination thereof. Each hinge and preferably each standing hinge may include one or more rotary stands.

The one or more rotary stands may function to lift a panel above a rail cap, a support rail, or both. The rotary stands may prevent contact between a portion of a cover and the rail cap, support rail, or both. The one or more rotary stands may extend parallel to a rail cap, support rail, or both in a closed position. The one or more rotary stands may extend perpendicular to a rail cap, support rail, or both in a stored position. The rotary stand may both lift one or more panels and may extend all or a portion of a hinge and preferably a standing hinge to an end of a panel. The rotary stands may connect to a spacer bar or another portion of a hinge and extend outward. The rotary stand may connect to a frame of the hinge. Preferably, the rotary stand is connected to a part of the stand that moves when a first panel is moved relative to a second panel. A rotary stand may be located on one or both ends of each standing hinges. The rotary stand may include one or more standing caps, one or more balls, one or more sockets, one or more stand supports, one or more extension arms, one or more standing legs, or a combination thereof.

The one or more standing caps may function o connect a rotary stand to a hinge, a spacer bar, or both. The one or more standing caps may extend into a spacer bar to create a connection between the rotary stand and the hinge. The one or more standing caps may project outward from the rotary stand. The one or more standing caps may receive a portion of a hinge, a spacer bar, or both. The one or more standing caps may cover an end of a standing hinge. The one or more standing caps may fixedly connect a rotary stand to a hinge, a spacer bar, or both so that the rotary stand moves with a portion of the hinge that the rotary stand is connected. The one or more standing caps may enclose an end of the standing hinge. The one or more standing caps may have a complementary shape to a part of a hinge so that the standing cap connects a rotary stand to the hinge. The one or more standing caps may be located proximate to one or more balls, one or more sockets, or both. The one or more standing caps may have a shape that is configured to accommodate a ball, a socket, or both. The one or more standing caps may receive all or a portion of a ball, form all or portion of a socket, or both.

The one or more balls may function to create a movable connection between one or more pieces of a standing hinge. The one or more balls may extend from a frame into a spacer bar so that the spacer bar may mover relative to a panel, a frame, or both. The one or more balls may function to movably connect two parts of a standing hinge together. The balls may be part of a frame, part of a spacer bar, part of an expansion link, or a combination thereof. The balls may have a cross-sectional shape that is generally circular. The one or more balls may have a three-dimensional shape that is generally cylindrical. The one or more balls may be supported at an end of frame, end of a support, or both. The one or more balls may create an interference fit with a spacer recess so that once the balls are placed within the spacer recess the balls are prevented from being removed. A cover extending between a frame or panel and a spacer bar may prevent the balls from being removed from a socket or spacer recess. A socket may be one type of spacer recess that may form a movable connection with a bar.

The one or more sockets may receive all or a portion of a ball. The one or more sockets may function to allow rotational movement of the ball within the socket; movement of a spacer bar relative to a frame or panel; or both. The one or more sockets may be complementary to a ball. Each socket may receive and hold one ball. Each socket may be generally "C" shaped, generally "U" shaped. The one or more sockets may receive a ball so that the ball and socket may be rotated relative to each other. Preferably, a socket may be part of a spacer bar and a ball may be part of a frame. A socket may be located on each side of a spacer bar so that one panel is connected to each side of a spacer bar. The spacer bar may be about 90 degrees relative to each panel the spacer bar is connected with when the standing hinge is located in a stored position. The balls and sockets may permit movement of the rotary stand, the spacer bar, or both relative to a stand support so that as the rotary stand and preferably the standing leg is moved towards the stored position, the standing leg contacts a stand support to move the one or more panels, the standing hinge, or both out of a plane of the tonneau cover.

The one or more stand supports function to create a base or plane for a rotary hinge, a stand support, or both to move relative. The one or more stand supports may be part of a rail cap, a support rail, or both. The one or more stand supports may be a static surface that the stand supports contact as a panel, the standing hinge, or both move from a closed position to a stored position. The one or more stand supports may be a wall of a rail cap, a support rail, or both. The one or more stand supports may extend toward a center of a bed. The one or more stand supports may be a channel, a rail, or both of the rail cap or support rail. The stand supports may be reinforced. The stand supports may support a weight of about 10 Kg or more, about 15 Kg or more, or about 20 Kg or more. The stand supports may support a weight of about 200 Kg or less or about 100 Kg or less. The stand supports may be integral part of the rail cap or support rail that is contacted by a standing leg.

The one or more standing legs may function to elevate one or more panels above a stand support, a rail cap, a support rail, or a combination thereof. The one or more standing legs may lift one or more panels so that a cover of the panels is prevented from contacting a side wall of a vehicle, a side wall of a bed, a rail cap, a support rail, a stand support, or a combination thereof. The one or more standing legs may be located at one or both ends of a standing hinge. The one or more standing legs may extend parallel to a stand support when the standing hinge is in a closed position. The one or more standing legs may extend perpendicular to a stand support when the standing hinge is in a stored position. The one or more standing legs may be located between a first panel and a second panel. The one or more standing legs may be located between a tail panel and a first central panel. The one or more standing legs may have a height that is equal to a height of the cover when the cover is folded as the standing hinge moves from a closed position to a stored position. The one or more standing legs may extend from a terminal end to a standing cap. The standing legs may lift a panel to an angle relative to a stand support. The angle of the panel (e.g., a first central panel) relative to a stand support may be about 1 degree or more, about 3 degrees or more, about 5 degrees or more, or about 7 degrees or more. The angle of the panel relative to a stand support may be about 30 degrees or less, about 25 degrees or less, or about 15 degrees or less. The standing leg may only contact the stand support when the tail panel is rotated over the first central panel and no other panels are rotated. The standing leg may be free of contact with any other panels when the standing leg is in the stored position. The standing leg may be located between an extension arm and a standing cap.

The one or more extension arms may function to extend a rotary stand, a standing hinge, or both to a terminal edge of one or more panels. The extension arm may extend outward and over a rail cap, a support rail, or both. The extension arm may be an expansion cap, a spacer cap, or both and all of the teachings for those features are expressly incorporated by reference herein for all reasons regarding the extension arm. The one or more extension arms may be an expansion cap, a spacer cap, or both that is connected to a standing leg. The extension arm may prevent fluid from entering a bed. The extension arm may extend from an opposite side of the rotary stand as the standing cap. Each rotary stand may include one extension arm. The extension arms may extend from both sides of a standing hinge. The extension arms may be partially or fully covered by a cover so that a hinge joint is sealed, fluid is prevented from extending between the extension arms and an adjacent piece of the tonneau cover, or both. The extension arms may be located between a tail panel and a first central panel. The one or more extension arms may be located on an opposite end of a tonneau cover as a tonneau connector.

The one or more tonneau connectors may function to prevent longitudinal movement, lateral movement, transverse movement, or a combination thereof of a tonneau cover relative to a bed. The one or more tonneau connectors may adaptably connect a tonneau cover at two or more different locations, to two or more different beds, two or more different vehicles, or a combination thereof. The one or more tonneau connectors may include one or more parts that are part of a tonneau cover, one or more parts that extend from a tonneau cover, one or more parts that connect to a bed or a vehicle, or a combination thereof. Each tonneau cover may include one tonneau connector and the tonneau connector may be in one or more parts. The tonneau connector may be located partially or entirely within a header panel. The tonneau connector may have one or more parts that extend from a header panel. The tonneau cover may include one or more tracks, one or more sliders, one or more connection arms, one or more connection recesses, one or more track arms, one or more connectors, or a combination thereof.

The one or more tracks may function to receive one or more sliders and to permit lateral movement of the sliders within the track but to restrict longitudinal movement of the sliders. The one or more track may be an opening within a header panel. The one or more tracks may be an opening that a slider may be movable within. A track may be a window into an open area in a header panel. A track may include one or more detents so that when a slider is moved into a detent the slider is prevented from moving longitudinally or transversely. The track may be smooth. The track may extend at an angle. The track may have an upper track wall that is located longitudinally spaced apart from a lower track wall. The upper track wall and lower track wall may be separated by an opening. One or more sliders may extend into the track and be prevented from longitudinally moving out of the track by an upper surface and a lower surface.

The one or more sliders may function to connect a tonneau cover to a bed or a vehicle. The one or more sliders may have a portion that extends into a track or a header panel and a portion that extends outward of the header panel or the track. The one or more sliders may laterally move within the track. The one or more sliders may laterally to align with one or more anchor points in or on a bed or vehicle. The one or more sliders may be movable to accommodate attachment to two or more bed or two or more vehicles. The one or more sliders may be locked in place by a tether, a longitudinal force, a detent, a clip, or a combination thereof. Preferably, each tonneau cover includes at least two sliders. For example, a first slider may be located on a driver's side half of a vehicle and a second slider may be located on a passenger's side half of a vehicle. The one or more sliders may include one or more connection arms.

The one or more connection arms may function to create an anchor location on a tonneau cover. The one or more connection arms function to receive a tether that is also connected to a bed or a vehicle. The one or more connection arms may extend out of the track. The one or more connection arms may receive a tether. The one or more connection arms may extend out of the track so that a top of the connection arm is located above an upper surface of a panel, is coplanar with an upper surface of a panel, is located below a panel (e.g., a header panel). The connection arm may be straight. The connection arm may have one or more curves. The connection arm may have one or more segments that are connected together. The one or more connection arms may extend out and away from a track and then upward. The connection arms may be sufficiently strong to resist a dynamic force from a braking event, acceleration, or both where the tonneau cover is suddenly moved and the connection arm, the slider, or both sustain a dynamic force (e.g., 10 Pa or more, 20 Pa or more, 50 Pa or more, 200 Pa or less, or 100 Pa or less). The one or more connection arms may include one or more connection recesses.

The one or more connection recesses may function to receive one or more tethers. The one or more connection recesses may be sufficiently large to receive a tether that extends from the connection arm to an anchor of a bed or vehicle. The one or more connection recesses may be square, round, rectangular, oval, geometric, non-geometric, or a combination thereof. The one or more connection recesses may extend substantially a full length of the connection arms. The connection arm may form a frame around the connection recess. The connection recess may receive an end of a tether and the connection arm and connection recess may be located above a track arm.

The one or more track arms may function to create a movable connection with a panel. The one or more track arms may extend into a track, into a panel, or both. The one or more track arms may contact one or more track walls. The one or more track arms may contact an upper track wall, a lower track wall, or both. The one or more track arms may mirror a shape or be complementary in shape to an upper track wall, a lower track wall, or both. The one or more track arms may be larger than a track, larger than an opening in a track, have a thickness that is greater than a track opening, or a combination thereof. The one or more track arms may slide along and inside of a track, a lower track wall, an upper track wall, or a combination thereof. The one or more track arms may contact an inside of a track, a lower track wall, an upper track wall, or a combination thereof to prevent movement of the track arms along the track. For example, an inside of the track, the lower track wall, the upper track wall may have detents or stops that prevent lateral movement of the track arm when the track arm contacts the detents or stops. The track arm may have a narrow neck region (e.g., a region between a track connector and a track recess. The track arm may have a body that extends into the track. A body of the track arm may be located behind the narrow neck region. The body of the track arm may stabilize the slider within the track. A track connector may extend outward from the body towards the lower track wall, the upper track wall, or both.

The track connector may function to connect the slider to a track, prevent a slider from moving when the slider is connected to tether or an anchor, or both. The track connector may contact a wall of the track to prevent movement of the slider. The track connector preferably contacts the lower track wall. The track connector may be complementary in shape to the lower track wall. The track connector may contact a stop a detent or both. The track connector may prevent rotation of the slider relative to the track. The track connector may prevent the slider from being pulled vertically within the track. The track connector may have a generally triangular cross-section. The track connector may extend from the body and outward relative to the connection arm. The track connector may be located under the connection arm, the track recess, or both. The track connector and the track recess may be located opposite each other and may form a narrow neck region.

The narrow neck region may be a region of the slider that extend out of the track, between the upper track wall and the lower track wall, or both. The narrow neck region may function to permit the connection arm to extend out of a track while retaining the slider within the track. The narrow neck region may form one or more shoulders behind the narrow neck that contact the upper track wall, the lower track wall, or both so that the slider is retained within the track. The narrow neck region may be formed by the track connector and the track recess. A shoulder may be formed at or behind the track connector, the track recess, or both that permits removal of the slider form the track. The track connector, the track recess, or both may be an absence of material. Preferably, the track connector, the track recess, or both include a depression and a shoulder. The depression receives the upper track wall, the lower track wall or both and the shoulder contacts an interior of the upper track wall, the lower track wall, or both. The track connector and the track recess may be located on opposing sides of a connection arm.

The one or more track recesses may function to receive a portion of an upper track wall, restrict the slider from being removed from the track, or both. The track recess may have a complementary fit within the track, with the upper track wall, or both. The track recess may directly oppose the track connector. The connection arm may extend between the track recess and the track connector. The track recess may be an absence of material. The track recess may be located on an edge of the body, in the body, between the body and the connection arm, or a combination thereof. The track recess may receive a portion of the tether, assist in connecting the tether to the connection recess, or both.

The tether may function to connect a tonneau cover to a bed, a vehicle, an anchor, or a combination thereof. The tether may restrict movement in a longitudinal direction, a lateral direction, transverse to the bed, longitudinal to the bed, or a combination thereof. The tether may be rigid. The tether may be plastically deformable. The tether may be elastically deform ably. Preferably, the tether is pliable but free of stretch. The tether may be made of or include a fibrous material, rope, hook and loop fasteners, nylon, metal, a zip tie, a cuttable material, a non-cuttable material, a material that may be tied, or a combination thereof. The tether may extend through the connection recess within the connection arm. The tether may extend towards the track wall but be free of entry into the track wall.

The track wall may function retain the slider within the tonneau cover and assist in connecting the tonneau cover to the bed, a vehicle, an anchor, or a combination thereof. The track wall may permit the slider to move laterally or in a transverse direction. The track wall may prevent longitudinal movement of the slider. The track wall may prevent the slider from being removed from the tonneau cover, the track, the header panel, or a combination thereof. The track wall may include an upper track wall and a lower track wall. The upper track wall and the lower track wall may be connected at ends. The upper track wall and the lower track wall may be free of any connection (e.g., direct connection). The upper track wall and the lower track wall may be separated by one or more tracks. The upper track wall and the lower track wall may be directly connected to each other at a central location of the header panel (e.g., in a middle). The upper track wall and the lower track wall may be indirectly connected. The upper track wall and the lower track wall may each contact a portion of a slider. Only the upper track wall or only the lower track wall may contact the slider. The lower track wall may contact a track connector. The lower track wall, upper track wall, or both may have one or more stops, two or more stops, four or more stops, or six or more stops that a slider contacts to restrict lateral movement of the slider once the slider is moved into a locking position. The lower track wall, the upper track wall, or both may be free of any stops. The lower track wall, the upper track wall, or both may be substantially smooth. The lower track wall, the upper track wall, or both may approach each other and be located on opposite sides of a narrow neck region, extend into a track recess, track connector, or both. The upper track wall may prevent the slider from tipping or rotating within the track. The lower track wall may prevent longitudinal movement of the slider relative to the track, the header panel, or both. The lower track wall may terminate at a lip.

The lip may function to restrict lateral movement of the slider. The lip may lock the slider in place when a force is applied to the slider by the tether. The lip and track connector may have complementary shapes. The lip may be generally triangular in shape. The lip may extend beyond a remainder of a header panel. The lip may be located closest to a vehicle, a cab, an end of a bed, or a combination thereof. The lip may receive the track connector and prevent rotation of the track connector and the slider when the tonneau cover and bed, vehicle, anchor, or a combination thereof are connected. The tonneau connector including the lip, track, slider, and tether, may lock a header panel to a bed and one or more rotary locks may assist in connecting other panels (e.g., central panels) to a bed.

The one or more rotary locks may function to connect central panels, tails panels, or both to a bed of a vehicle when the tonneau cover, panels, or both are in a closed position. Preferably, the one or more rotary locks connect the one or more central panels to a bed, a rail cap, a support rail, or a combination thereof. The one or more rotary locks may prevent a panel from being opened, vertically lifted, lifted from an edge, or a combination thereof when the rotary lock is engaged. The one or more rotary locks may engage a rail lock, a rail cap, a support rail, or a combination thereof to create a locked position. The one or more rotary locks may have a portion connected to a panel. The rotary locks may have a portion connected to a rail cap or a support rail. The one or more rotary locks may be located on one side of one or more panels (e.g., driver's side or passenger's side). The one or more rotary locks may be located on one or more sides of a panel. Only the central panels may include rotary locks. The header panel, the tail panel, or both may be free of rotary locks. All of the central panels may include one or more rotary locks. Preferably each of the central panels may include two or more rotary locks. The rotary locks may engage as the panels move from a stored position to a closed position. The rotary locks may engage a rail lock once the panel reaches an angle of about 90 degrees or less, about 80 degrees or less, about 70 degrees or less, about 60 degrees or less, or about 50 degrees or less. The rotary locks may engage a rail lock once the panel reaches an angle of about 5 degrees or more, about 10 degrees or more, about 25 degrees or more, or about 35 degrees or more (e.g., about a 45-degree angle±5 degrees). The rotary locks may include one or more panel caps that when in communication with one or more rail locks prevent movement of a panel.

The one or more panel caps may function to connect to an end or side of a panel and prevent the panel from being opened when the tonneau cover is a closed position. The one or more panel caps may connect to an edge or side of a panel. The one or more panel caps may span a width of a panel (e.g., from a driver's side of a bed to a passenger's side of a bed). The one or more panel caps may be located in end regions of the panels. For example, one panel cap may be located on a driver's side and one panel cap may be located on a passenger's side. Each panel may have two panel caps. The panel caps may be a trailing end of a panel (e.g., an end of a panel facing a tailgate). The one or more panel caps may extend into or around one or more panels. Preferably, the panel caps are generally "C" shaped and all or a portion. The one or more panel caps may be part of a frame, part of a hinge, or both. The one or more panel caps may be connected to a frame, a hinge, or both. The one or more panel caps may extend around and receive a portion of a panel, a frame, or both. The one or more panel caps may have a panel extension that extend from the panel cap.

The one or more panel extensions may assist in locking a panel, preventing a panel from being openings, or both when the panel is in a closed position. The one or more panel extensions may extend cantilever from a panel cap. The one or more panel extensions may extend from a bottom (e.g., interior side) of a panel. The one or more panel extensions may extend towards a rear of a bed. The one or more panel extensions may have a length of about 1 cm or more, about 3 cm or more, about 5 cm or more, about 7 cm or more, or about 10 cm or more. The one or more panel extensions may have a length of about 20 cm or less, about 15 cm or less, or about 12 cm or less. The one or more panel extensions may be reinforced. The one or more panel extensions may be made of or include metal, plastic, a polymer, nylon, a thermoplastic, or a combination thereof. The one or more panel extensions may extend from a panel towards a hinge, under a hinge, or both. The one or more panel extensions may extend into or under a rail lock to lock a panel in place. The one or more panel extensions may rotate under the rail lock as a panel is closed. The one or more panel extensions may prevent a panel from being vertically lifted when then then panels are in a closed position. The one or more panel extensions may be located inside of an outer edge of a panel. The one or more panel extension may begin to lock or unlock a panel when the panel is partially open (e.g., an angle of about 25 degrees or more, about 35 degrees or more, about 45 degrees or more, or about 60 degrees or less). The one or more panel extensions may extend from open, to partially opened, and then locked as the panel moves from a stored position to closed position. When the panel is partially opening the panel may continue to be locked. The panel may be locked as long as a portion of the panel extension extends under a portion of a rail lock.

The one or more rail locks may function to contact a panel extension and prevent a panel from being opened when the rail lock and the panel extension are connected. The one or more rail locks may extend above a rail cap, above a support rail, or both so that a space is formed between the rail lock and the rail cap, the support rail, or both. The one or more rail locks may extend in a direction opposite to the panel extensions. The one or more rail locks and the one or more panel extensions may extend towards each other. The one or more rail locks may be spaced apart from the rail cap, the support rail or both and the panel extension may extend into the space so that the panel extension prevents lifting of a panel. The rail locks may have a width that is substantially equal to the panel extension. The tonneau cover may have an equal number of rail locks as panel extensions. The rail locks may extend in a single plane. Preferably, the rail locks begin at a rail attachment, rail cap, support rail or a combination thereof and extend upward away from the rail cap, rail attachment, rail support, or a combination thereof and the plateau in a second plane. The first plane and the second plane may be parallel to each other. The first plane may partially extend over the second plane. Preferably, the first plane and the second plane do not overlap. For example, the first plane may stop where a portion of the rail lock extends vertically and horizontally and then a second plane may begin and extend away from the first plane. The first plane may be part of the rail attachment or may be the rail attachment.

The one or more rail attachments may connect the rail lock to a rail cap, a support rail, or both. The one or more rail attachments may be an integral part of a rail cap, a support rail, or both. The rail attachment and a rail cap may be one monolithic part. The rail attachment and the support rail may be one monolithic part. The rail attachment may clamp on to the rail cap, the support rail, or both to form a connection. The rail attachment may prevent movement of the rail lock. The rail attachment may be mechanically connected to the rail cap, the support rail, or both. The rail attachment may be connected with a fastener, welding, adhesive, crimping, or a combination thereof. The rail attachment may sufficiently strong so that the rail attachment does not slide along the rail cap, a support rail, or both. The rail attachment may be sufficiently strong so that if a vertical force is applied to a panel the rail attachment prevents the panel from being vertically lifted.

FIG. 1 is a perspective view of a vehicle 2. The tonneau cover 10 rests over the bed 4 of the vehicle 2. The tonneau cover 10 includes a plurality of panels 12 that are pivotably connected at hinges 80.

Figure 2:
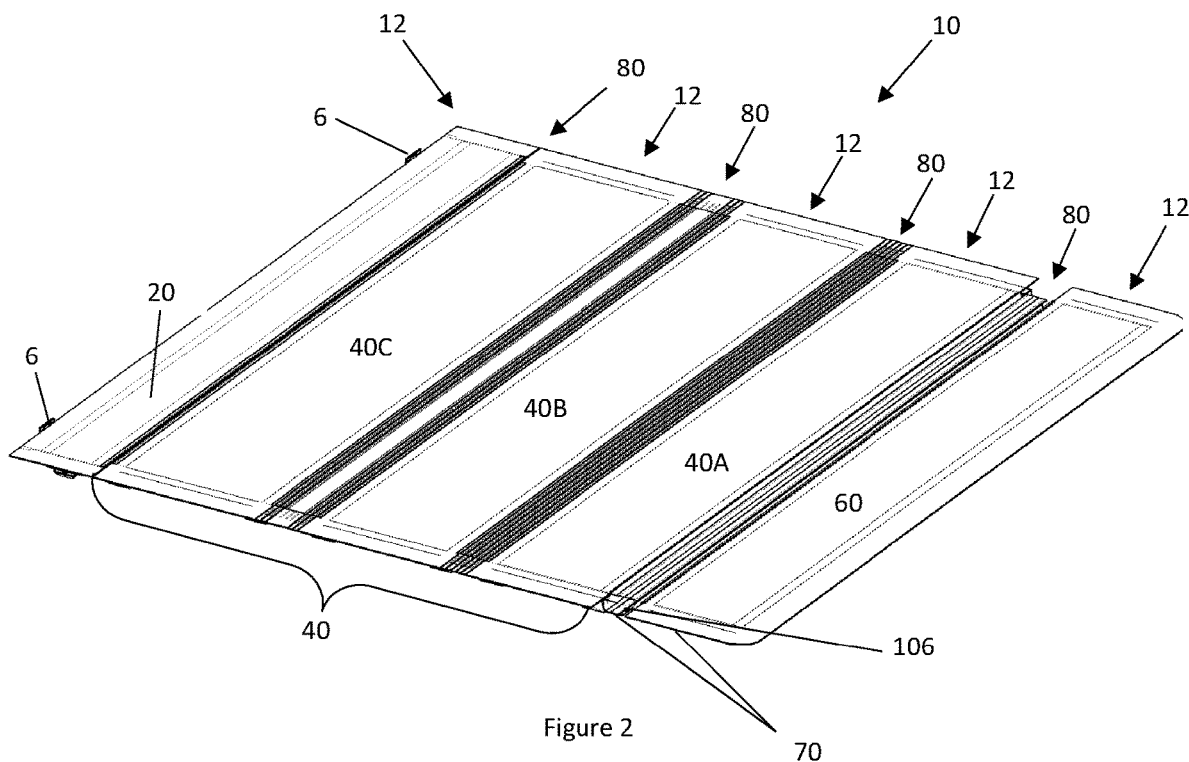
FIG. 2 is a top perspective view of a tonneau cover.

FIG. 2 is a top perspective view of a tonneau cover 10. The tonneau cover 10 includes a plurality of panels 12 that are connected by a plurality of hinges 80. The panels 12 on each end of the tonneau cover 10 are the tail panel 60 and the header panel 20 that are connected with central panels 40 located there between. The central panels 40 include a first central panel 40A, a second central panel 40B, and a third central panel 40C. The header panel 20 includes connectors 6 that connect the tonneau cover 10 to a vehicle (not shown). The end of one hinge 80 has the expansion caps removed and the opposing end has expansion caps 106. As shown, the expansion caps 106 extend the hinges 80 so that a terminal edge 70 of the expansion caps 106 is coplanar or in line with a terminal edge 70 of a panel 12.

Figure 3:
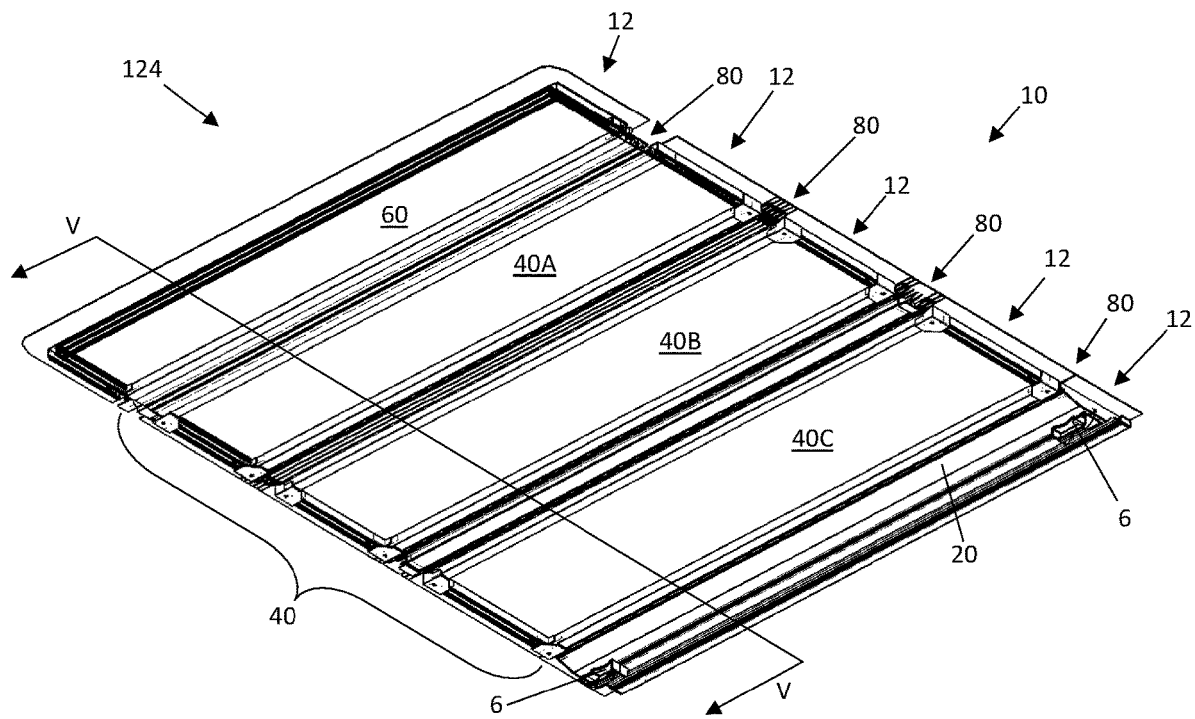
FIG. 3 is a bottom perspective view of a tonneau cover.

FIG. 3 is a bottom perspective view of a tonneau cover 10 in a closed position 124. The tonneau cover 10 includes a plurality of panels 12 that are pivotably connected by a plurality of hinges 80. The panels 12 on each end of the tonneau cover 10 are the tail panel 60 and the header panel 20 that are connected with central panels 40. The central panels 40 include a first central panel 40A, a second central panel 40B, and a third panel 40C. The header panel 20 connects to the cab of a truck (not shown) at the connectors 6.

Figure 4:
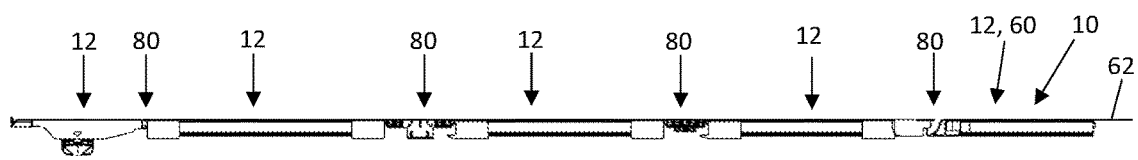
FIG. 4 is a side view of the tonneau cover.

FIG. 4 is a side view of the tonneau cover 10. The tonneau cover 10 including panels 12 connected by hinges 80 with the tail panel 60 including a tail extension 62.

Figure 5:
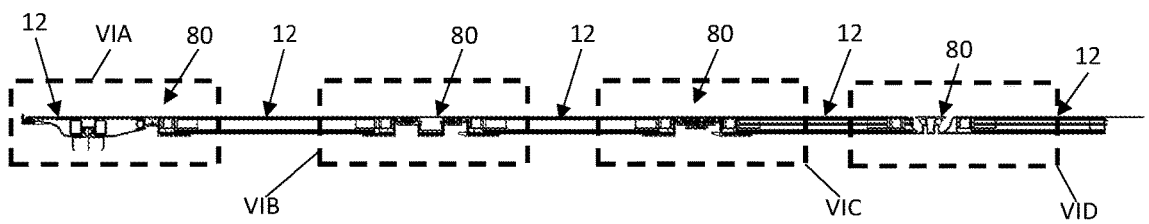
FIG. 5 is a cross-sectional view along V-V of FIG. 3.

FIG. 5 is a cross-sectional view along V-V of FIG. 3 showing the hinges 80 connecting the panels 12.

FIG. 6A1 is a close-up view of FIG. 5 in box VIA. The header panel 20 includes a connecter 6 that connects the header panel 20 to a vehicle (not shown). The header panel 20 and the panel 12 are pivotably movably relative to each other about a hinge 80.

FIG. 6A2 is a close-up view of a hinge 80. The header panel 20 includes a header link 82. The panel 12 includes a panel link 84. The header link 82 and the panel link 84 have pivotable movement at a hinge 80. The header link 83 and the panel link 84 each include rotation stops 88 that prevent rotation of the panel 12 relative to the header panel 20 so that the panel 12 and the header panel 20 lie within a plane. A hinge connector 110 is located within the hinge 80 that assists in rotating the hinge 80 between a planar position and a stored position.

FIG. 6A3 is an exploded view a hinge 80. The header panel 20 includes a header link 82 and a header recess 24. The cover 14 rests on the header panel 20. The connectors 6 and the header recess 24 connect at a terminal edge of the header panel 20. The header link 82 and the panel link 84 connect so that the header panel 20 and the frame 86 have pivotable movement. The header guide 28 and the header panel 20 connect at the header guide recess 26 by a fastener 8. The header guide 28 includes a header guide connector 30 that has a plurality of ears 32. The header guide 28 connects with the header panel 20 at the header guide connector 30. The header cap 22 connects over the sides of the header panel 20 so that the header guide 28 is sandwiched between the header panel 20 and the header cap 22.

FIG. 6B1 is a close-up view of FIG. 5 in box VIB. The panels 12 are connected at a hinge 80 that is an extended hinge 90. The extended hinge 90 includes hinge joints 92 and a spacer bar 94. The spacer bar 94 and each of the panels 12 have pivotable movement at the hinge joints 92. The hinge joints 92 include expansion links 100.

FIG. 6B2 is a close-up view of a hinge 80. The hinge 80 includes hinge joints 92 and a header cap 22. The hinge 80 and the frames 86 have pivotable movement about the hinge joints 92.

FIG. 6B3 is an exploded view of a hinge 80. The spacer bar 94 includes spacer recesses 98, an expansion projection 102, a pocket 104, and an expansion stop 108. The spacer caps 96 each include fasteners 8 that connect with the spacer recesses 98 of the spacer bar 94. The spacer bar 94 and the expansion links 100 have pivotable and expandable movement at the expansion projections 102, the pockets 104, and the expansion stop 108. Each expansion link 100 includes a spacer recess 98, an expansion projection 102, a pocket 104, and an expansion stop 108. Each expansion cap 106 includes a fastener 8. Each expansion link 100 connects with two expansion caps 106 at the fasteners 8 and the spacer recess 98. The frames 86 include an expansion projection 102, a pocket 104, and an expansion stop 108. Each of the frames has pivotable and expandable movement at the expansion projection 102, the pocket 104, and the expansion stop 108.

FIG. 6C1 is a close-up view of the hemispherical hinge 12 in a closed position 124 shown in FIG. 5 in box VIC. The panels 12 includes covers 14. The hinge 80 is a hemispherical hinge 120. The hemispherical hinge 120 includes a plurality of hinge joints 92. The hinge joints 92 include expansion links 100 that are connected with bumpers 122. The panels 12 have a pivotable connection on the hemispherical hinge 120.

FIG. 6C2 is a close-up view of a hinge 80 in a planar position. The hinge 80 is a hemispherical hinge 120. The hemispherical hinge 120 includes a plurality of hinge joints 92 that allow pivotable movement with the frames 86. A frame 86 is connected to a cover 14.

FIG. 6C3 is an exploded view of a hinge 80. Each expansion link 100 includes a spacer recess 98, an expansion projection 102, a pocket 104, and an expansion stop 108. Each expansion cap includes a fastener 8. The expansion links 100 and the expansion caps 106 connect at the spacer recess 98 and the fastener 8. Each bumper 122 includes a fastener 8. The expansion links 100 and the bumpers 122 connect at the spacer recess 98 and the fastener 8. The frames 86 include an expansion projection 102, a pocket 104, and an expansion stop 108. The frames 86 and the expansion links 100 pivotably connected at the expansion projections 102 and the pockets 104. The expansion projections 102 include a projection stop 103 that moves within the pocket until the projection stop 103 contacts the expansion stop 108.

Figure 10A:
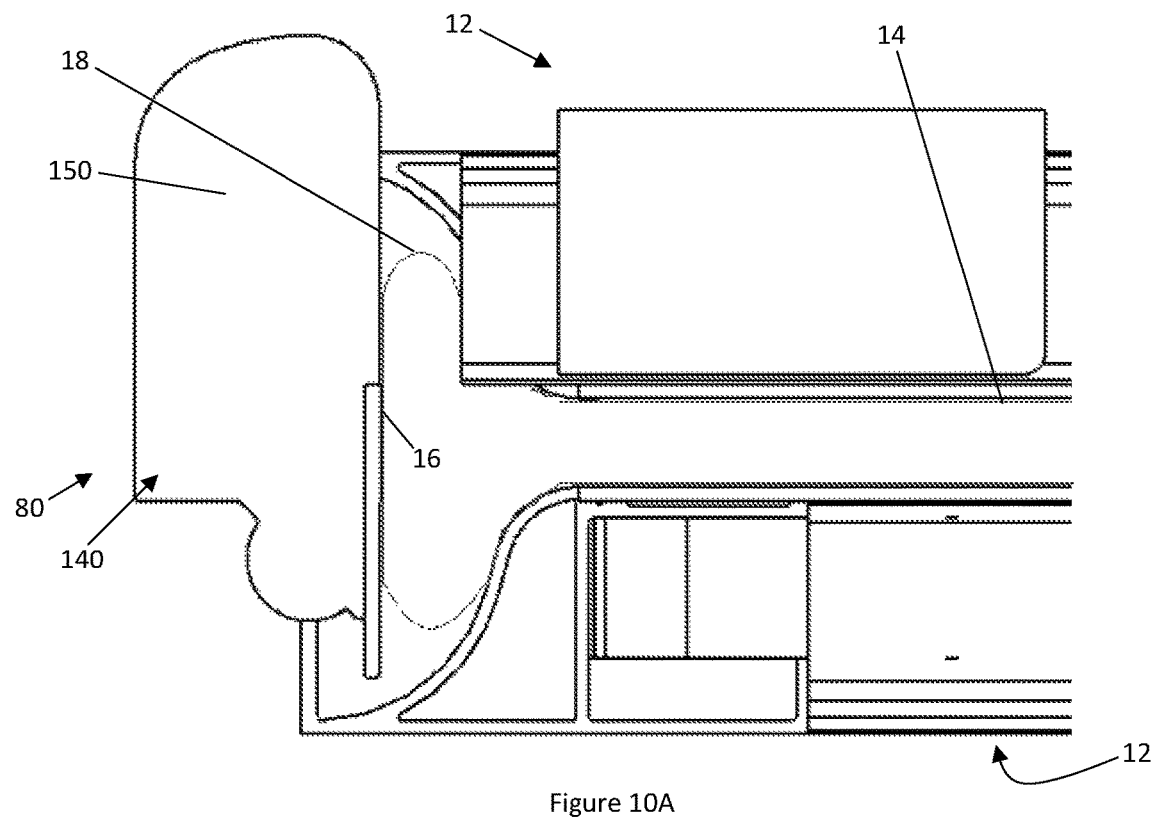
FIG. 10A is a close-up view of FIG. 8 in box X.
Figure 10B:
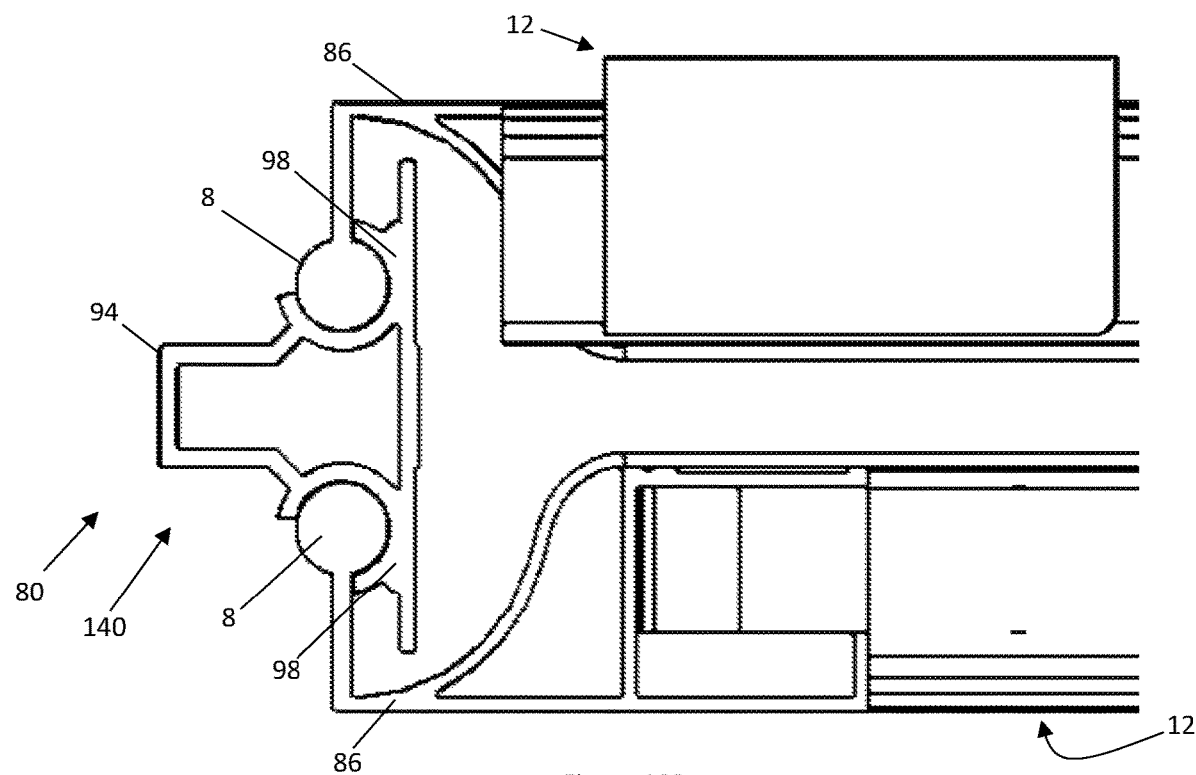
FIG. 10B is a close-up view of FIG. 8 in box X with the rotary stand (not shown) removed.

FIG. 6D1 is a close-up view of a partial hinge 80 from FIG. 5 in box VID. The hinge 80 is a standing hinge 140 that pivotably connects to the panels 12 so that the panels 12 are spaced apart and rotatable relative to each other. The standing hinge 140 maintains the panels 12 a distance apart once the panels 12 are moved from a planar position (as shown) into a stored position (as is shown in FIGS. 10A-10B).

FIG. 6D2 is a close-up view of a hinge 80 that is a standing hinge 140 with a rotary stand 150. The standing hinge 140 includes a spacer bar 94 that is connected to the rotary stand 150 at the standing cap 142. The spacer bar 94 connects the frames 86. The covers 14 of the panels 12 rest on the frames 86.

FIG. 6D3 is a close-up view of a hinge 80 without a rotary stand (not shown). The hinge 80 is a standing hinge 140 that includes a spacer bar 94. The spacer bar 94 includes spacer recesses 98 that connect with the fasteners 8 of the frames 86 to the spacer bar 94 via the spacer recesses 98. As shown, the spacer recess 98 includes the fastener 8 forming a hinge joint 92.

FIG. 6D4 is an exploded view of a hinge 80. The hinge 80 includes a spacer bar 94. The spacer bar includes spacer recesses 98 that form the sockets 148. The rotary stand 150 includes a standing cap 142. The frames 86 include fasteners 8 that are balls 146, which extend into the sockets 148 to form a movable connection between the hinge 80 and the frames 86 so that the frames 68 are supported by and movable relative to the hinge 80.

Figure 7:
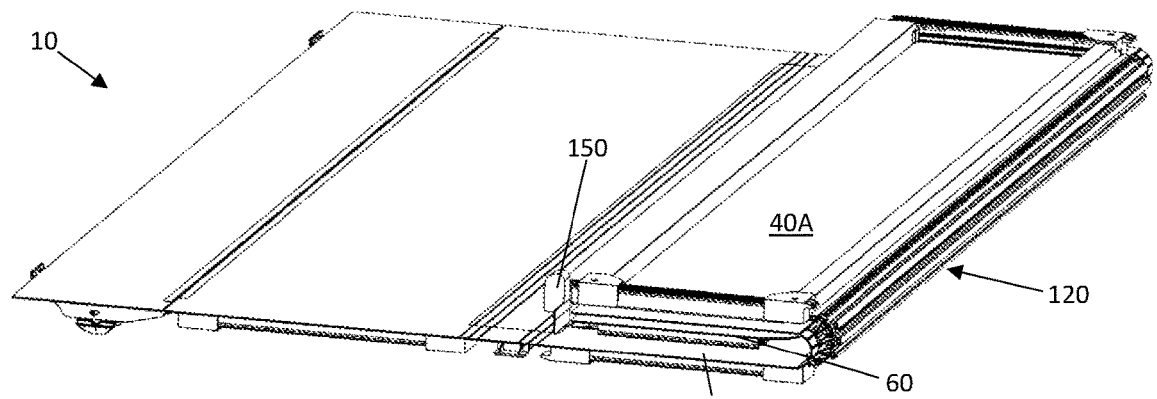
FIG. 7 is a top perspective view of a tonneau cover that is folded two times.

FIG. 7 is a top perspective view of a tonneau cover 10 that is folded two times. The tail panel 60 is folded over a first central panel 40A, and the first central panel 40A is folded over the second central panel 40B so that the long edge of the rotary stand 150 is extending perpendicularly away from the tonneau cover 10. The first central panel 40A is folded over the second central panel 40B so that the hemispherical hinge 120 is curved and supports one end of the first central panel 40A substantially parallel to and spaced apart from the second central panel 40B.

Figure 8:
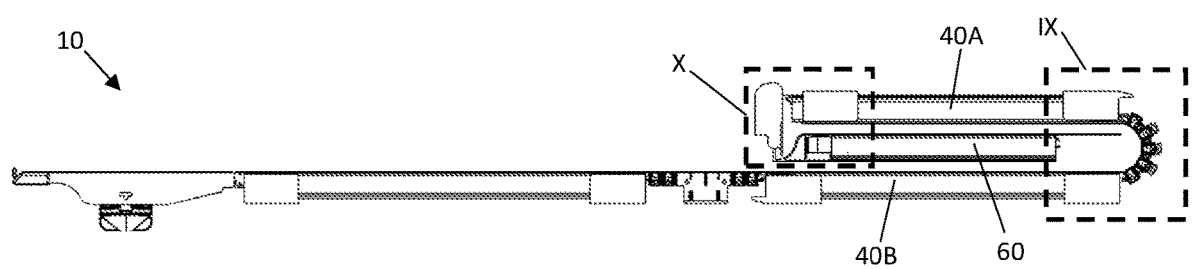
FIG. 8 is a side view of a tonneau cover that is folded two times.

FIG. 8 is a side view of a tonneau cover 10 that is folded two times and is in a partially stored position. The tail panel 60 is folded over the first central panel 40A, and the first central panel 40A is folded over the second central panel 40B so that the tail panel 60 is stacked on the second central panel 40B.

Figure 9A:
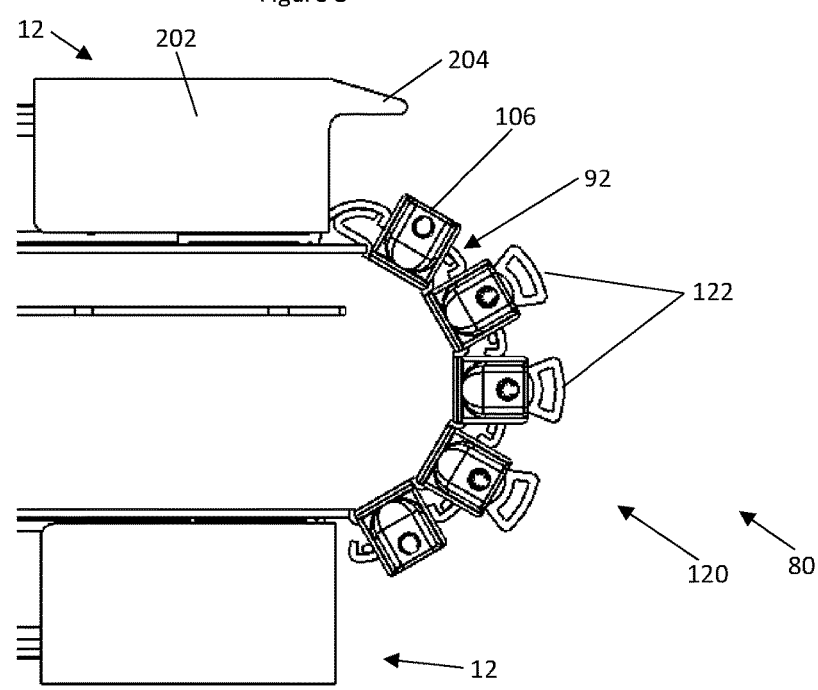
FIG. 9A is a close-up view of FIG. 8 in box IX.
Figure 9B:
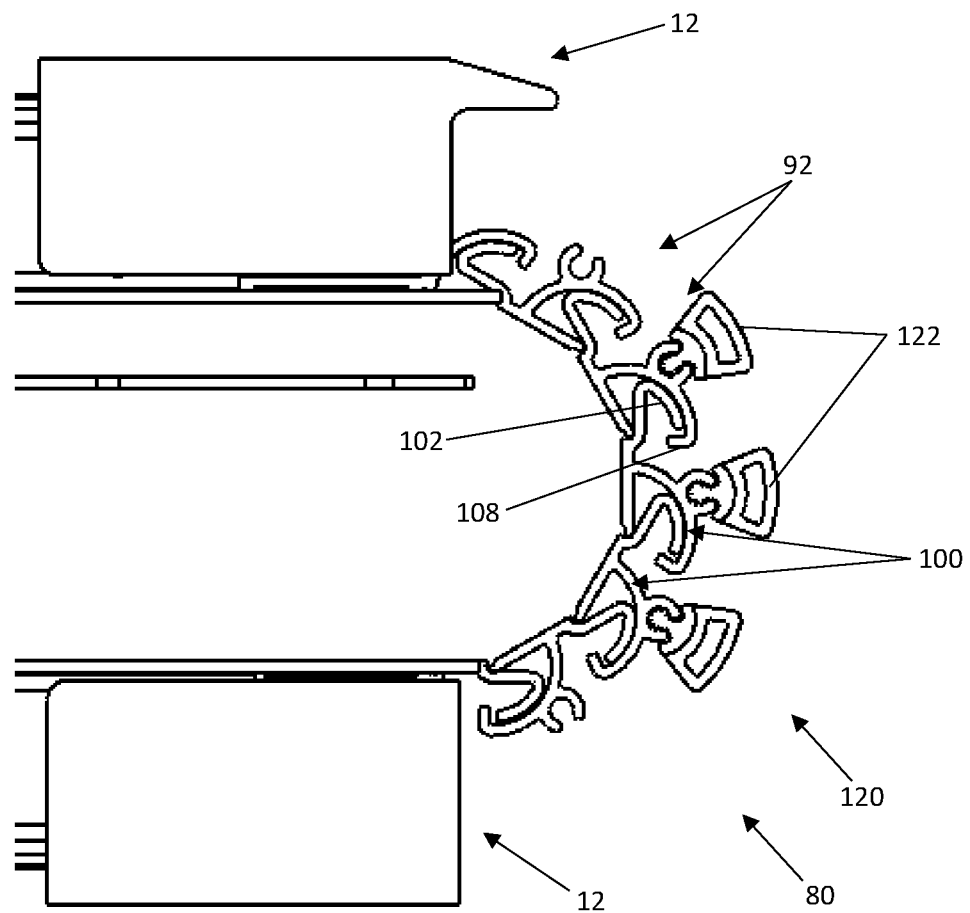
FIG. 9B is a close-up view of FIG. 8 in box IX with the expansion caps (not shown) removed.

FIG. 9A is a close-up view of the hinge 80 in FIG. 8 in box IX in a stored position. The hinge 80 is a hemispherical hinge 120 that is folded and connects the panels 12. The hemispherical hinge 120 includes bumpers 122 and hinge joints 92 that are covered by expansion caps 106 that cover the hinge joints 92. An end of the panel 12 includes a panel cap 202 and the panel cap 202 includes a panel extension 204 that assists in creating a connection FIG. 9B is a close-up view of FIG. 8 in box IX with the expansion caps (not shown) removed. The hinge 80 is a hemispherical hinge 120 that is folded and connects the panels 12. The hemispherical hinge 120 includes a plurality of hinge joints 92 and bumpers 122. The hinge joints 92 include expansion links 100 that form the individual connections in the hemispherical hinge 120. As shown, the expansion links 100 in the expanded state have expansion projections 102 that move until the expansion projections 102 contact the expansion stops 108. The expansion stops 108 determine a maximum amount of rotation of the hemispherical hinge 120.

Figure 9C:
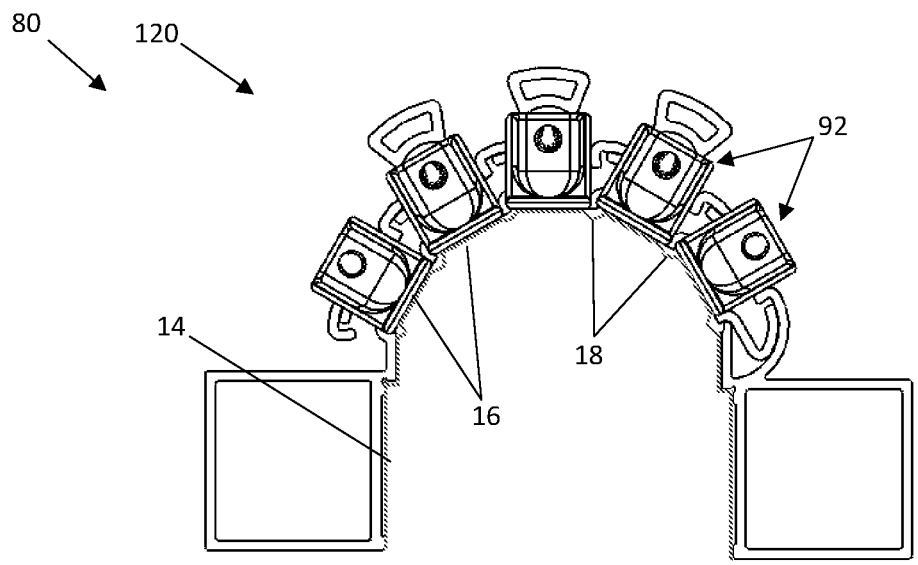
FIG. 9C is a close-up view of a hinge including a cover.

FIG. 9C is a close-up view of a hinge 80, which is a hemispherical hinge 120. The hemispherical hinge 120 includes a plurality of hinge joints 92. The cover 14 connects to the hinge joints 92 at connection locations 16 and has disconnection locations 18 between the hinge joints 92 where the cover 14 is movable when the hinge joints 92 are rotated from a planar position to a stored position.

FIG. 10A is a close-up view of FIG. 8 in box X. The hinge 80 is a standing hinge 140. The standing hinge 140 pivotably connects the panels 12. The rotary stand 150 extends from the standing hinge 140 to support one panel 12 relative to another panel (now shown). The cover 14, when in the stored position has connection locations 14 and disconnection locations 18 where the cover 14 is movable away from the hinge 80.

FIG. 10B is a close-up view of a hinge 80 of FIG. 8 in box X in a stored position with the rotary stand (not shown) removed. The hinge 80 is a standing hinge 140. The standing hinge 140 includes a spacer bar 94 and a spacer recess 98. The frames 86 include fasteners 8 connected to the hinge 80 via spacer recesses 98. The standing hinge 140 and the frames 86 have pivotable movement by the fasteners 8 rotating about the spacer recess 98. The panels 12 and frames 86 are connected.

Figure 11:
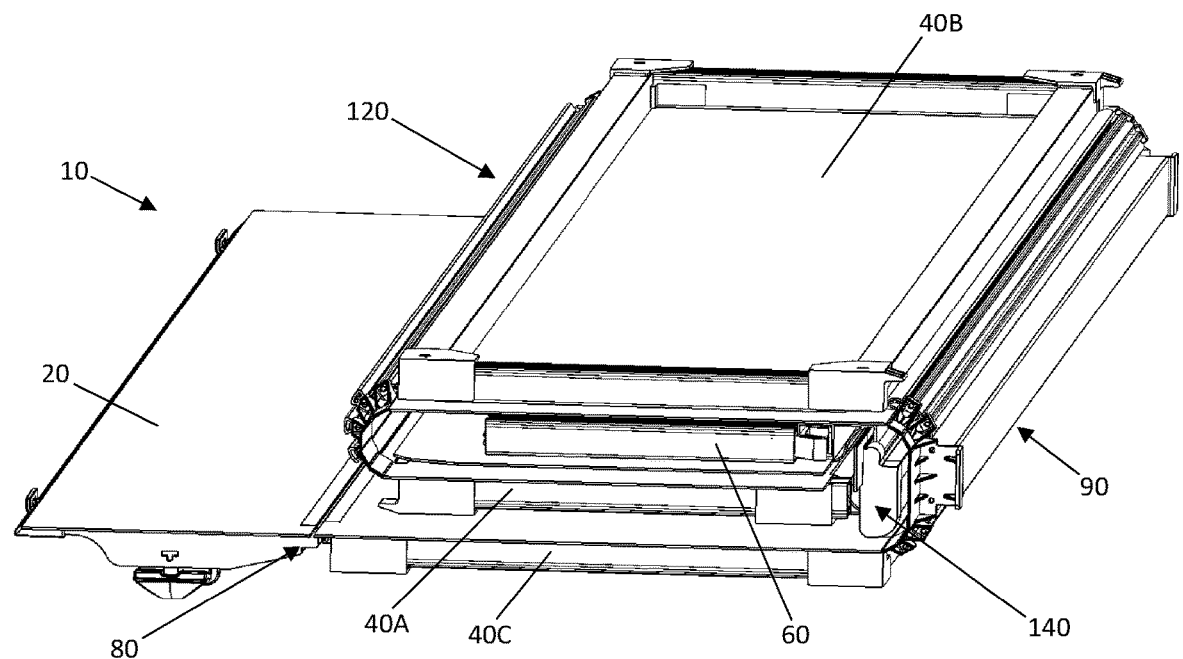
FIG. 11 is a top perspective view of a tonneau cover that is folded three times.

FIG. 11 is a top perspective view of a tonneau cover 10 that is folded three times and is in a partially stored position. The tail panel 60 is folded over the first central panel 40A at the standing hinge 140; the first central panel 40A is folded over the second central panel 40B at the hemispherical hinge 120; and the second central panel 40B is folded over the third central panel 40C at the extended hinge 90. The tonneau cover 10 is stacked such that the panels are stacked from top to bottom as the second central panel 40B, the tail panel 60, the first central panel 40A, and the third central panel 40C. The third central panel 40C and the cab panel 20 are pivotably connected at the hinge 80.

Figure 12:
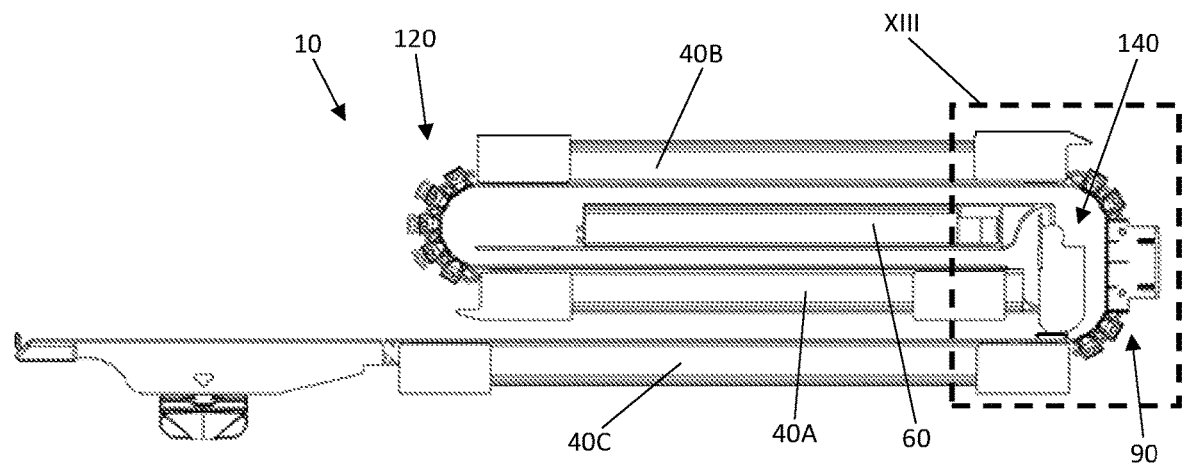
FIG. 12 is a side view of a tonneau cover that is folded three times.

FIG. 12 is a side view of a tonneau cover 10 that is folded three times. The tonneau cover 10 is stacked such that the panels are stacked from top to bottom as the second central panel 40B, the tail panel 60, the first central panel 40A, and the third central panel 40C. A standing hinge 140 is connected to and extends between the tail panel 60 and the first central panel 40A. The standing hinge 140 is supported by contacting the third central panel 40C. A hemispherical hinge 120 is connected to and extends between he first central panel 40A and the second central panel 40B. An extended hinge 90 is connected to and extends between the second central panel 40B and the third central panel 40C and the extended hinge 90 supports the second central panel 40B so that the first central panel 40A and the tail panel 60 are located between the second central panel 40B and the third central panel 40C.

Figure 13A:
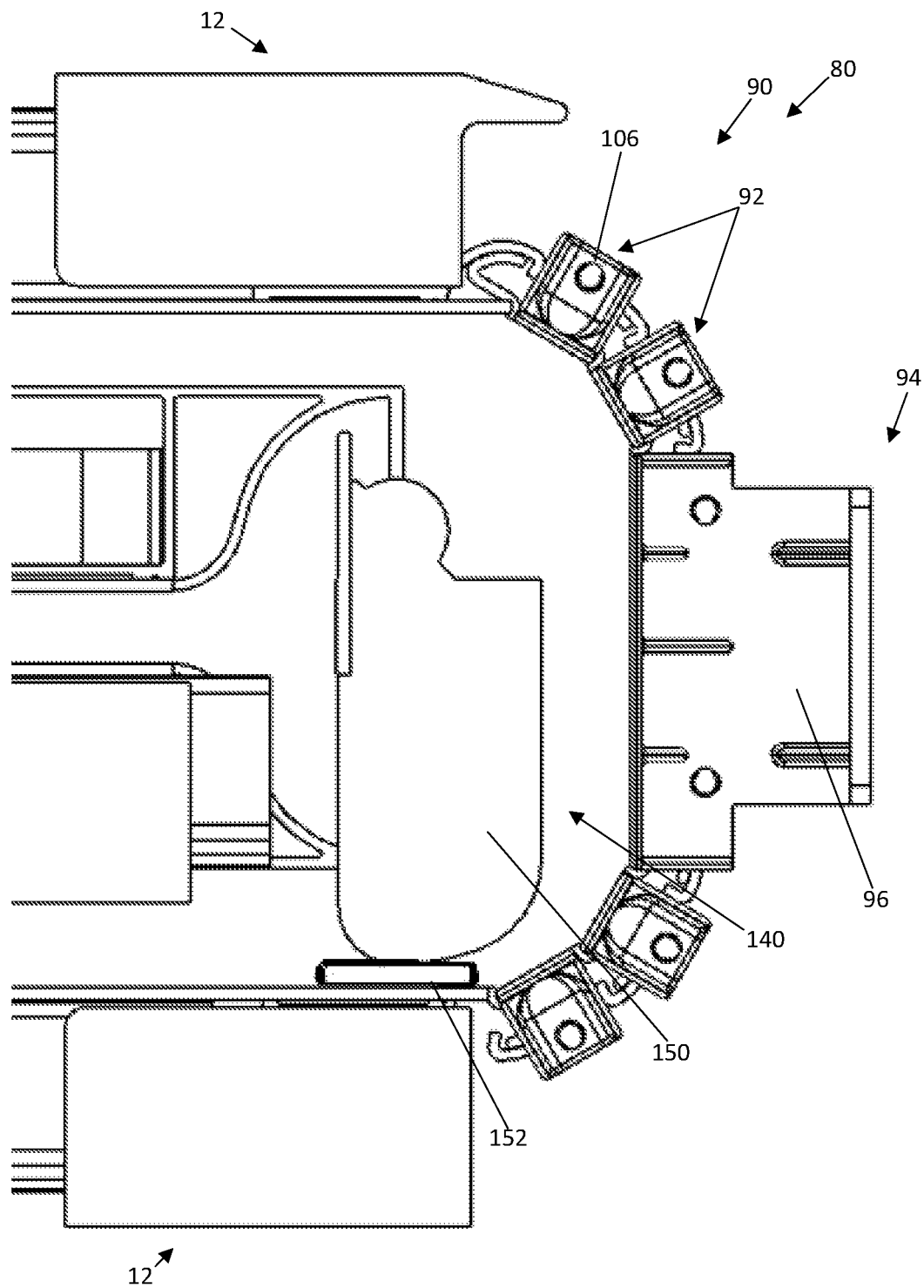
FIG. 13A is a close-up view of FIG. 12 in box XIII.

FIG. 13A is a close-up view of the extended hinge 90 of FIG. 12 in box XIII in a stored position. The hinge 80 is an extended hinge 90 including a spacer bar 94. The spacer bar 94 includes a spacer cap 96. The extended hinge 90 includes hinge joints 92 on both sides of the spacer bar 94. The extended hinge 90 pivotably connects the panels 12. The standing hinge 140 includes a rotary stand 150 that contacts the stand support 152. The stand support 152 separates the panel 12 and the rotary stand 150.

Figure 13B:
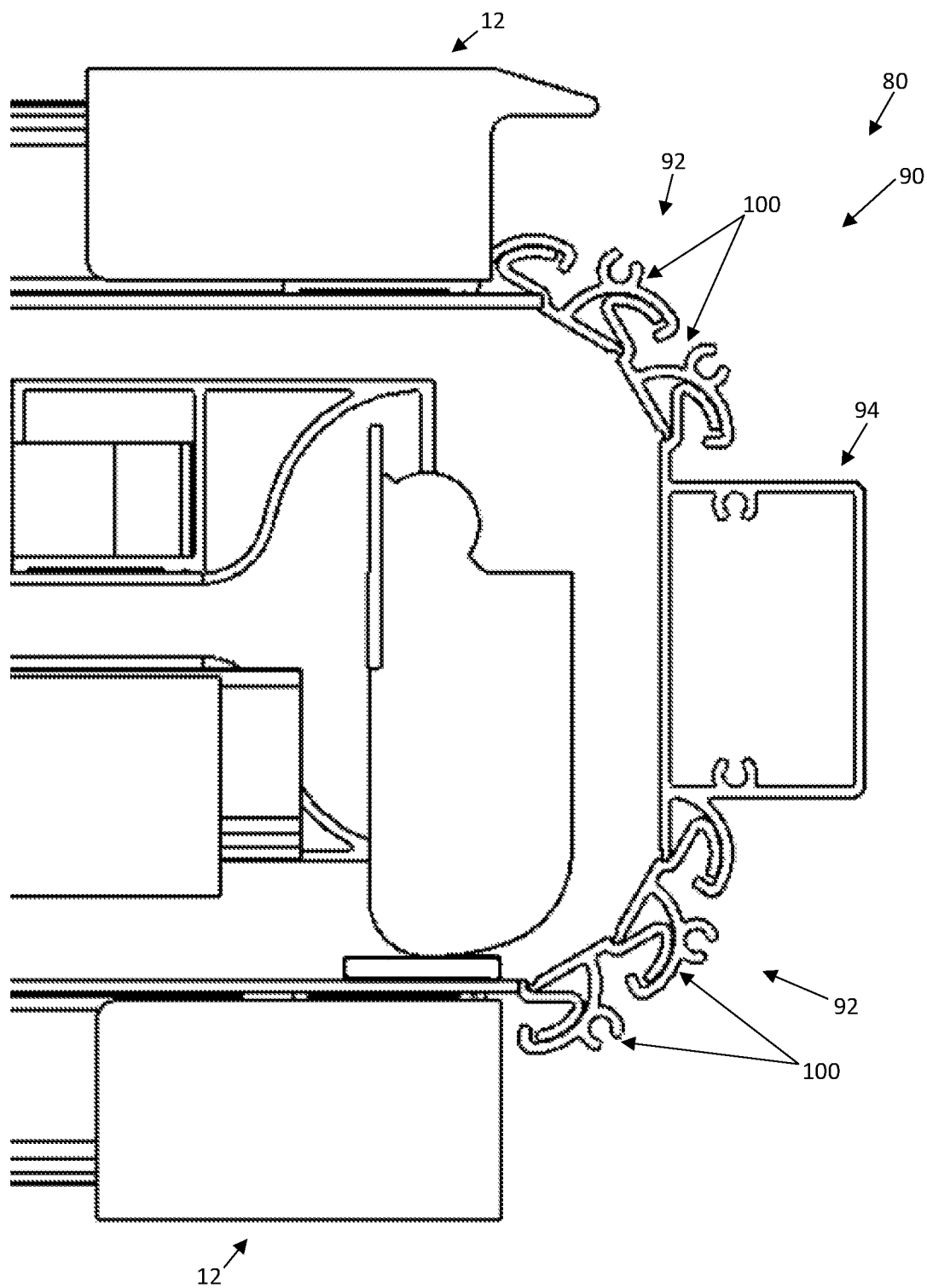
FIG. 13B is a close-up view of FIG. 12 in box XIII with the extension caps (not shown) and the spacer cap (not shown) removed.

FIG. 13B is a close-up view of FIG. 12 in box XIII with the extension caps (not shown) and the spacer cap (not shown) removed. One of the hinges 80 is an extended hinge 90. The extended hinge 90 includes a spacer bar 94 and hinge joints 92 on both sides of the spacer bar 94. The hinge joints 92 include and are connected by extension links 100. The extended hinge 90 pivotably connects the panels 12.

Figure 14:
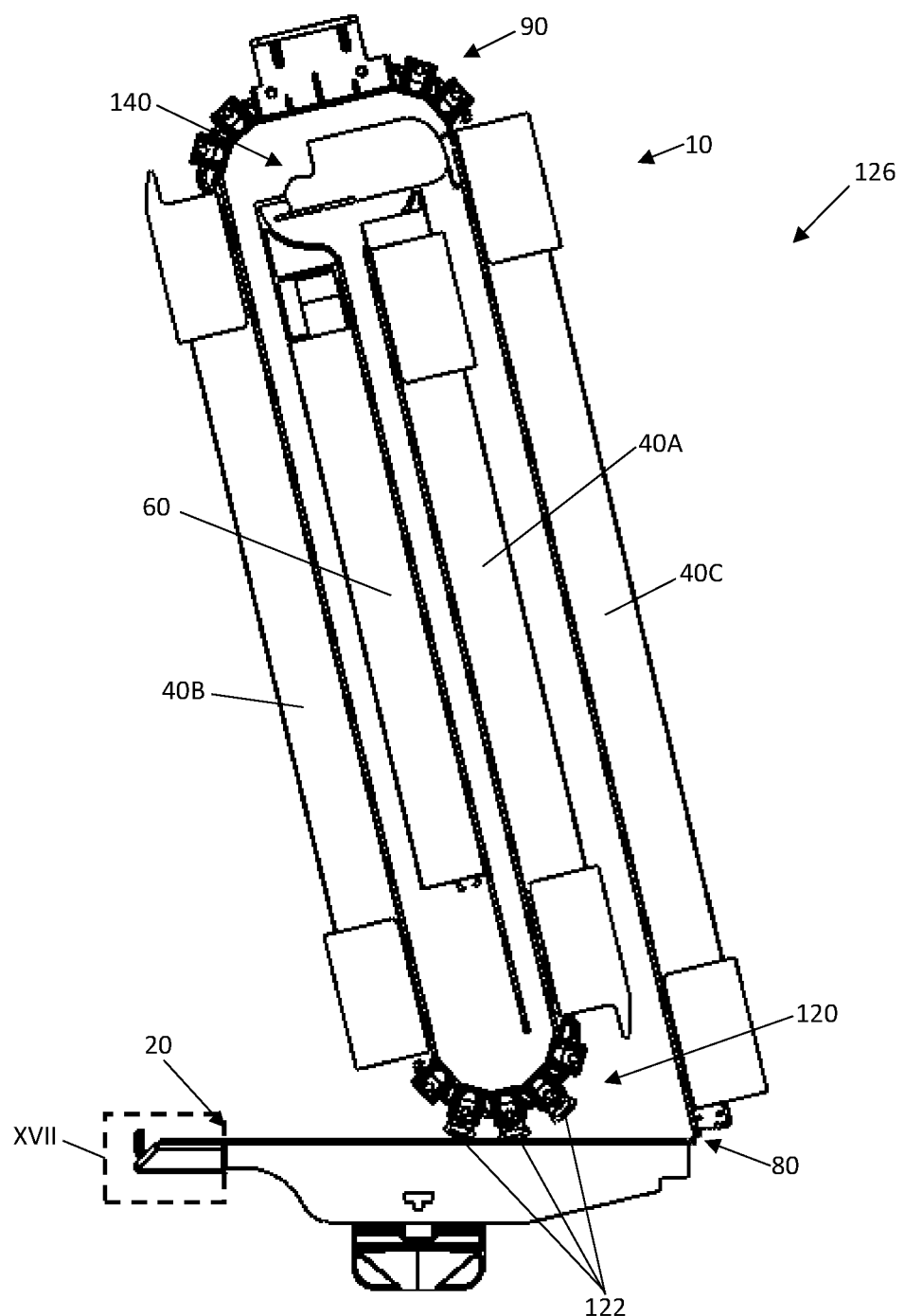
FIG. 14 is a side view of a tonneau cover that is folded four times.

FIG. 14 is a side view of a tonneau cover 10 that is folded four times into a completely stored position 126. The tail panel 60 is folded over the first central panel 40A at the standing hinge 140; the first central panel 40A is folded over the second central panel 40B at the hemispherical hinge 120; and the second central panel 40B is folded over the third central panel 40C at the extended hinge 90. The third central panel 40C is partially folded over the cab panel 20 such that the bumpers 122 support the tonneau cover 10 on the cab panel 20. The tonneau cover 10 is stacked such that the panels are stacked from left to right as the second central panel 40B, the tail panel 60, the first central panel 40A, and the third central panel 40C. The third central panel 40C and the cab panel 20 are pivotably connected at the hinge 80.

Figure 15A:
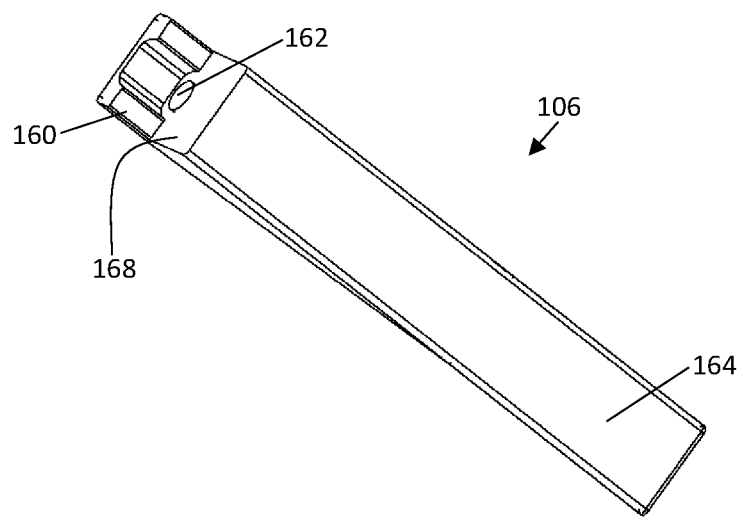
FIG. 15A is a top perspective view of an extension cap.

FIG. 15A is a top perspective view of an expansion cap 106. The expansion cap 106 has a tab 160 that extends under the expansion links (not shown) to assist in forming a connection with a fastener or other connection device passes into the connection feature 162, shown as a recess, in a vertical wall 168. A cap 164 extends from on opposite side (e.g., both vertically and laterally (i.e., diagonally)) of the vertical wall 168 as the tab 160.

Figure 15B:
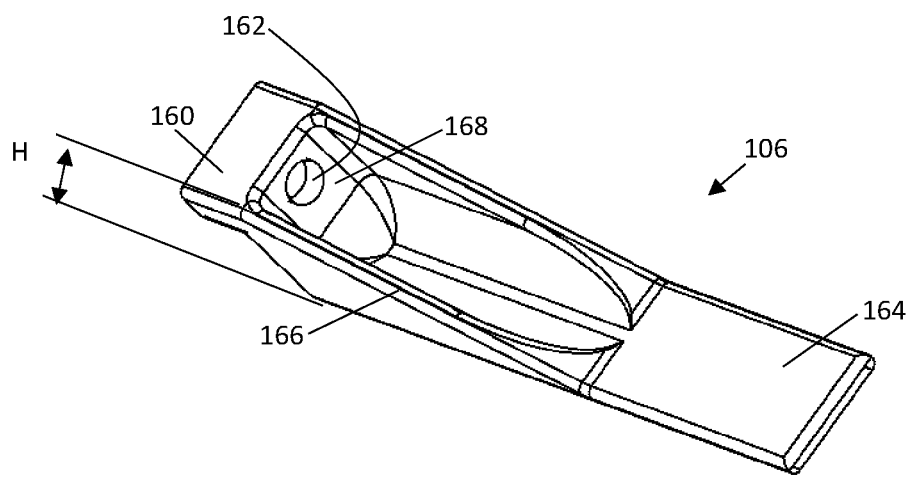
FIG. 15B is a bottom perspective view of an extension cap.

FIG. 15B is a bottom perspective view of an expansion cap 106. The expansion cap 106 has a vertical wall 168 having a height (H) and the vertical wall 168 includes a connection feature 162. A tab 160 extends from a bottom of the vertical wall 168 in a first direction and a cap 164 extends from the top of the vertical wall 168 in a second direction. A bottom surface of the cap 164 includes an extension taper 166. The extension taper 166 extends upward so that the expansion cap 106 does not contact a side rail or a bed cap (not shown) that supports the tonneau cover (not shown) and so that the expansion cap 106 maintains a substantially flush position with a side rail of the vehicle bed.

Figure 16:
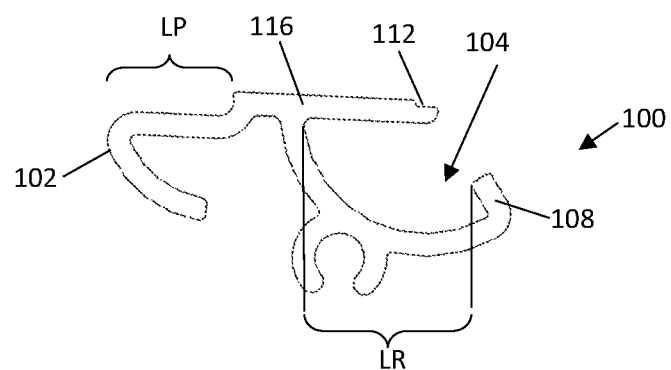
FIG. 16 is a side view of an expansion link.

FIG. 16 is a side view of an expansion link 100 having an expansion projection 102 having a length (LP) in a first direction and a pocket 104 that extends in a second direction. The pocket 104 has a length (LR) that terminates on an inside location of an expansion stop 108 that extends from the pocket 104. The expansion stop 108 prevents rotational movement of an adjacent expansion projection 102 (not shown) within the pocket 104. An upper surface 116 of the expansion link 100 is generally planar but includes a hinge step 112 that is free of contact with a cover (not shown) and allows one expansion link 100 to rotate relative to another expansion link (not shown). A pocket 114 is formed between the upper surface 116 of the expansion link 100 and the pocket 104 so that an expansion projection 102 of an adjacent expansion link 100 can extend into the pocket 114 and move within the pocket 114.

Figure 17:
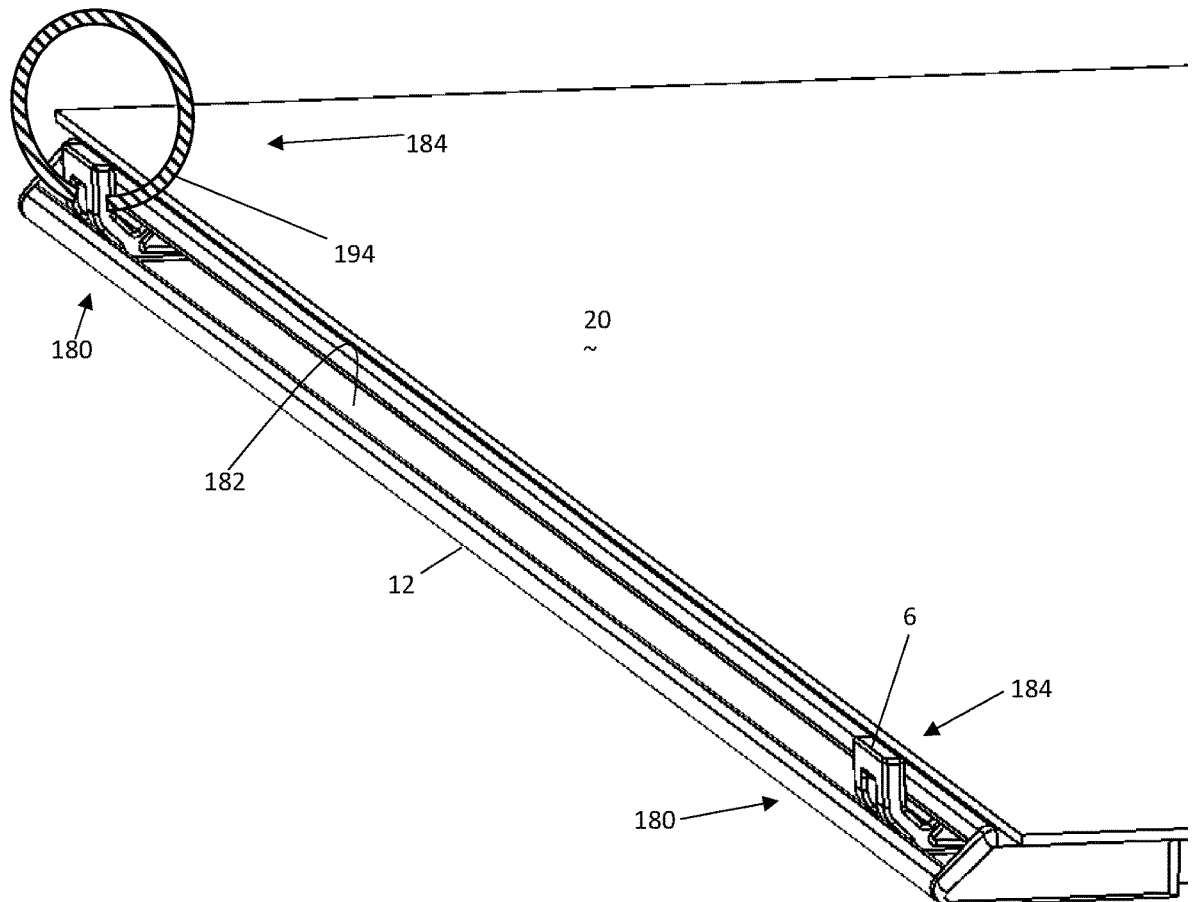
FIG. 17 is a perspective view of a tonneau connector of FIG. 14 within Box XVII.

FIG. 17 is a perspective view of the tonneau connector 180 of FIG. 14 in box XVII. The tonneau connector 180 includes a track 182 within a panel 12 so that the slider 184 that is a connector 6 which is movable relative to the panel 12. The panel 12 is a header panel 20. The slider 184 includes a tether 194 that connects the slider 184 and the header panel 20 to a vehicle (not shown).

Figure 18:
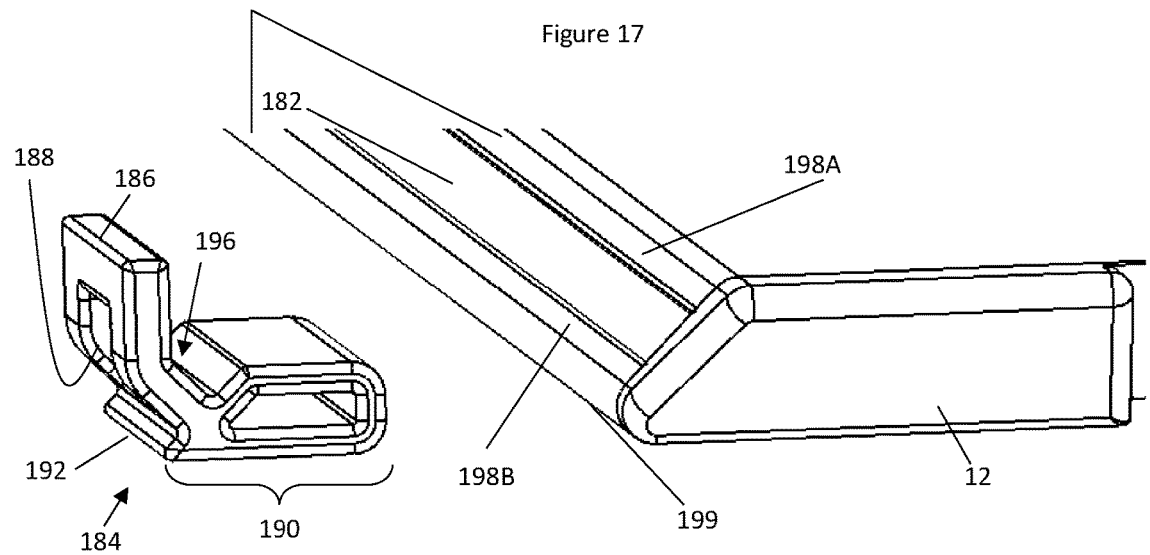
FIG. 18 is a close-up exploded view of the slider removed from the track in the panel.

FIG. 18 is an exploded close-up view of the tonneau connector 180 with the slider 184 removed from the track 182 within the panel 12. The slider 184 includes a track arm 190 that extends into the track 182 and a track connector 192 that assists in preventing the track arm 190 from being removed from the track 182 by the track connector 192 contacting a lip 199 on the lower track wall 198B. A track recess 196 is located between the track arm 190 and the connection arm 186 that restricts movement of the slider relative to the tonneau cover and prevents the slider 184 from being removed from the track 182. The track 182 is formed within a track wall 198. The track wall 198 has an upper track wall 198A that extends into the track recess 196 and a lower track wall 198B that extends towards a bottom surface of the track arm 184. The slider 184 includes a connection arm 186 with a connection recess 188 that receives a connector or a strap (not shown) that connects the tonneau cover to a vehicle or a bed of a vehicle.

Figure 19:
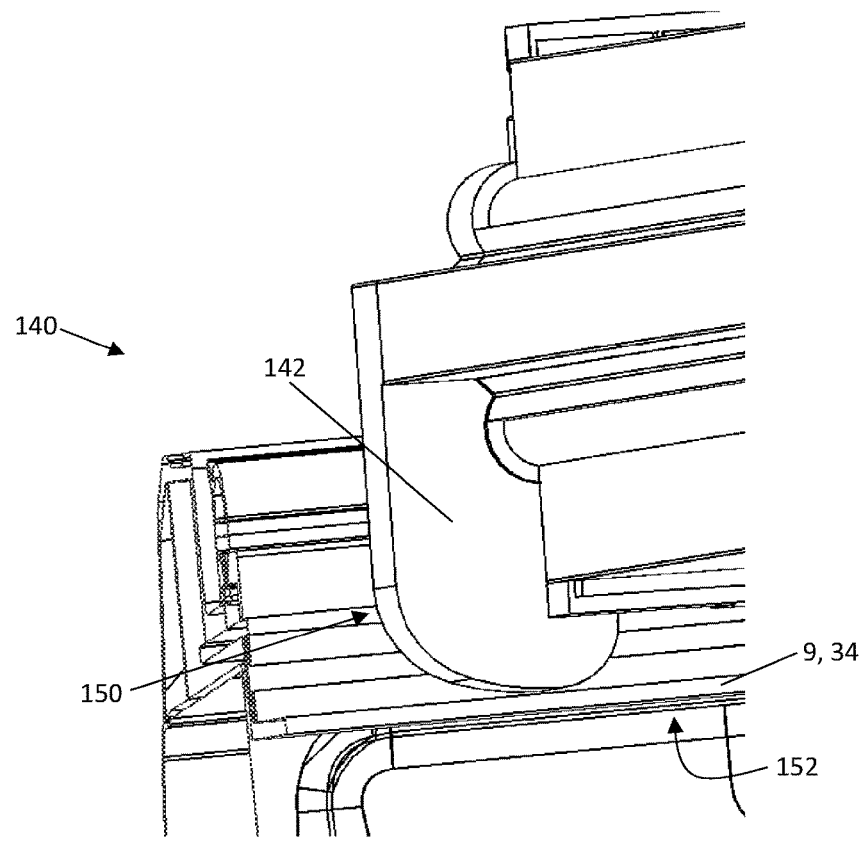
FIG. 19 is a partial perspective view of a standing hinge engaged with a rail cap and/or a support rail.

FIG. 19 is a front perspective view of a standing hinge 140 lifting a panel above a stand support 152. The standing hinge 140 includes a standing cap 142 and includes a rotary stand 150 that elevates the panels. The stand support 152 is part of the rail cap 9 but may be a support rail 34 that provides support for the rotary stand 150 so that the panels are elevated.

Figure 20:
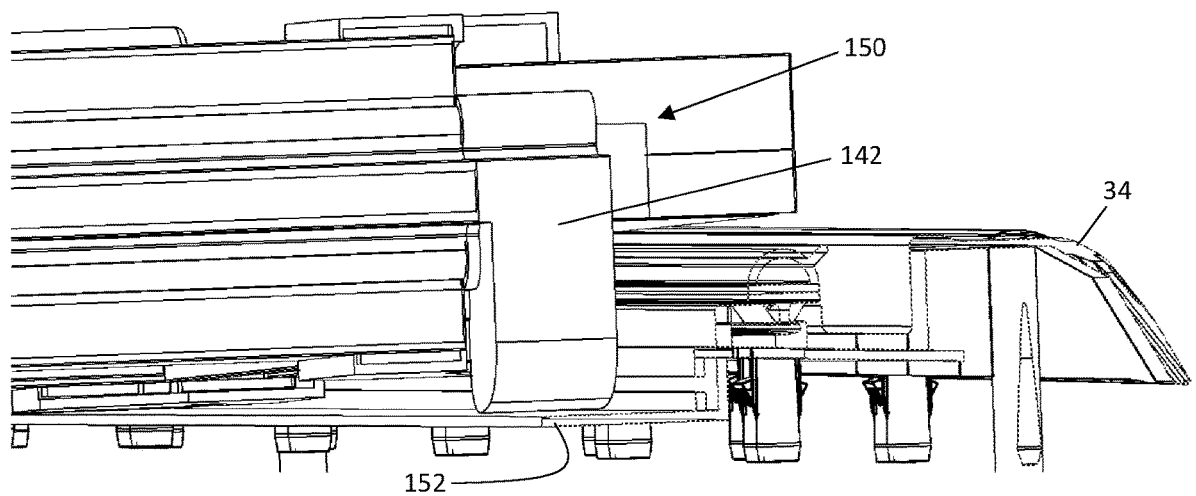
FIG. 20 is a front view of the standing hinge lifting a panel above the rail cap and/or support rail.

FIG. 20 is a front view of a rotary stand 150 with the standing cap 142 lifting the panels above the stand support 152. The stand support 152 as shown is part of the support rail 34.

Figure 21:
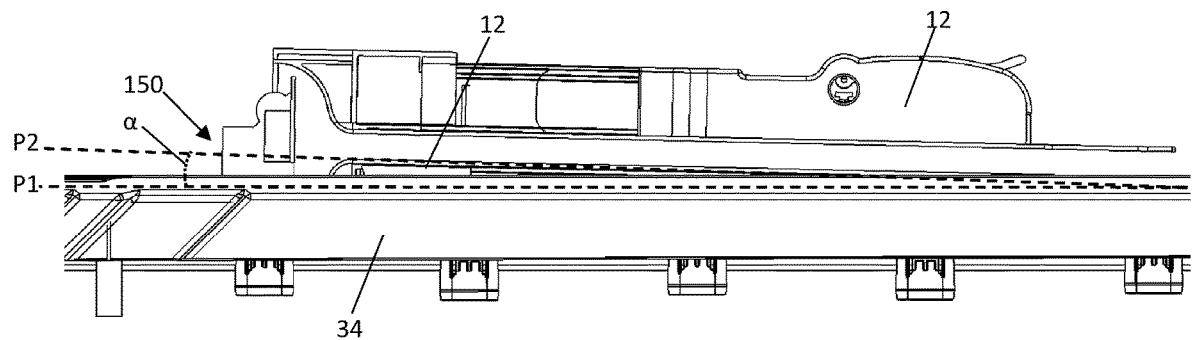
FIG. 21 is a side view of the standing hinge lifting the panel above the rail cap and/or support rail.

FIG. 21 illustrates a side view of the rotary stand 150 lifting the two panels 12 above the support rail 34. The rotary stand 150 elevates the panels 12 a distance so that an angle (α) is formed between a plane (P1) of the top surface of the support rails 24 and a plane (P2) of a top surface of a panel 12.

Figure 22:
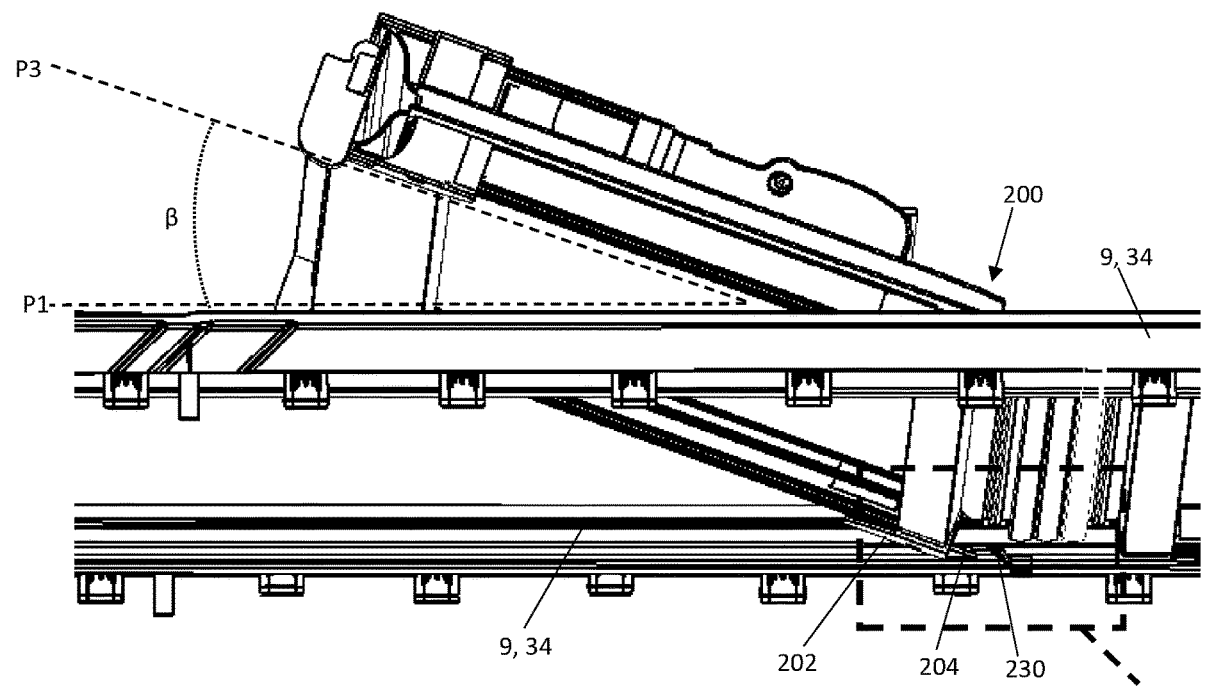
FIG. 22 illustrates the rotary lock forming a connection with a rail lock.

FIG. 22 illustrates a rotary lock 200 being moved towards a locked position. The rotary lock 200 includes a panel cap 202 with a panel extension 204 that extends therefrom. The panel extension 204 extends under and catches the rail lock 230 so that when the panels are closed the panels cannot be lifted open. The rail lock 230 is connected to an extends from a rail cop 9 or a support rail 34. As shown, a bottom of the panels have a plane (P3) and a top of the rail cap 9 or support rail 34 have a plane (P1) with the planes being separated by an angle (p) so that the rail lock 230 and the panel extension 204 form a connection.

Figure 23:
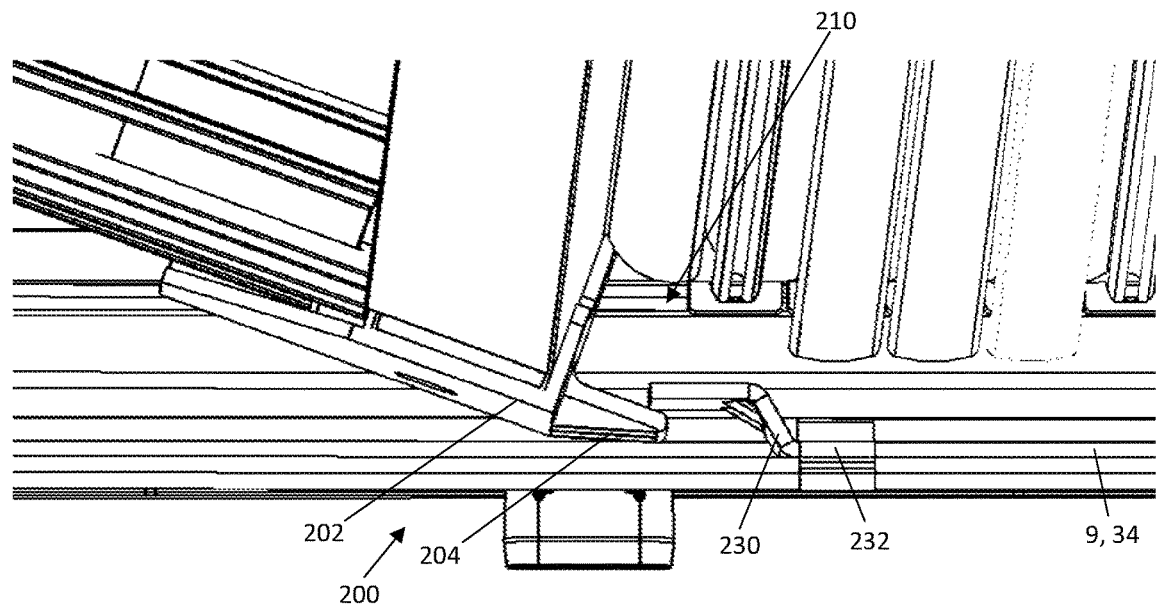
FIG. 23 is a close-up view of the rotary lock connecting with the rail lock in box XXIII of FIG. 22.

FIG. 23 is a close-up view of the connection between the panel extension 204 of the rotary lock 200 and the rail lock 230 shown in box XXIII of FIG. 22. The rotary lock 200 is partially open 210 so that the panel extension 204 of the panel cap 202 extends under the rail lock 230 that is connected to the rail cap 9 or the support rail 34 by a rail attachment 232.

Figure 24:
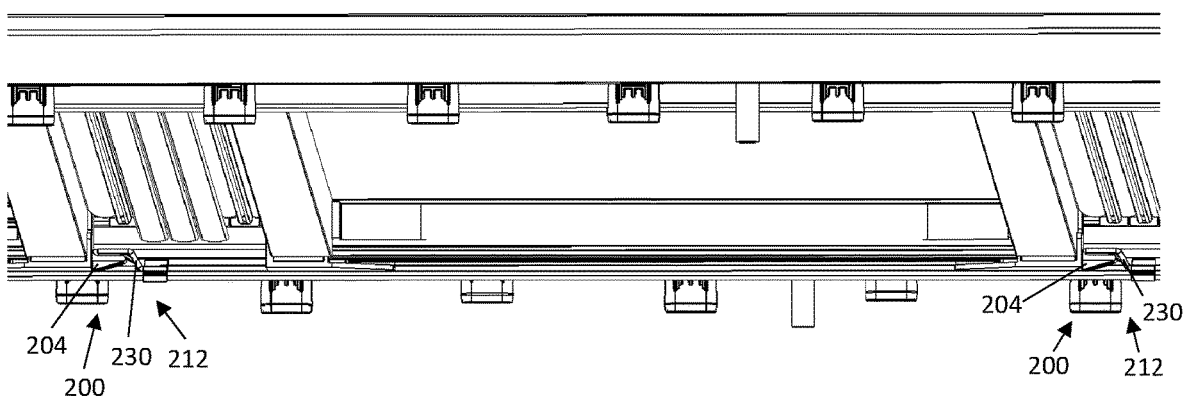
FIG. 24 is a side view of the rotary locks engaged with rail locks.

FIG. 24 illustrates a bottom perspective view of the rotary locks 200 in a locked position 212 so that the panels are prevented from being opened. The rotary locks 200 have panel caps 202 with panel extensions 204 that extend under the rail locks 230 to form the locked position 212 when the panels are coplanar.

Figure 25:
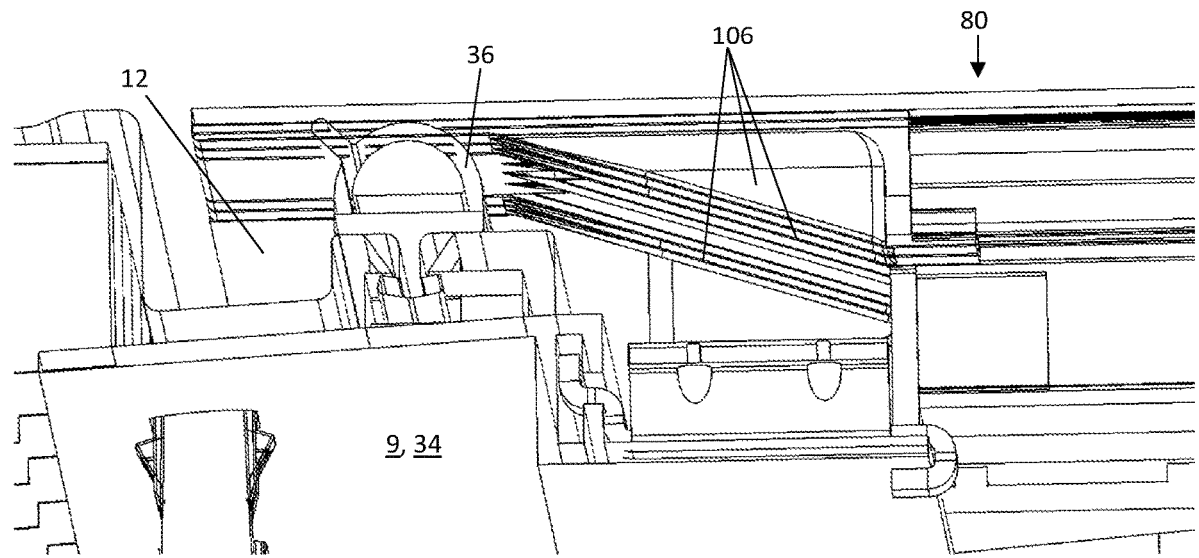
FIG. 25 is a bottom perspective view of the expansion caps in contact with a seal so that fluid is retained within a channel in the rail cap and/or support rail.

FIG. 25 is a bottom perspective view of a hinge 80 with a plurality of expansion caps 106 extending from an end of the panels 80 over a seal 36. The expansion caps 106 extend the hinges 80 so that an end of the hinges 80 and an end of the panels 12 end at a same location. The seal 36 is supported above a rail cap 9 or a support rail 34.

Figure 26:
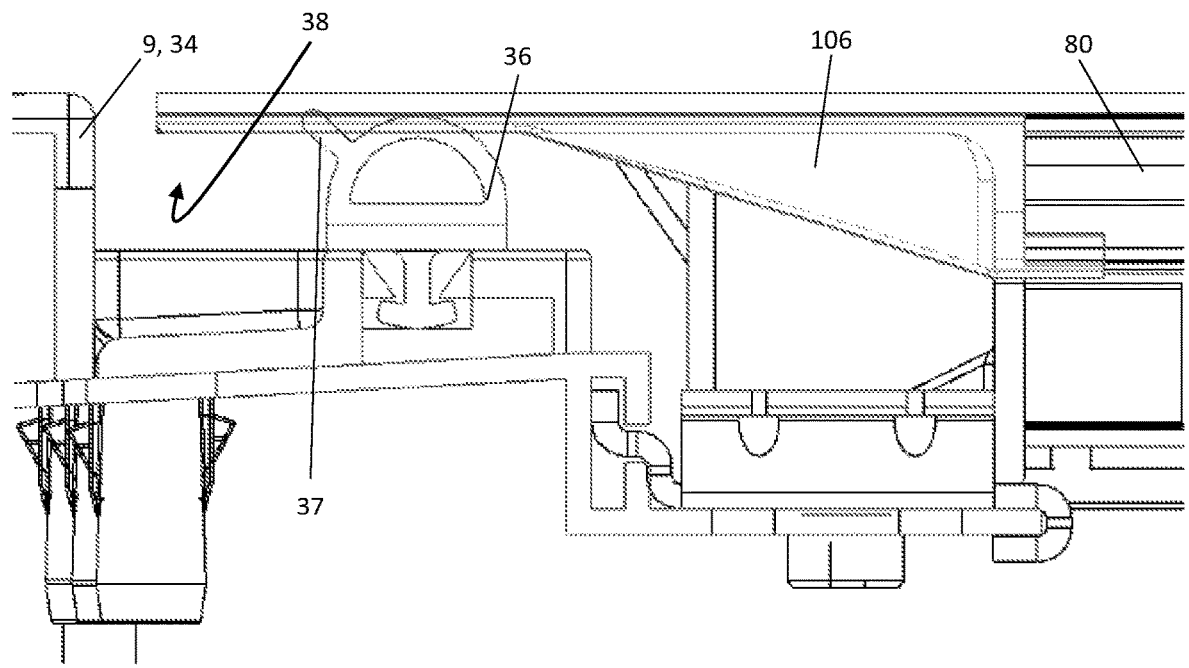
FIG. 26 is a cross-sectional view illustrating the seal being compressed by the expansion caps to create a seal.

FIG. 26 is a side view of the hinge 80 with the expansion caps 106 extending over the seal 36 to prevent fluid from extending into a bed (not shown). The seal 36 creates a channel 38 within the rail cap 9 and/or the support rail 34 that prevents fluid from entering the bed. The seal 36 may be generally "D" shaped and may include one or more seal fingers 37 that also assist in creating a seal.

Figure 27:
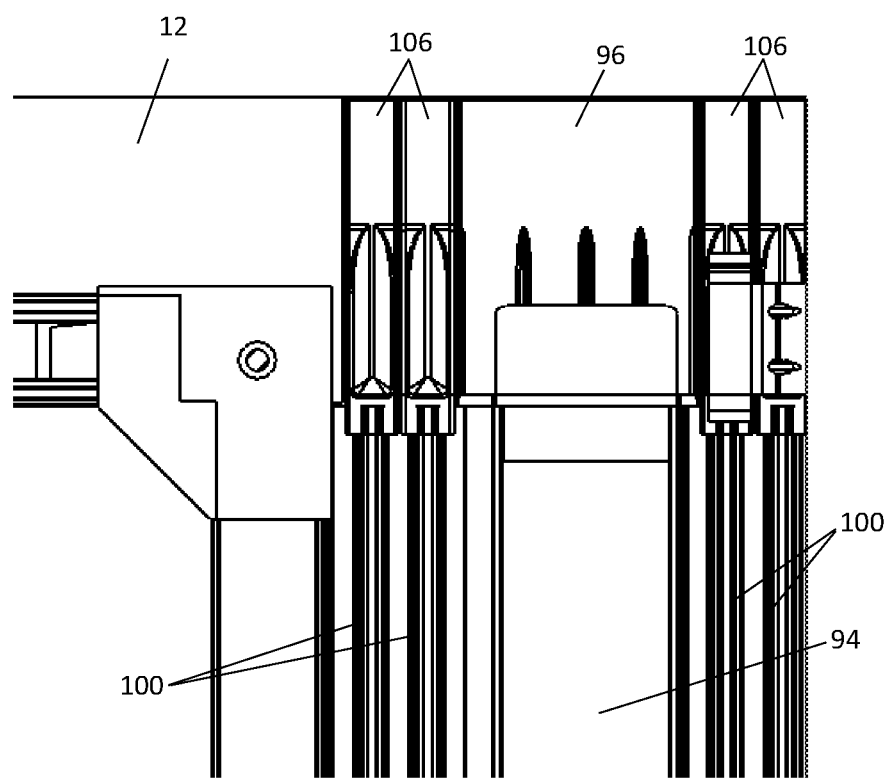
FIG. 27 is a bottom view of the end caps extending from an end of the hinges so that an end of the panels and an end of the panels are coplanar.

FIG. 27 is a bottom view of expansion links 100 with a spacer bar 94 located there between. The expansion links 100 include the expansion caps 106 that extend the expansion links 100 and spacer bar 94 so that their ends and the end of the panel 12 are coplanar and form a substantially straight line.

Figures 28, 29:
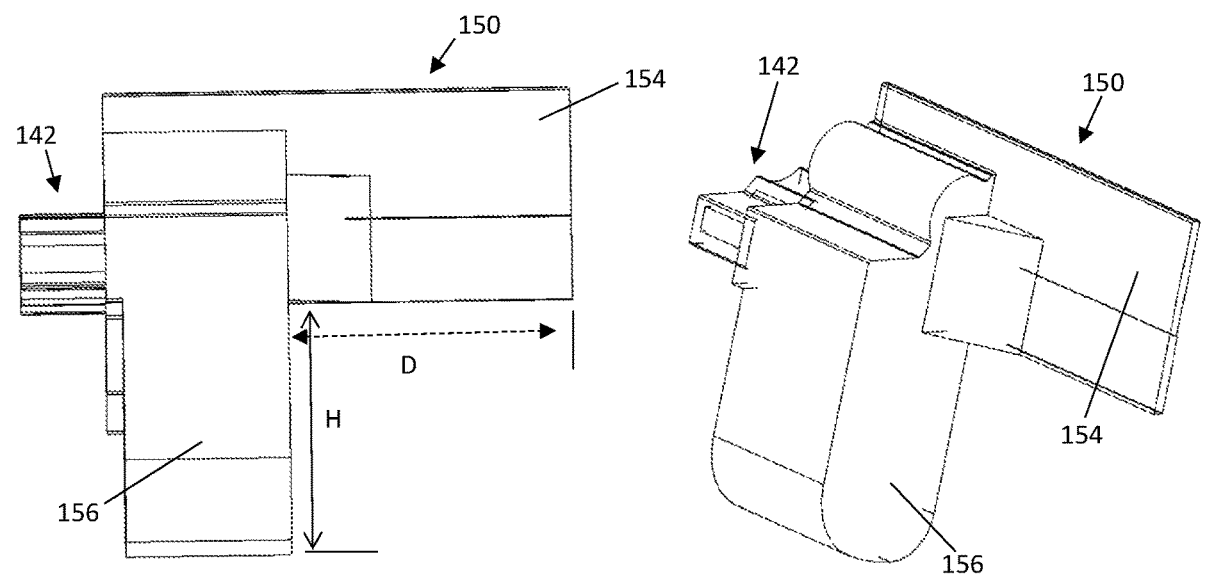
FIG. 28 a bottom view of a standing cap.
FIG. 29 is a bottom perspective view of a standing cap.

FIG. 28 illustrates a bottom view of the rotary stand 150. The rotary stand 150 includes a standing cap 142 that extends on a first side and an extension arm 154 that extends on a second side of the standing leg 156. The extension arm 154 extends a distance (D) to extend an edge or the rotary stand 150 to an edge of the panels (not shown). The standing leg 156 has a height (H) that determines an amount of lift provided to the panels (not shown).

FIG. 29 illustrates a bottom perspective view of the rotary stand 150 with the standing cap 142 extending from a first side of the standing leg 156 and the extension arm 154 extending from a second side of the standing leg 156. The extension arm 154 assists in extending the hinge (not shown) to an end of the panels (not shown).

Figures 30, 31:
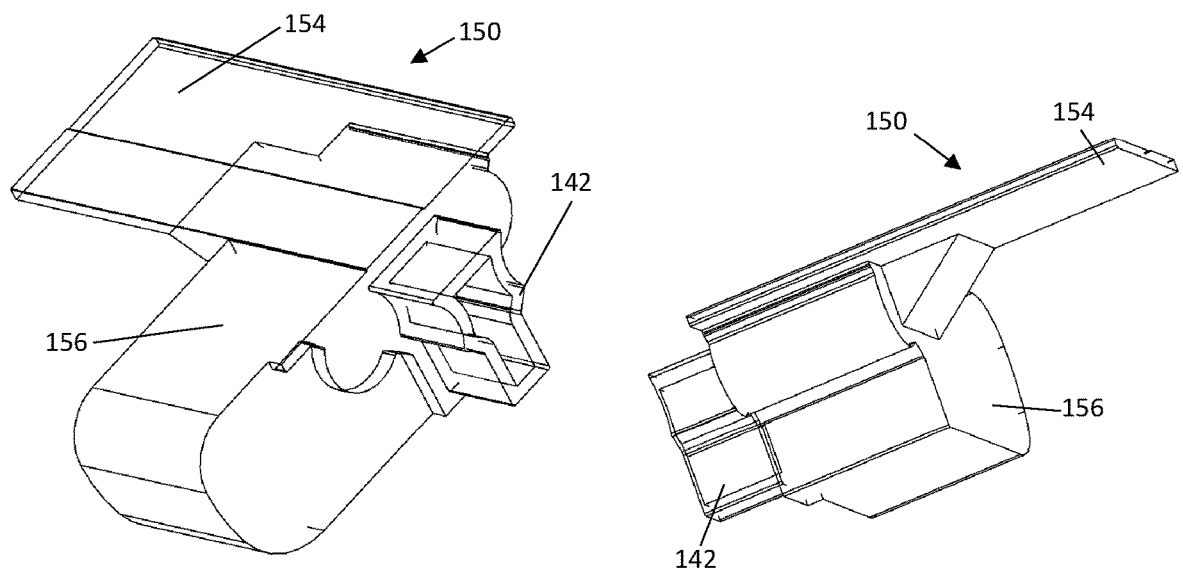
FIG. 30 is a top perspective view of a standing cap from a first side.
FIG. 31 is a top perspective view of a standing cap from a second side.

FIG. 30 is a top perspective view illustrating the rotary stand 150 having a standing leg 156 with an extension arm 154 extending in a first direction to form a seal and a standing cap 142 extending in a second direction to form a connection with a hinge (not shown).

FIG. 31 is a bottom perspective view of the rotary stand 150 illustrating the extension arm 154 extending in a first direction from the standing leg 156 and the standing cap 142 extending in a second diction from the standing leg.

The present teachings may include a tonneau cover with each of the plurality of expansion links move so that one or more of the plurality of panels rotates about 20 degrees or more and about and about 60 degrees or less; each of the plurality of expansion links move so that one or more of the plurality of panels rotate about 25 degrees or more and about 35 degrees or less; some the expansion projections are movable within one or more pockets so that when the one or more expansion projections move within a pocket of the adjacent one of the plurality of expansion links the hinge rotates one of more of the plurality of panels; the one or more expansion stops are located at an end of each of the one or more pockets; a length of the one or more pockets, a length of the one or more expansion projections, or both are varied to determine the angle the one or more hinges rotate; some or all of the plurality of expansion links include one or more spacer recesses; some or all of the expansion links include an upper surface and the upper surface includes one or more hinge steps; the one or more hinge steps receive a portion of the upper surface of the adjacent one of the plurality of expansion links so that an upper surface of the hinge is planar when the hinge is in a closed position; each of the plurality of panels include or are connected to one or more frames and some or all of the one or more frames include one of the one or more expansion projections or one of the one or more pockets that connect the frame to the plurality of expansion links forming one of the one or more hinges that rotates two of the plurality of panels relative to each other; one or more of the one or more hinges includes one or more spacer bars; one or more of the plurality of hinges is free of one or more spacer bars; the one or more hinges includes three or more expansion links and six or less expansion links; or a combination thereof.

The present teachings provide a tonneau cover including: one or more covers are a single cover that extends over all of the plurality of panels and all of the one or more hinges; the one or more covers is a cover that extends over all or a portion of one or more of the plurality of panels and all or a portion of one or more of the one or more hinges; the one or more covers are two covers and the two covers each extend over all or a portion of a panel of the plurality of panels and all or a portion of one of the one or more hinges and abut an adjacent one of the two covers or overlap an adjacent one of the two covers; one or more of the one or more hinges are an extended hinge or a hemispherical hinge and the one or more hinges include: two or more expansion links each including: (i) an expansion projection; (ii) a pocket that receives the expansion projection from an adjacent link; and an expansion stop located at an end of the pocket, the expansion stop restricting movement of the expansion projection within the pocket; the cover is connected to the plurality of panels, the one or more hinges, or both at a plurality of connection locations and the cover includes disconnection locations where the cover is free of a connection with the plurality of panels, the one or more hinges, or both; the disconnection locations are a region where the cover is free of attachment with a portion of the one or more hinges so that one or more expansion links, one or more rotary stands, or both can rotate from a closed position to a stored position; the one of more covers at the disconnection locations is configured to fold, flex, bunch, group, or a combination thereof when any of the plurality of panels or one or more hinges including the disconnection locations are moved from a closed position towards a stored position; the one or more covers at the disconnection locations is configured to move into a single plane when any of the plurality of panels or the one or more hinges including the disconnection locations are moved from a stored position into a closed position; or a combination thereof.

The present teachings provide a tonneau cover including: the one or more expansion caps include one or more tabs that assist in connecting each of the one or more expansion caps to one or more expansion links; each of the one or more expansion caps include an extension taper that extends between the one or more tabs and a cap of the tab; the cap extends over and contacts a seal to prevent fluid, debris, or both from entering the bed of the vehicle; the extension taper decreases in height as extension taper extends away from the hinge towards a terminal edge of the expansion cap; each of the expansion caps include an end that contacts one of the one or more hinges and a terminal end that is located proximate to or in contact with the location inward of the one or more vertical walls, the rail cap, or both; the terminal edge of the one or more expansion caps and a terminal edge of each of the plurality of panels are coplanar, terminate in a straight line, or both; each of the one or more expansion caps include a connection feature that connects each of the one or more expansion caps to one of the one or more hinges; or a combination thereof.

The present teachings provide a tonneau cover including: the first panel is a tail panel or a panel farthest from a passenger compartment of a vehicle; the first panel is located between a tail panel and the second panel; the tonneau cover includes one or more rail caps or one or more rail supports that are configured to extend along a first side of a bed of a vehicle, a second side of a bed or a vehicle, or both; wherein the one or more rotary stands include one or more standing legs that contact one of the one or more rail caps or one of the one or more rail supports and as the first panel is rotated about the second panel via the one or more hinges, the one or more standing legs are rotated to lift the first panel and the second panel the distance above the plane; the one or more rotary stands include one or more standing legs that extend in a direction parallel the plurality of panels when the tonneau cover is in the closed position and perpendicular to the plurality of panels when a portion of the tonneau cover including the standing leg is moved to a stored position; one or more rotary stands include one or more standing caps that connect the one or more rotary stands to one or more of the one or more hinges; the one or more rotary stands include one or more extension arms that extend a portion of the standing hinge or the rotary stand so that a terminal edge of the one or more extension arms are coplanar with or in line with a terminal edge of the plurality of panels; the one or more rotary stands are located only on a first side of the tonneau cover; one or of the one or more rotary stands are located on a first side of the one or more hinges and a second of the one or more rotary stands are located on a second side of the one or more hinges; only one of the one or more hinges include a rotary stand; the tonneau cover includes one or more rotary stands and six or less rotary stands; one or more rotary stands include one or more standing legs and the one or more standing legs are located between one or more extension arms and one or more standing caps; a cover extends over and covers one or more of the plurality of panels and at least the standing hinge of the one or more hinges and the standing hinge when in a stored position prevents the cover from being in tension, allows the cover to sag, allows the cover to separate from the plurality of panels, the one or more hinges, or both at disconnection locations; or a combination thereof.

The present teachings provide a tonneau cover including: one or more tracks extend from a first end region to a second end region of the header panel; the one or more tracks are located within a first end region and a second end region of the header panel and the track in the first end region is separate from the track in the second end region; one or more sliders include a track arm that is located within the one or more tracks and a connection arm that extends external to the one or more tracks; one or more connection arms includes one or more connection recesses that are adapted to receive the tether; one or more connection arms include a track connection that contacts a surface within the one or more tracks to prevent from the one or more sliders from being moved out of the one or more tracks, from sliding in a transverse direction to a length of the tonneau cover, or both; track connection is triangular in shape and is adapted to catch a lip on the surface of the one or more tracks to restrict movement of the one or more sliders; the track arm is hollow; track arm includes one or more track recesses that are complementary in shape to an upper wall, a lower wall, or both of the one or more tracks; one or more track recesses are located on a top surface of the one or more sliders; one or more track recesses are located between a connection arm and a track arm; or a combination thereof.

The present teachings provide a tonneau cover including: each of the one or more panel caps include a panel extension that is cantilevered from the one or more panel caps; one or more rail locks are connected to a vehicle, a rail cap, a support rail, or a combination thereof; each the panel extensions extend into contact with one of the one or more rail locks to create the lock; the panel extensions extend under the one or more rail locks so that a vertical movement of the tonneau cover is restricted and/or prevented; the one or more panel caps rotate with one of the plurality of hinges so that when the tonneau cover is in a closed position the one or more panel caps are located under the tonneau cover and when a portion of the tonneau cover including the one or more panel caps are in a stored position, the one or more panel caps are located above a panel that the one or more panel caps are connected; the one or more rotary locks are connected to or an integral part of a support rail, a rail cap, or both; a rotary lock is located on a first side and a second side of at least one of the plurality of panels; the rotary lock is located only on a first side or only a second side of at least one of the plurality of panels; the tonneau cover includes two or more rotary locks and six or less rotary locks; or a combination thereof.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. Unless otherwise stated, a teaching with the term "about" or "approximately" in combination with a numerical amount encompasses a teaching of the recited amount, as well as approximations of that recited amount. By way of example, a teaching of "about 100" encompasses a teaching of within a range of 100+/−15.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

2 Vehicle
4 Bed
6 Connector
8 Fastener
9 Rail Cap
10 Tonneau Cover
12 Panels
14 Cover
16 Connection Locations
18 Disconnection Locations
20 Header Panel
22 Header Cap
24 Header Recess
26 Header Guide Recess
28 Header Guide
30 Header Guide Connector
32 Ears
34 Support Rail
36 Seal
37 Seal Finger
38 Channel
40 Central Panels
40A First Central Panel
40B Second Central Panel
40C Third Central Panel
60 Tail Panel
62 Tail Extension
70 Terminal Edge
80 Hinge
82 Header Link
84 Panel Link
86 Frame
88 Rotation Stop
90 Extended Hinge
92 Hinge Joints
94 Spacer Bar
96 Spacer Cap
98 Spacer Recess
100 Expansion Links
102 Expansion Projection
103 Projection Stop
104 Pocket
106 Expansion Cap
108 Expansion Stop
110 Hinge Connector
112 Hinge Step
116 Upper Surface
120 Hemispherical Hinge 122 Bumpers
124 Closed Position
126 Stored Position
140 Standing Hinge
142 Standing Cap
146 Ball
148 Socket
150 Rotary Stand
152 Stand Support
154 Extension Arm
156 Standing Leg
160 Tab
162 Connection Feature
164 Cap
166 Extension Taper
168 Vertical Wall.
180 Tonneau Connector
182 Track
184 Slider
186 Connection Arm
188 Connection Recess
190 Track Arm
192 Track Connector
194 Tether
196 Track Recess
198 Track Wall
198A Upper Track Wall
198B Lower Track Wall
199 Lip
200 Rotary Lock
202 Panel Cap
204 Panel Extension
210 Partially Open
212 Locked
230 Rail Lock
232 Rail Attachment

The invention claimed is:

1. A tonneau cover comprising:
1) A first panel and a second panel;
2) a hinge located between the first panel and the second panel, the hinge comprises a first link and a second link, the first link comprises a pocket; the second link comprises a projection that is configured to engage the pocket of the first link to connect the first link and the second link; and
3) one or more covers extending over all or a portion of the first panel, the second panel, the first link, and the second link;
wherein the second link comprises a structure that is substantially similar to a structure of the first link and/or the one or more covers provide an indirect connection between the first panel and the first link.

2. The tonneau cover according to claim 1, wherein the projection of the second link has a downwardly turned portion that engages the pocket of the first link.

3. The tonneau cover according to claim 1, wherein the first link comprises a projection that extends from a side of the pocket.

4. The tonneau cover according to claim 3, wherein the projection of the first link has a downwardly turned portion.

5. The tonneau cover according to claim 3, wherein the first link comprises a stop that extends from another side of the pocket.

6. The tonneau cover according to claim 5, wherein the stop of the first link has an upwardly turned portion.

7. The tonneau cover according to claim 4, wherein the downwardly turned portion of the projection of the first link is curved.

8. The tonneau cover according to claim 5, wherein the pocket, the projection, and the stop of the first link are formed as a unitary structure.

9. The tonneau cover according to claim 1, wherein the first link comprises structure for connecting a bumper to the first link.

10. The tonneau cover according to claim 9, wherein the bumper is configured to contact a panel of the tonneau cover when the tonneau cover is folded, the bumper is made of a compressible, flexible, and/or deformable material.

11. The tonneau cover according to claim 9, wherein the structure has a C-shape.

12. The tonneau cover according to claim 1, wherein the first link comprises a disconnection location where the cover is free of being connected to the first link.

13. The tonneau cover according to claim 1, wherein the first link comprises a hinge step.

14. The tonneau cover according to claim 1, wherein the first link comprises a hinge step, the hinge step is a notched region defined in an upper wall of the first link.

15. The tonneau cover according to claim 1, wherein the first panel and the first link are free from being directly connected to each other.

16. A tonneau cover comprising:
(a) a first panel and a second panel;
(b) a hinge located between the first panel and the second panel, the hinge comprises: (i) a first link and (ii) a second link; wherein the first link comprises a pocket and the second link comprises a projection that is configured to engage the pocket of the first link to connect the first link and the second link;
(c) one or more covers extending over all or a portion of the first panel, the second panel, the first link, and the second link; and
(d) a bumper connected to the hinge, wherein the bumper is configured to contact a panel of the tonneau cover when the tonneau cover is folded;
wherein the first panel and the first link are free from being directly connected to each other and/or wherein the second panel and the second link are free from being directly connected to each other.

17. The tonneau cover according to claim 16, wherein the cover extends over the first panel and the first link and provides an indirect connection between the first panel and the first link.

18. The tonneau cover according to claim 17, wherein the projection of the second link has a downwardly turned portion that engages the pocket of the first link; the first link comprises a projection that extends from a side of the pocket; and the projection of the first link has a downwardly turned portion.

* * * * *